United States Patent [19]

Kanno et al.

[11] Patent Number: 5,387,628

[45] Date of Patent: Feb. 7, 1995

[54] PROCESS FOR PRODUCING (CO)POLYCARBONATE AND (CO)POLYCARBONATE COMPOSITION

[75] Inventors: Tatsuya Kanno; Tsutomu Yamato; Yasuhiro Oshino; Yutaka Fukuda; Yoshihiro Iguchi; Takaaki Kuwana; Toshihiro Matsumoto, all of Hyogo, Japan

[73] Assignee: Daicel Chemical Industries, Ltd., Osaka, Japan

[21] Appl. No.: 119,368

[22] Filed: Sep. 9, 1993

Related U.S. Application Data

[62] Division of Ser. No. 70,733, Jun. 2, 1993, which is a division of Ser. No. 940,310, Aug. 31, 1992, Pat. No. 5,278,279.

[30] Foreign Application Priority Data

Mar. 11, 1992 [JP] Japan ................... 4-52421

[51] Int. Cl.$^6$ .............................. C08K 5/15
[52] U.S. Cl. ..................... 524/117; 524/119; 524/120; 524/126; 524/130; 524/132; 524/133; 524/135; 524/601; 524/611; 524/710
[58] Field of Search ............ 524/117, 119, 120, 126, 524/130, 132, 133, 135, 601, 611, 710

[56] References Cited

U.S. PATENT DOCUMENTS 3,321,439  5/1967  Bollert et al. .................. 528/198
4,973,652  11/1990 Ebert et al. ................... 528/198
5,250,655  10/1993 Yokoyama et al. ............. 528/200

FOREIGN PATENT DOCUMENTS 158501  10/1985  European Pat. Off. .
234914  9/1987   European Pat. Off. .
303931  2/1989   European Pat. Off. .
534189  3/1993   European Pat. Off. .
4001226 1/1992   Japan .
4001227 1/1992   Japan .
4001228 1/1992   Japan .
5262865 10/1993  Japan .

Primary Examiner—John Kight, III
Assistant Examiner—Terressa M. Mosley
Attorney, Agent, or Firm—Flynn, Thiel, Boutell & Tanis

[57] ABSTRACT

A process for producing a (co)polycarbonate or a (co)polyestercarbonate having a high molecular weight and excellent hue, heat stability and mechanical properties by reacting a dihydroxyl compound with a diester of carbonic acid and/or a diester of dicarbonic acid in the presence of a transesterification catalyst, wherein at least part of the reaction process is conducted in the presence of a specified organic phosphorus compound, or, in the presence of a specified organic phosphorus compound and a hindered phenol compound. A (co)polycarbonate or (co)polyester-carbonate composition having excellent hue, heat stability and mechanical properties, comprising a (co)polycarbonate and/or a (co)polyestercarbonate and, a specified organic phosphorus compound, or, a specified organic phosphorus compound and a hindered phenol compound.

39 Claims, No Drawings

PROCESS FOR PRODUCING (CO)POLYCARBONATE AND (CO)POLYCARBONATE COMPOSITION

This is a continuation of Ser. No. 08/070,733, filed Jun. 2, 1993, which is a division of Ser. No. 07/940,310, filed Aug. 31, 1992 now U.S. Pat. No. 5,278,279.

FIELD OF THE INVENTION

The present invention relates to a process for producing a heat-stabilized (co)polycarbonate and a heat-stabilized (co)polycarbonate composition. In particular, the present invention relates to a process for producing a heat-stabilized (co)polycarbonate or a heat-stabilized (co)polyestercarbonate by the melt polycondensation of a dihydroxy compound with a diester of carbonic acid and/or a diester of dicarbonic acid in the presence of a transesterification catalyst and an organic phosphorus compound as a heat-stabilizer.

DESCRIPTION OF THE RELATED ART

High-molecular polycarbonates are general-purpose engineering thermoplastics usable over a wide application range, particularly for injection molding or as the substitute for glass to be used in windowpanes.

Although the interfacial polycondensation process is usually effective in producing polycarbonates, it has the defects of poisonous phosgene being used and chlorine ions remain in the produced polycarbonate.

Japanese Patent Laid-Open No. 182336/1988 discloses the production of a polycarbonate by the interfacial polycondensation of a specified dihydric phenol with liquid trichloromethyl chloroformate which is a phosgene dimer in place of the poisonous phosgene so as to overcome these defects. However, only 9,9-bis(4-hydroxyphenyl)fluorenes are described therein as the specified dihydric phenols.

Further, although it is described in Angew. Chem. 99,922 (1987) that a polycarbonate is produced from 2,2-bis(4-hydroxyphenyl)propane by using triphosgene in place of the poisonous phosgene, a reaction mechanism wherein phosgene is generated is also described therein.

Japanese Patent Laid-Open No. 51719/1985 discloses a process for producing a polycarbonate by using a catalyst comprising a combination of a nitrogenous basic compound and a boron compound. Although a polycarbonate having a relatively pale color can be obtained by using this catalyst, the catalyst has a defect of a low polymerization activity.

Japanese Patent Laid-Open No. 151236/1986 discloses a process for producing a polycarbonate by using a quaternary nitrogenous compound as a catalyst, a phosphonite compound and a hindered phenol compound.

Japanese Patent Laid-Open No. 54223/1991 discloses a process for producing a polycarbonate in the presence of an electron-donative phosphorus compound as a catalyst.

Japanese Patent Laid-Open No. 36344/1992 discloses a polycarbonate resin composition comprising a specified polycarbonate resin and a phosphite compound having a fluorine atom.

Furthermore, Japanese Patent Laid-Open No. 36346/1992 discloses an aromatic polycarbonate resin composition comprising an aromatic polycarbonate resin and at least one member selected from the group consisting of phosphorus compounds as an antioxidant, phenol compounds as an antioxidant and epoxy compounds as a stabilizer.

SUMMARY OF THE INVENTION

The present inventors have found that a heat-stabilized (co)polycarbonate substantially free from chlorine ions can be obtained without using the poisonous phosgene by the melt polycondensation of a diester of carbonic acid with a dihydroxy compound by using a specified catalyst in the presence of a specified organic phosphorus compound as a heat-stabilizer. The present invention has been completed on the basis of this finding.

Thus, the first embodiment of the present invention provides a process for producing a (co)polycarbonate or a (co)polyestercarbonate by reacting a dihydroxyl compound with a diester of carbonic acid and/or a diester of dicarbonic acid in the presence of a transesterification catalyst, wherein at least part of the reaction process is conducted in the presence of an organic phosphorus compound selected from the group consisting of compounds represented by the following general formulas (1) to (6), or, in the presence of an organic phosphorus compound selected from the group consisting of compounds represented by the following general formulas (1) to (6) and a hindered phenol compound:

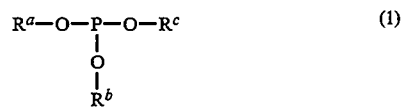

wherein $R^a$, $R^b$ and $R^c$ each represents a straight-chain or branched alkyl group having 1 to 12 carbon atoms, or a phenyl group which may be substituted;

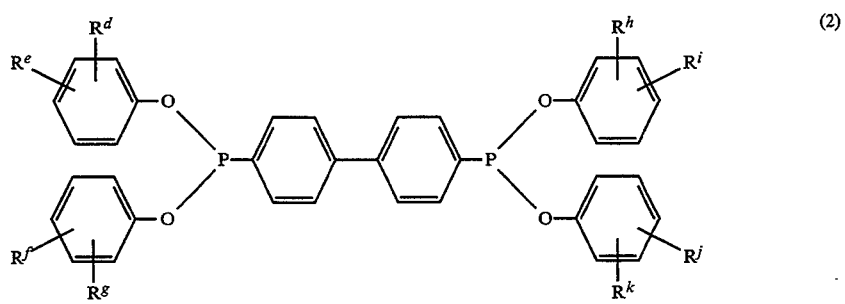

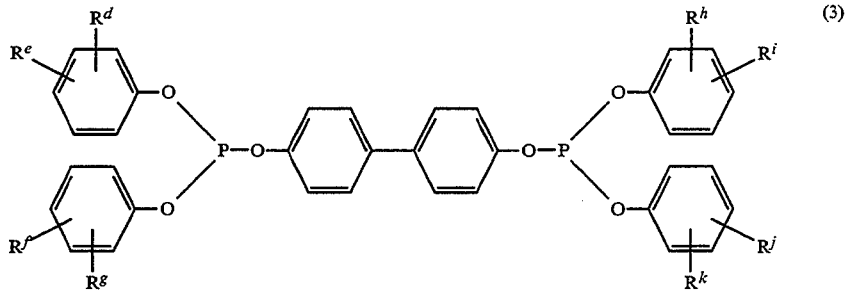

(3)

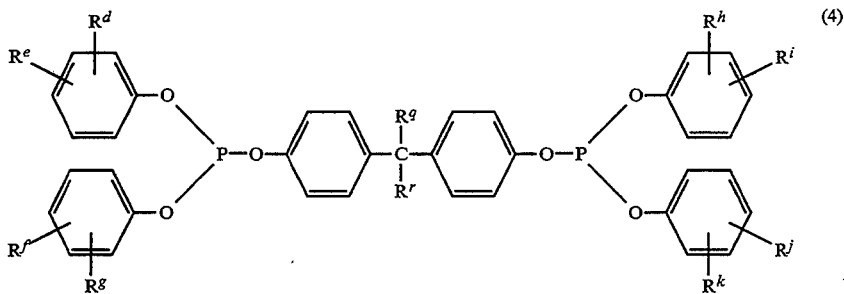

(4)

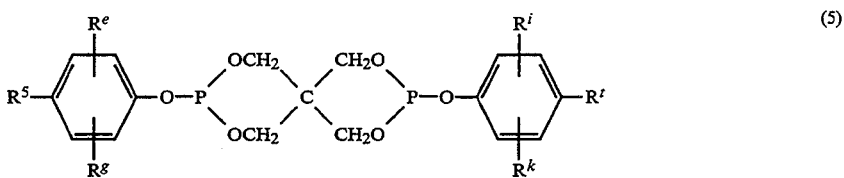

(5)

wherein $R^d$, $R^e$, $R^f$, $R^g$, $R^h$, $R^i$, $R^j$ and $R^k$ each represents a hydrogen atom or a straight-chain or branched alkyl group having 1 to 12 carbon atoms, $R^q$ and $R^r$ each represents a straight-chain or branched alkyl group having 1 to 12 carbon atoms and $R^s$ and $R^t$ each represents a straight-chain or branched alkyl group having 1 to 12 carbon atoms;

(6)

wherein $R^u$ and $R^v$ each represents a straight-chain or branched alkyl group having 1 to 20 carbon atoms and $R^w$ represents a phenyl or aralkyl group which may be substituted.

The process described above includes a process for producing a heat-stabilized polycarbonate by melt-polycondensing a dihydric phenol with a carbonic diester, characterized by using a catalyst selected from among basic nitrogen compounds and/or a catalyst selected from the group consisting of alkali metal compounds and alkaline earth metal compounds in the presence of a heat-stabilized organophosphorus compound.

In the process according to the first embodiment of the present invention, $10^{-6}$ to $10^{-1}$ mol, based on 1 mol of the dihydroxy compound, of a catalyst selected from among basic nitrogen compounds and $10^{-7}$ to $10^{-2}$ mol, based on the dihydroxy compound, of a catalyst selected from the group consisting of alkali metal compounds and alkaline earth metal compounds are preferably used.

In the process according to the first embodiment of the present invention, 1.01 to 1.5 mol, based on 1 mol of the dihydroxy compound, of the diester of carbonic acid and/or the diester of dicarbonic acid is(are) preferably used to protect the terminal of the formed (co)polycarbonate and/or (co)polyestercarbonate with a carbonic ester group.

In the process according to the first embodiment of the present invention, the dihydroxy compound, and the diester of carbonic acid and/or the diester of dicarbonic acid are preferably used to produce a (co)polycarbonate and/or (co)polyestercarbonate having the terminal hydroxyl content of 3 to 80 molar %.

Furthermore, in the above-described process, the dihydroxy compound is preferably selected from among compounds of the following general formulas (I) to (IV):

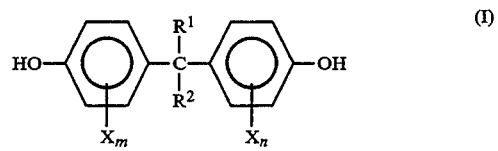

(I)

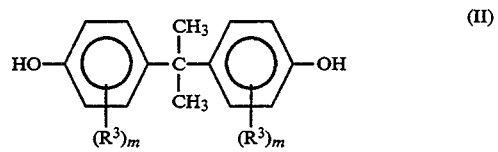

(II)

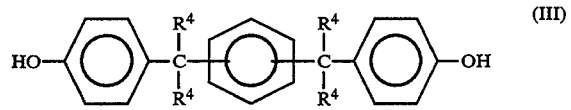

(III)

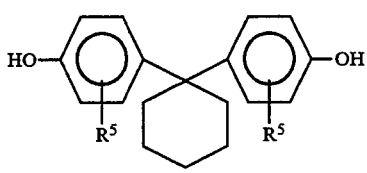

(IV)

wherein $R^1$, $R^2$, $R^3$, $R^4$ and $R^5$ each represents a hydrogen atom, a straight-chain or branched alkyl group having 1 to 8 carbon atoms or a phenyl group, X represents a halogen atom, n represents 0 to 4, and m represents 1 to 4.

The present inventors have also found that a heat-stabilized (co)polycarbonate composition can be obtained by adding a specified organic phosphorus compound as a heat-stabilizer to a (co)polycarbonate. The present invention has been completed on the basis of this finding.

Thus, the second embodiment of the present invention provides a process for producing a (co)polycarbonate composition or a (co)polyestercarbonate composition, wherein an organic phosphorus compound selected from the group consisting of compounds represented by the following general formulas (1) to (6), or, an organic phosphorus compound selected from the group consisting of compounds represented by the following general formulas (1) to (6) and a hindered phenol compound is(are) added to a (co)polycarbonate or a (co)polyestercarbonate:

(1)

wherein $R^a$, $R^b$ and $R^c$ each represents a straight-chain or branched alkyl group having 1 to 12 carbon atoms, or a phenyl group which may be substituted;

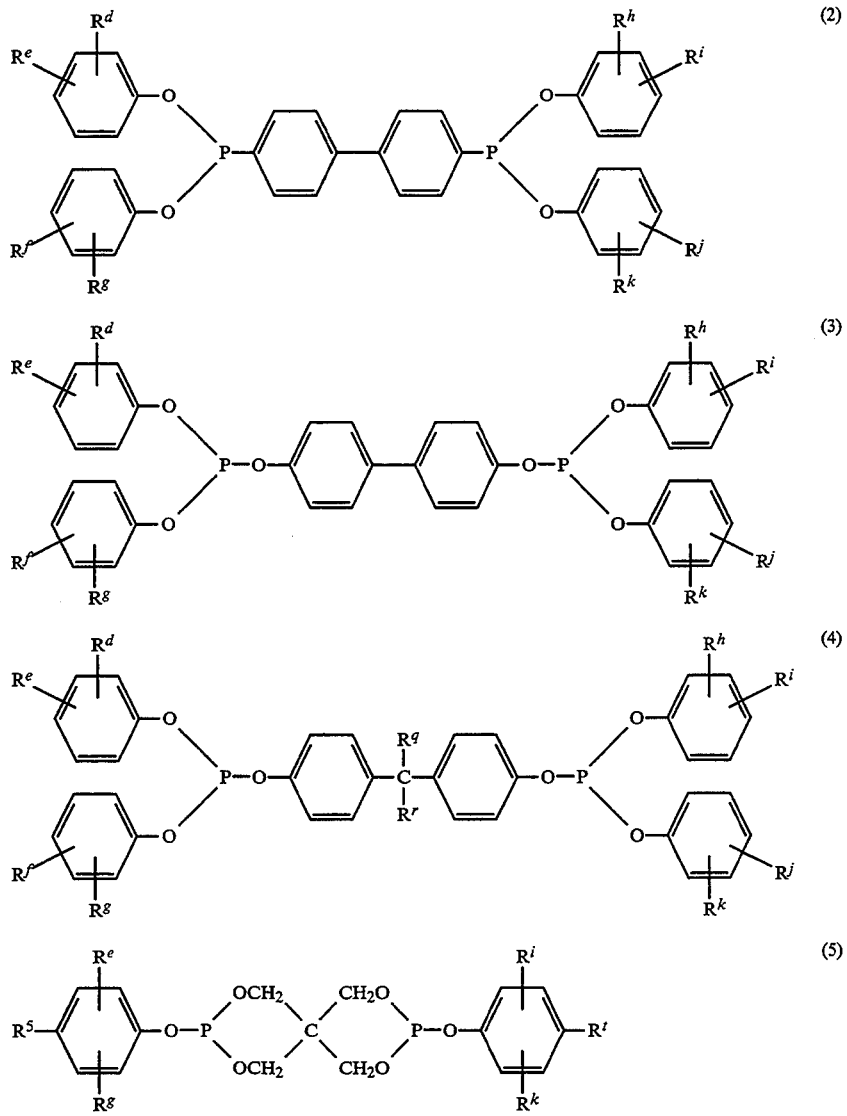

wherein $R^d$, $R^e$, $R^f$, $R^g$, $R^h$, $R^i$, $R^j$ and $R^k$ each represents a hydrogen atom or a straight-chain or branched alkyl group having 1 to 12 carbon atoms, $R^q$ and $R^r$ each represents a straight-chain or branched alkyl group having 1 to 12 carbon atoms and $R^s$ and $R^t$ each represents a straight-chain or branched alkyl group having 1 to 12 carbon atoms;

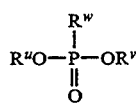

wherein $R^u$ and $R^v$ each represents a straight-chain or branched alkyl group having 1 to 20 carbon atoms and $R^w$ represents a phenyl or aralkyl group which may be substituted.

The present invention further provides, as the third embodiment of the present invention, a (co)polycarbonate or (co)polyester-carbonate composition comprising or consisting essentially of a (co)polycarbonate and/or a (co)polyestercarbonate and, an organic phosphorus compound selected from the group consisting of compounds represented by the following general formulas (1) to (6), or, an organic phosphorus compound selected from the group consisting of compounds represented by the following general formulas (1) to (6) and a hindered phenol compound:

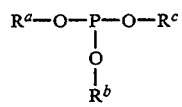

wherein $R^a$, $R^b$ and $R^c$ each represents a straight-chain or branched alkyl group having 1 to 12 carbon atoms, or a substituted or unsubstituted phenyl group

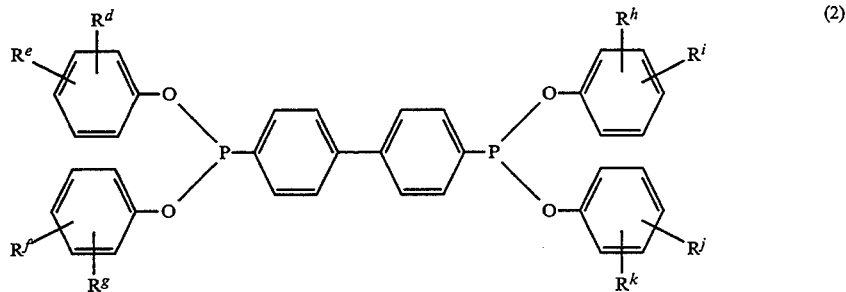

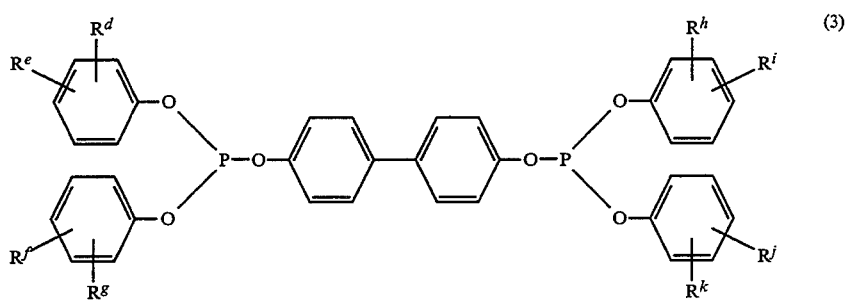

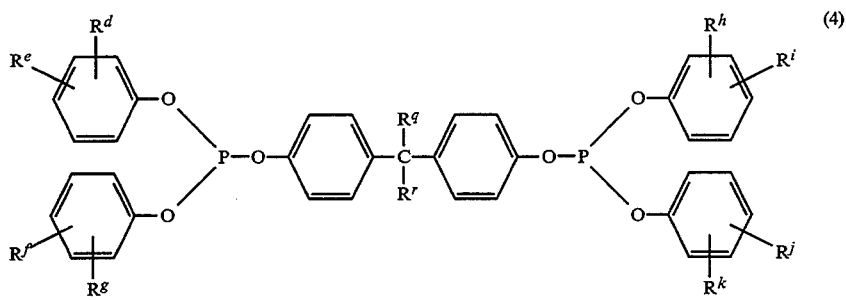

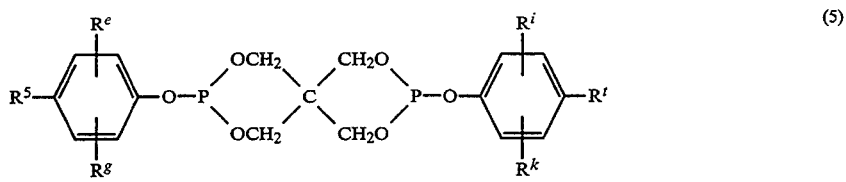

wherein $R^d$, $R^e$, $R^f$, $R^g$, $R^h$, $R^i$, $R^j$ and $R^k$ each represents a hydrogen atom or a straight-chain or branched alkyl group having 1 to 12 carbon atoms, $R^q$ and $R^r$ each represents a straight-chain or branched alkyl group having 1 to 12 carbon atoms and $R^s$ and $R^t$ each represents a straight-chain or branched alkyl group having 1 to 12 carbon atoms;

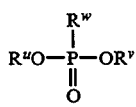

wherein $R^u$ and $R^v$ each represents a straight-chain or branched alkyl group having 1 to 20 carbon atoms and $R^w$ represents a phenyl or aralkyl group which may be substituted.

The composition described above includes a heat-stabilized polycarbonate composition comprising or consisting essentially of the polycarbonate produced by the process according to the first embodiment of the present invention and a hindered phenol compound.

In the composition according to the present invention, the (co)polycarbonate and/or the (co)polyestercarbonate are preferably those which have a terminal hydroxyl content of 3 to 80 molar %, a sodium content of 1 ppm or less, an iron content of 1 ppm or less, and a chlorine content of 3 ppm or less.

In the above-described present invention, the organic phosphorus compound is preferably used in an amount of from 10 to 1,000 ppm based on the dihydroxy compound.

DETAILED DESCRIPTION OF THE INVENTION

In the present invention, the term, "a (co)polycarbonate" means a polycarbonate and/or a copolycarbonate, and the term, "a (co)polyestercarbonate" means a polyestercarbonate and/or a copolyestercarbonate.

In the present invention, specified organic phosphorus compounds represented by the following general formulas (1) to (6) are employed as a heat-stabilizer:

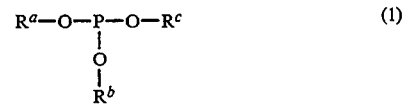

wherein $R^a$, $R^b$ and $R^c$ each represents a straight-chain or branched alkyl group having 1 to 12 carbon atoms, or a phenyl group which may be substituted;

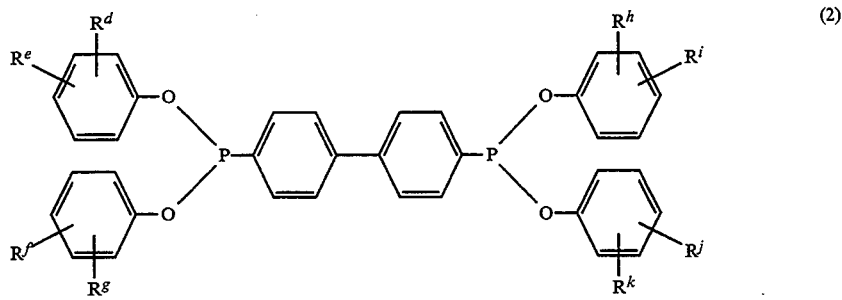

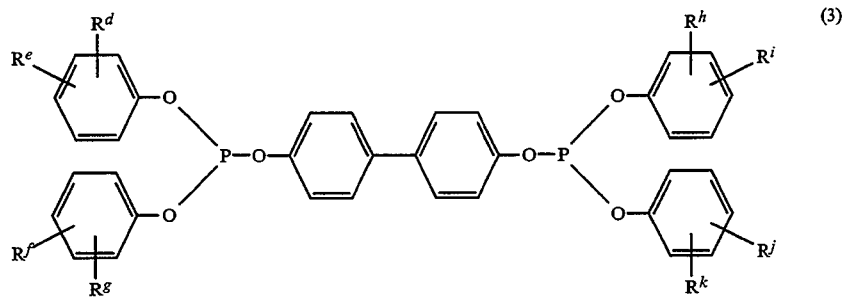

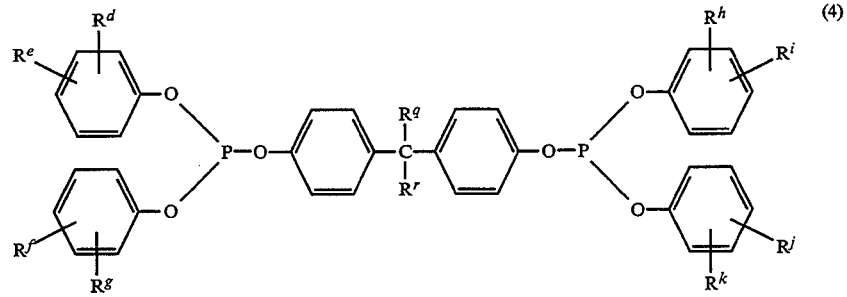

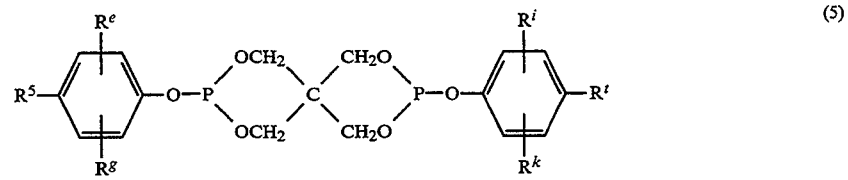

wherein $R^d$, $R^e$, $R^f$, $R^g$, $R^h$, $R^i$, $R^j$ and $R^k$ each represents a hydrogen atom or a straight-chain or branched alkyl group having 1 to 12 carbon atoms, $R^q$ and $R^r$ each represents a straight-chain or branched alkyl group having 1 to 12 carbon atoms and $R^s$ and $R^t$ each represents a straight-chain or branched alkyl group having 1 to 12 carbon atoms;

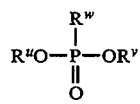
(6)

wherein $R^u$ and $R^v$ each represents a straight-chain or branched alkyl group having 1 to 20 carbon atoms and $R^w$ represents a phenyl or aralkyl group which may be substituted.

The phosphorus compounds represented by the general formula (1) include, for example, compounds of the following formulas:

wherein $R^{10}$ represents hydrocarbon group having 1 to 30 carbon atoms;

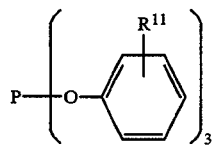

wherein $R^{11}$ represents a hydrocarbon group having 1 to 30 carbon atoms; and

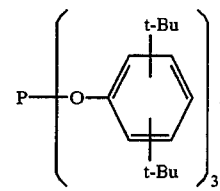

The phosphorus compounds represented by the general formula (2) include, for example, compound of the following formula:

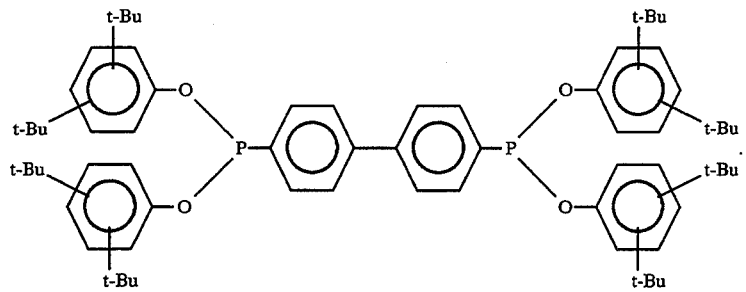

The phosphorus compound represented by the general formula (5) include, for example, compound of the following formula:

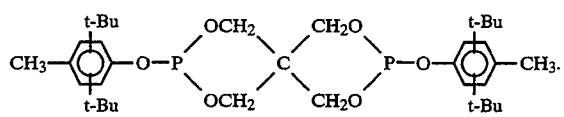

As the organic phosphorus compound, those except for triethyl phosphine, tri-n-propyl phoshine, triisopropyl phosphine, tri-n-butyl phoshine, triphenyl phosphine, tri-o-dimethoxyphenyl phosphine, tri-p-tolyl phosphine, tri-o-tolyl phosphine, tributyl phosphite, triphenyl phosphite, tri-p-tolyl phosphite and tri-o-tolyl phosphite are preferably employed.

In general, the organic phosphorus compound is one member selected from the group consisting of compounds represented by the following general formulas (1) and (7) to (11):

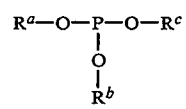
(1)

wherein $R^a$, $R^b$ and $R^c$ each represents a straight-chain or branched alkyl group having 1 to 12 carbon atoms, or a phenyl group which may be substituted;

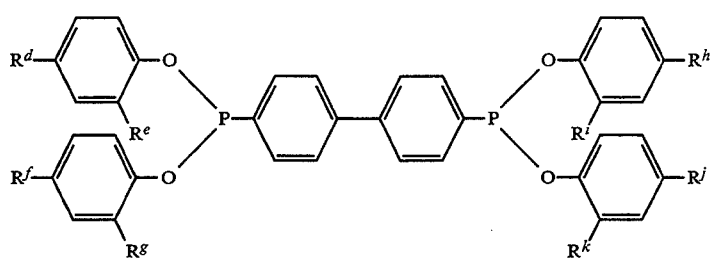
(7)

-continued

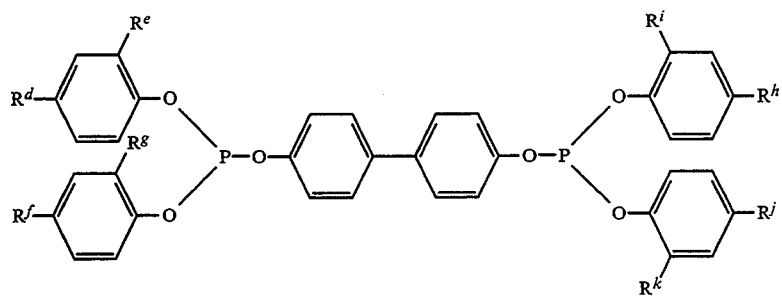
(8)

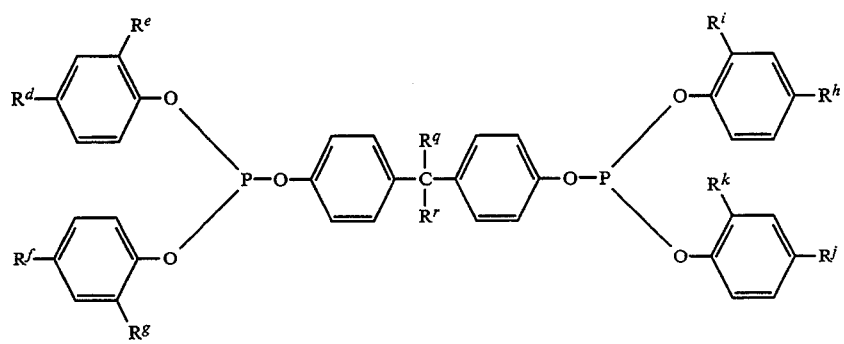
(9)

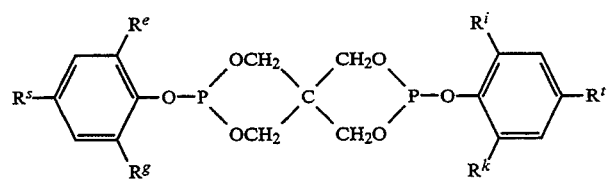
(10)

(11)

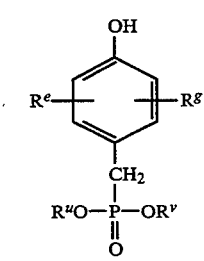
(12)

wherein $R^d$, $R^e$, $R^f$, $R^g$, $R^h$, $R^i$, $R^j$ and $R^k$ each represents a hydrogen atom or a straight-chain or branched alkyl group having 1 to 12 carbon atoms, $R^q$ and $R^r$ each represents a straight-chain or branched alkyl group having 1 to 12 carbon atoms, $R^s$ and $R^t$ each represents a straight-chain or branched alkyl group having 1 to 12 carbon atoms, $R^u$ and $R^v$ each represents a straight-chain or branched alkyl group having 1 to 20 carbon atoms, and Ph represents a phenyl group.

Examples of the organic phosphorus compound include triethyl phosphite, triisopropyl phosphite, triisodecyl phosphite, tridodecyl phosphite, phenyl diisodecyl phosphite, diphenyl isodecyl phosphite, triphenyl phosphite, phenyl bis(4-nonylphenyl) phosphite, tris(4-octyl-phenyl) phosphite, tris(4-(1-phenylethyl)-phenyl) phosphite, tris(2,4-di-tert-butylphenyl) phosphite, tris(4-nonylphenyl) phosphite, diethyl 3,5-di-tert-butyl-4-hydroxybenzyl phosphonate, tetrakis(2,4-di-tert-butylphenyl)-4,4'-biphenylene diphosphite of the following formula:

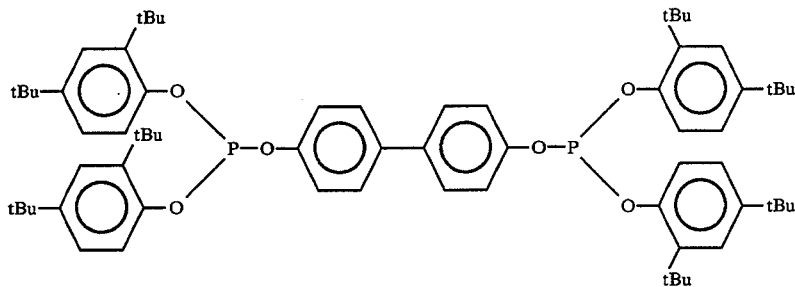

pentaerythritol di[(2,6-di-tert-butyl-4-methylphenyl) phosphite] of the following formula:

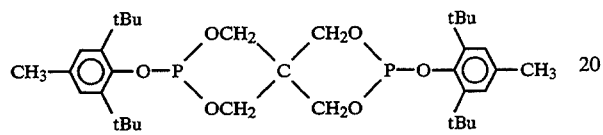

pentaerythritol di[(2,4-di-tert-butylphenyl) phosphite] of the following formula:

wherein $R^u$ and $R^v$ each represent a straight-chain or branched alkyl group having 1 to 20 carbon atoms and Ph represents a phenyl group, and the phosphonite compound, which is commercially available from Sand under the trade name of "Sandstab P-EPQ", of the following formula:

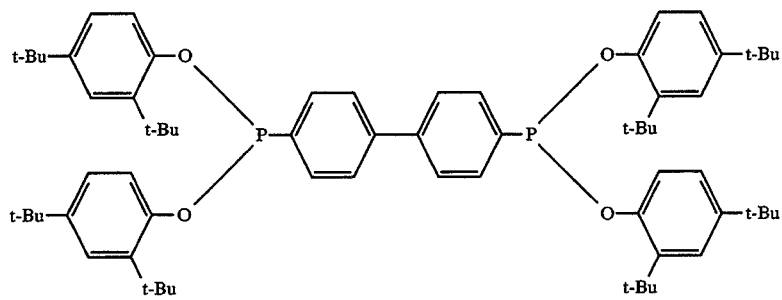

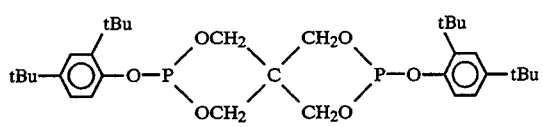

tetrakis (2,4-di-tert-butylphenyl)-4,4'-(2,2-diphenylpropane) phosphite of the following formula:

Typical examples of the organic phosphorus compounds usable in the present invention include triethyl phosphite, triisopropyl phosphite, triisodecyl phosphite, tridodecyl phosphite, phenyl diisodecyl phosphite, diphenyl isodecyl phosphite, triphenyl phosphite, phenyl bis(4-nonylphenyl) phosphite, tris(4-octylphenyl) phosphite, tris(4-(1-phenylethyl)phenyl) phosphite, tris(2,4-di-tert-butylphenyl) phosphite, diethyl 3,5-di-tert-butyl-

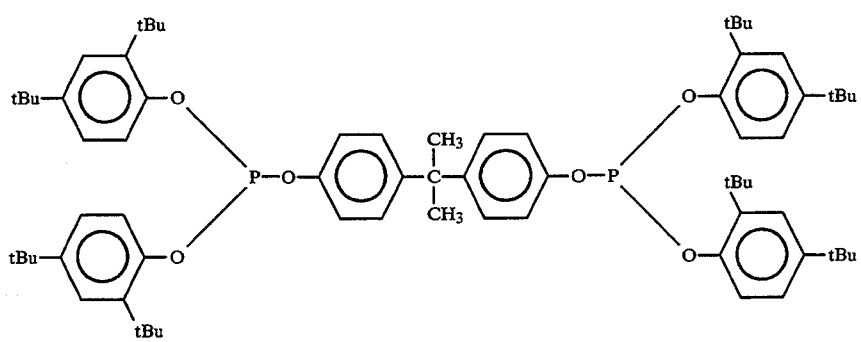

dialkoxyphenylphosphoric acids of the following formula:

phenyl)-4-hydroxybenzyl phosphonate, tetrakis(2,4-di-tert-butylphenyl)-4,4'-biphenylene diphosphite of the following formula:

pentaerythritol di[(2,6-di-tert-butyl-4-methylphenyl) phosphite] of the following formula:

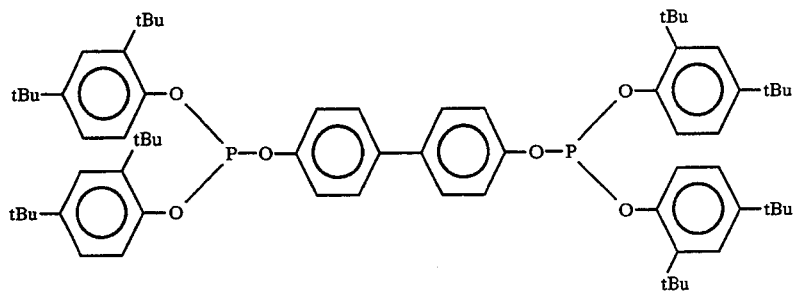

pentaerythritol di[(2,4-di-tert-butylphenyl) phosphite] of the following formula:

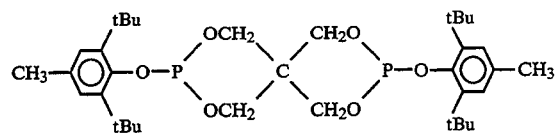

tetrakis(2,4-di-tert-butylphenyl) 4,4'-(2,2-diphenylpropane) phosphite of the following formula:

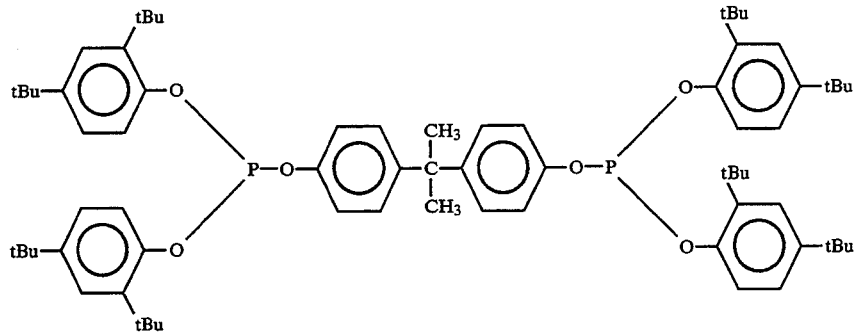

and dialkoxyphenylphosphoric acids of the following formula:

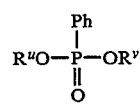

wherein $R^u$ and $R^v$ each represent a straight-chain or branched alkyl group having 1 to 20 carbon atoms and Ph represents a phenyl group.

In the present invention, the organic phosphorus compound is preferably one member selected from the group consisting of triisopropyl phosphite, triisodecyl phosphite, tridodecyl phosphite, phenyl diisodecyl phosphite, diphenyl isodecyl phosphite, phenyl bis(4-nonylphenyl) phosphite, tris(4-octylphenyl) phosphite, tris(4-(1-phenylethyl)phenyl) phosphite, tetrakis(2,4-di-tert-butylphenyl)-4,4'-biphenylene diphosphite of the following formula:

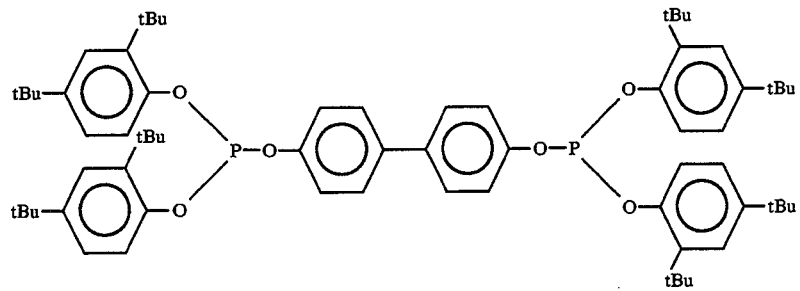

pentaerythritol di[(2,4-di-tert-butylphenyl) phosphite] of the following formula:

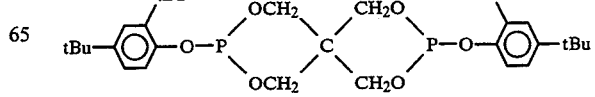

tetrakis(2,4-di-tert-butylphenyl)-4,4'-(2,2-diphenylpropane) phosphite of the following formula:

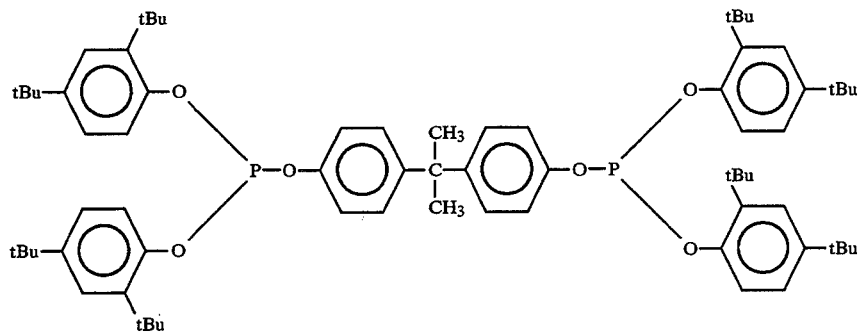

and dialkoxyphenylphosphoric acids of the following formula:

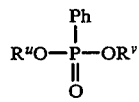

(11)

wherein $R^u$ and $R^v$ each represent a straight-chain or branched alkyl group having 1 to 20 carbon atoms and Ph represents a phenyl group, and still preferably one member selected from the group consisting of tetrakis(2,4-di-tert-butylphenyl)4,4'-biphenylene diphosphite of the following formula:

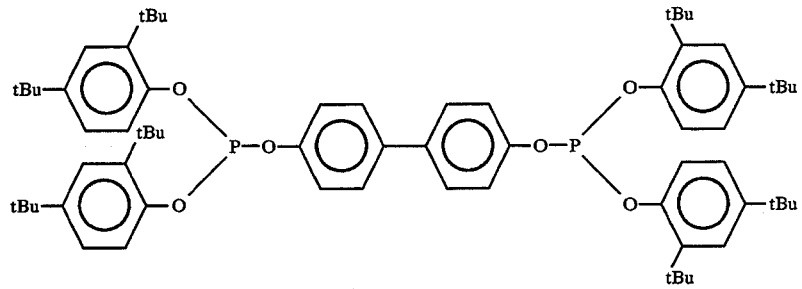

tetrakis(2,4-di-tert-butylphenyl)-4,4'-(2,2-diphenylpropane) phosphite of the following formula:

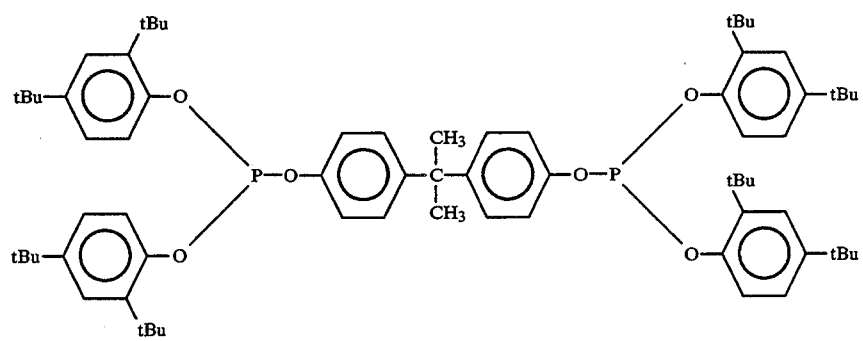

and dialkoxyphenylphosphoric acids of the following formula:

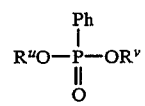

(11)

wherein $R^u$ and $R^v$ each represent a straight-chain or branched alkyl group having 1 to 20 carbon atoms and Ph represents a phenyl group.

The above-described phosphorus compounds can be used either singly or in combination of two or more of them.

The hindered phenol compounds usable in the present invention include N,N'-hexamethylene-bis(3,5-di-t-butyl-4-hydroxyhydrocinnamamide), triethylene glycol bis[3-(3-t-butyl-5-methyl-4-hydroxyphenyl)propionate], 1,6-hexanediol-bis[3-(3,5-di-t-butyl-4-hydroxyphenyl)-propionate], pentaerythrityl tetrakis[3-(3,5-di-t-butyl-4-hydroxyphenyl)propionate], 3,5-di-t-butyl-4-hydroxybenzyl phosphonate-diethyl ester, 1,3,5-trimethyl-2,4,6-tris(3,5-di-tert-butyl-4-hydroxybenzyl)benzene and compounds of the following formulas:

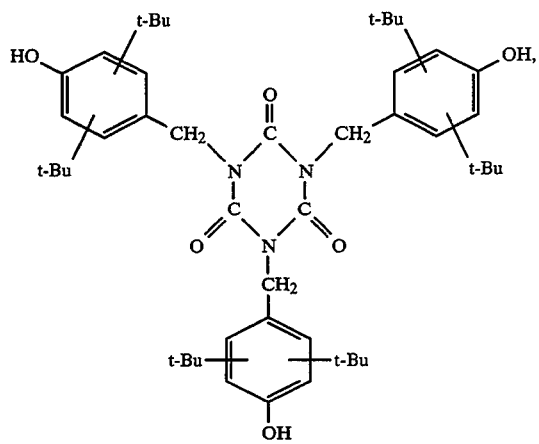

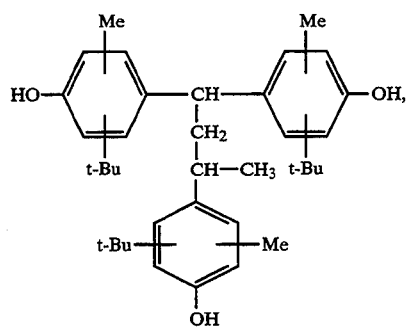

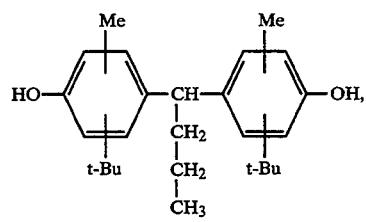

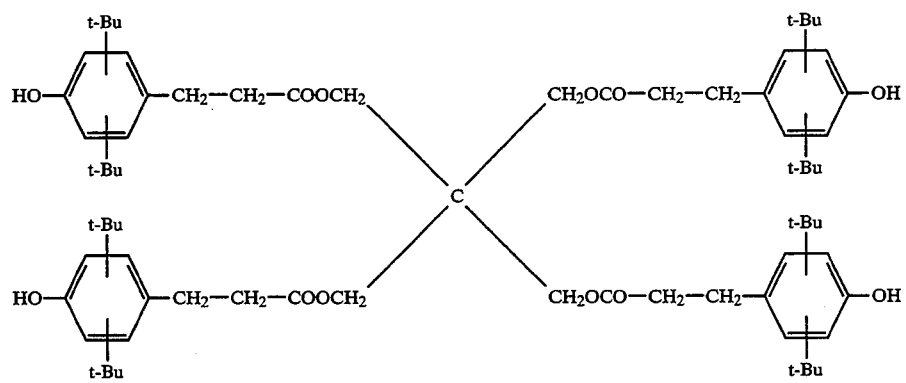

and

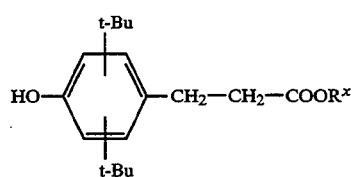

wherein $R^x$ represents a straight-chain or branched alkyl group having 1 to 24 carbon atoms.

The hindered phenol compound is preferably one member selected from the group consisting of octadecyl propionate-3-(3,5-di-t-butyl-4-hydroxyphenyl); i.e., octadecyl 3-(3,5-di-t-butyl-4-hydroxyphenyl)propionate, N,N'-hexamethylene-bis(3,5-di-t-butyl4-hydroxyhydrocinnamamide), triethylene glycol bis-[3-(3-t-butyl-5- methyl-4-hydroxyphenyl)propionate], 1,6-hexanediol-bis[3-(3,5-di-t-butyl-4-hydroxyphenyl)propionate], pentaerythrityl tetrakis[3-(3,5-di-t-butyl-4-hydroxyphenyl)propionate], 3,5-di-t-butyl-4-hydroxybenzyl phosphonate-diethyl ester, 1,3,5-trimethyl-2,4,6-tris (3,5-di-tert-butyl-4-hydroxybenzyl)benzene and compounds of the following formulas:

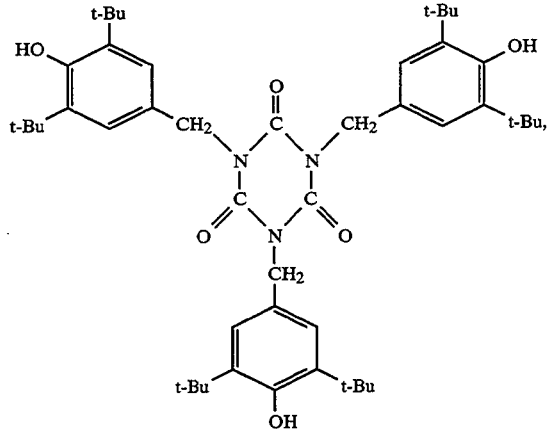

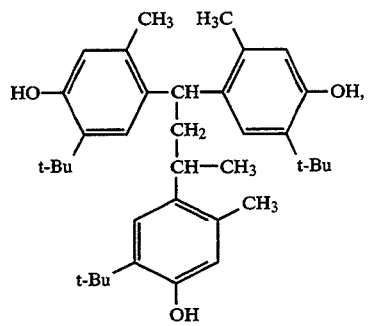

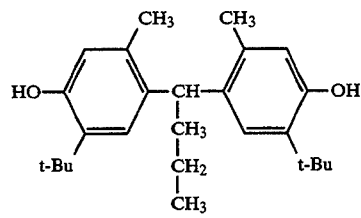

and

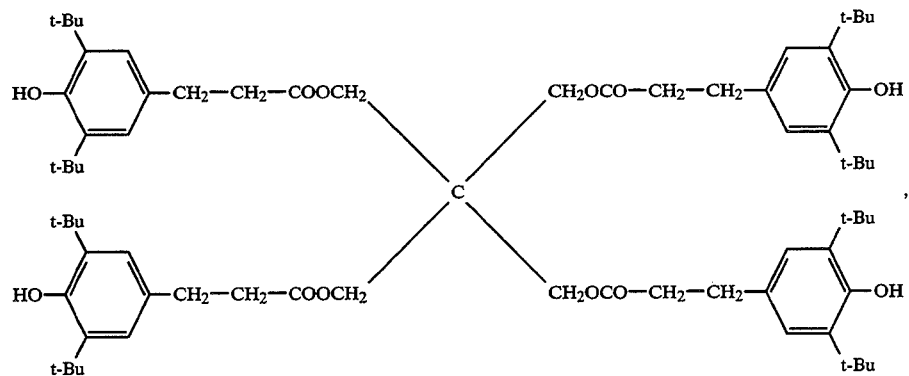

pionate], 3,5-di-t-butyl-4-hydroxybenzyl phosphonate-diethyl ester, 1,3,5-trimethyl2,4,6-tris(3,5-di-tert-butyl-4-hydroxybenzyl)benzene and compounds of the following formulas:

and still preferably one member selected from the group consisting of N,N'-hexamethylene-bis(3,5-di-t-butyl-4-hydroxyhydrocinnamamide), triethylene glycol bis[3-(3-t-butyl-5-methyl-4-hydroxyphenyl)-propionate], 1,6-hexanediol-bis[3-(3,5-di-t-butyl-4-hydroxyphenyl)pro-

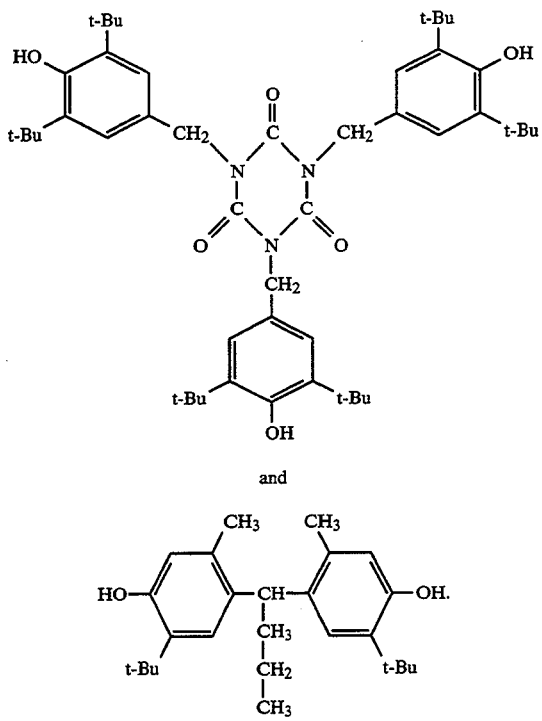

and

Various commercially available hindered phenol compounds are usable in the present invention and examples thereof include tetrakis[methylene-3-(3,5'-di-t-butyl-4-hydroxyphenyl) propionate]methane (a product of Ciba-Geigy, Irganox®1010) and 1,3,5-trimethyl-2,4,6-tris(3,5-di-t-butyl-4-hydroxybenzyl)benzene (a product of Shell, Ionox®330).

The above-described hindered phenol compounds can be used either singly or in combination of two or more of them.

Representative examples of the transesterification catalyst usable in the present invention include (a) metal-containing catalysts such as lithium borohydride, sodium borohydride, potassium borohydride, rubidium borohydride, cesium borohydride, beryllium borohydride, magnesium borohydride, calcium borohydride, strontium borohydride, barium borohydride, aluminum borohydride, titanium borohydride, tin borohydride, germanium borohydride, tetraphenoxylithium, tetraphenoxysodium, tetraphenoxypotassium, tetraphenoxyrubidium, tetraphenoxycesium, sodium thiosulfate, beryllium oxide, magnesium oxide, tin(IV) oxide, dibutyltin oxide, beryllium hydroxide, magnesium hydroxide, germanium hydroxide, beryllium acetate, magnesium acetate, tin(IV) acetate, germanium acetate, lithium carbonate, sodium carbonate, potassium carbonate, beryllium carbonate, magnesium carbonate, tin(IV) carbonate, germanium carbonate, tin (IV) nitrate, germanium nitrate, antimony trioxide and bismuth trimethylcarboxylate;

(b) electron-donative amines such as N,N-dimethyl-4-aminopyridine, 4-diethylaminopyridine, 4-aminopyridine, 2-aminopyridine, 2-hydroxypyridine, 2-methoxypyridine, 4-methoxypyridine, 4-hydroxypyridine, 2-dimethylaminoimidazole, 2-methoxyimidazole, 2-mercaptoimidazole, aminoquinoline, imidazole, 2-methylimidazole, 4-methylimidazole and diazabicyclooctane (DABCO);

(c) salts of the above electron-donative amines with carbonic, acetic, formic, nitric, nitrous, oxalic, borofluoric and hydrofluoric acids;

(d) electron-donative phosphorus compounds such as triethylphosphine, tri-n-propylphosphine, triisopropylphosphine, tri-n-butylphosphine, triphenylphosphine, tri-o-dimethoxyphenylphosphine, tri-p-tolylphosphine, tri-o-tolylphosphine, tributyl phosphite, triphenyl phosphite, tri-p-tolyl phosphite and tri-o-tolyl phosphite; and (e) borane complexes such as complexes of borane with ammonia, dimethylamine, trimethylamine, triethylamine, t-butylamine, dimethylaniline, pyridine, dimethylaminopyridine, morpholine, piperazine, pyrrole, tetrahydrofuran, dimethyl sulfide, tri-n-butylphosphine, triphenylphosphine or triphenyl phosphite.

In the present invention, the transesterification catalyst is preferably a basic compound containing a nitrogen atom in the molecule, or, a basic compound containing a nitrogen atom in the molecule and an alkaline metal compound and/or an alkaline earth metal compound.

The basic compound containing a nitrogen atom in the molecule is preferably one member selected from the group consisting of basic compounds containing a nitrogen atom in the molecule except for salts of quaternary nitrogen-containing compounds, or, one member selected from the group consisting of basic compounds containing a nitrogen atom in the molecule except for quaternary ammonium halides, quaternary pyridinium halides, quaternary picolinium halides, quaternary quinolinium halides and quaternary isoquinolinium halides.

Examples of the basic compound containing a nitrogen atom in the molecule include aliphatic primary amines, aliphatic secondary amines, aliphatic tertiary amines, alicyclic primary amines, alicyclic secondary amines, alicyclic tertiary amines, aromatic primary amines, aromatic secondary amines, aromatic tertiary amines, quaternary ammonium salts and ammonia.

Concretely, the basic compound containing a nitrogen atom in the molecule include ammonia, ammonium hydroxides, ammonium borohydrides, ammonium tetraarylborates, pyridines, imidazoles, diazo compounds, picolines, pyrimidines, quinolines, pyrazoles, aniline, pyrrolidines, morpholines, piperidines and piperadines.

Typical examples of the basic compound containing a nitrogen atom in the molecule usable in the present invention include ammonium hydroxides having an alkyl, aryl or aralkyl group, such as tetramethylammonium hydroxide (Me$_4$NOH), tetraethylammonium hydroxide (Et$_4$NOH), tetrabutylammonium hydroxide (Bu$_4$NOH) and trimethylbenzylammonium hydroxide (C$_6$H$_5$—CH$_2$(Me)$_3$NOH); tertiary amines such as trimethylamine, triethylamine, dimethylbenzylamine and triphenylamine; secondary amines represented by the formula: R$_2$NH wherein R represents an alkyl group such as a methyl or ethyl group or an aryl group such as a phenyl or toluyl group; primary amines represented by the formula: RNH$_2$ wherein R is as defined above; ammonia; and basic salts such as tetramethylammonium borohydride (Me$_4$NBH$_4$), tetrabutylammonium borohydride (Bu$_4$NBH$_4$), tetrabutylammonium tetraphenylborate (Bu$_4$NBPh$_4$) and tetramethylammonium tetraphenylborate (Me$_4$NBPh$_4$).

In addition, the following compounds can also be used: 4-(4-methyl-1-piperidinyl)pyridine, N,N-dimethyl-4-aminopyridine, 4-diethylaminopyridine, 4-pyrrolidinopyridine, 4-aminopyridine, 2-aminopyridine, 2-hydroxypyridine, 2-methoxypyridine, 4-methoxypyridine, 4-hydroxypyridine, 2-dimethylaminoimidazole, 2-methoxyimidazole, 2-mercaptoimidazole, aminoquinoline, benzimidazole, imidazole, 2-methylimidazole, 4-methylimidazole, diazabicyclooctane (DABCO), 1,8-diaza-bicyclo[5,4,0]-7-undecene (DBU) and 4-(4-methylpyrrolidinyl)pyridine.

The basic compound containing a nitrogen atom in the molecule is preferably one member selected from the group consisting of pyridines, imidazoles, diazo compounds, picolines, pyrimidines, quinolines, pyrazoles, aniline, pyrrolidines, morpholines, piperidines and piperadines, and still preferably 4-dimethylaminopyridine or 4-pyrrolidinopyridine.

Typical examples of the alkali metal compounds usable in the present invention include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, potassium borohydride, sodium tetraphenylborate, sodium benzoate, potassium benzoate, lithium benzoate, disodium hydrogenphosphate, dipotassium hydrogenphosphate, dilithium hydrogenphosphate, disodium, dipotassium or dilithium salt of bisphenol A, or sodium, potassium or lithium salt of phenol.

Typical examples of the alkaline earth metal compounds usable in the present invention include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium carbonate, barium acetate, magnesium acetate, strontium acetate, calcium stearate, barium stearate, magnesium stearate and strontium stearate.

Typical examples of the diester of carbonic acid, i.e., carbonic diester, usable in the present invention include bisaryl carbonates such as diphenyl carbonate, bis(2,4-dichlorophenyl) carbonate, bis(2,4,6-trichlorophenyl) carbonate, bis(2-cyanophenyl) carbonate, bis(o-nitrophenyl) carbonate, ditolyl carbonate, m-cresyl carbonate, dinaphthyl carbonate, bis(biphenyl) carbonate and the like: dicycloalkyl carbonates such as dicyclohexyl carbonate and the like; and dialkyl carbonates such as dimethyl carbonate, diethyl carbonate, dibutyl carbonate and the like. Among these, bisaryl carbonates are preferable, and diphenyl carbonate is particularly In the present invention, a mixture of the above-described carbonic diester(s) and a diester of dicarbonic acid, i.e., dicarboxylic ester(s) can be used. The mixture may contain 50 molar % or less of dicarboxylic esters. A (co)polyestercarbonate is obtained in such a case. Examples of the dicarboxylic ester include diphenyl terephthalate or diphenyl isophthalate.

Typical examples of the dihydroxy compound, i.e., dihydric phenol, usable in the present invention include compounds of the following general formulas (I) to (IV):

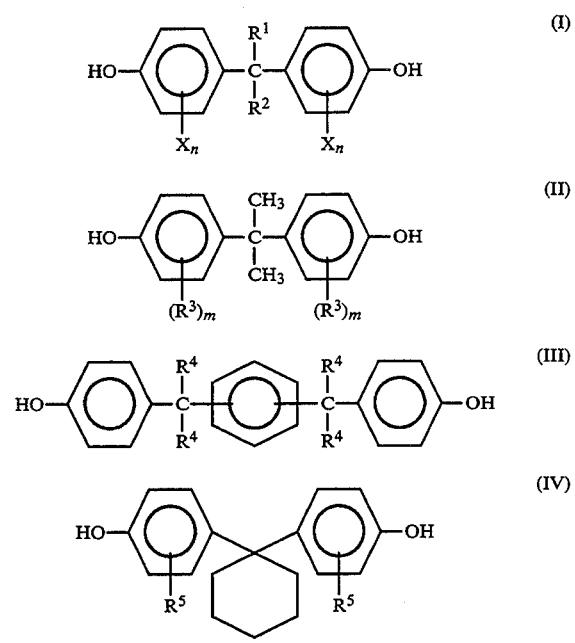

wherein $R^1$, $R^2$, $R^3$, $R^4$ and $R^5$ each represents a hydrogen atom, a straight-chain or branched alkyl group having 1 to 8 carbon atoms or a phenyl group, X represents a halogen atom, n represents 0 to 4, and m represents 1 to 4.

Furthermore, typical examples of the dihydroxy compound, i.e., dihydric phenol, usable in the present invention include compounds of the following general formulas (V) to (VII):

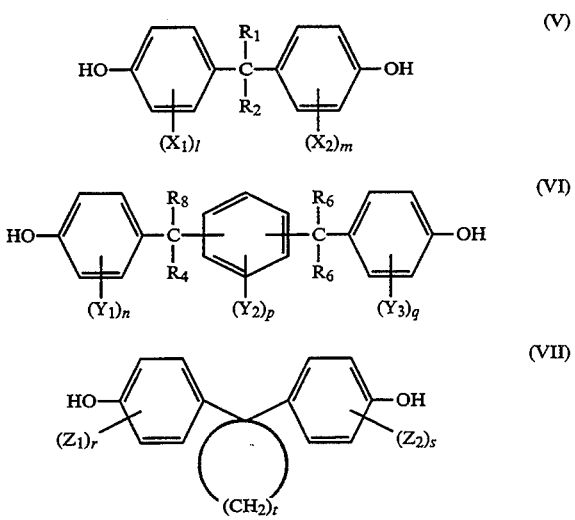

wherein $R_1$, $R_2$, $R_3$, $R_4$, $R_5$ and $R_6$, which may be the same or different, each represent a hydrogen atom, an alkyl group, a cycloalkyl group, an aralkyl group or an aryl group; $X_1$, $X_2$, $Y_1$, $Y_2$, $Y_3$, $Z_1$ and $Z_2$, which may be the same or different, each represent a halogen atom, an alkoxy group, an alkyl group, a cycloalkyl group, an aralkyl group or an aryl group; l, m, n, p, q, r and s each represent an integer of 0–4; and t represents an integer of 2–10.

Examples of the alkyl group include straight-chain or branched alkyl groups such as methyl group, ethyl group, n-propyl group, isopropyl group, n-butyl group, isobutyl group, t-butyl group, n-pentyl group, isopentyl group, neopentyl group, hexyl group, heptyl group, octyl group, 2-ethylhexyl group, decyl group, undecyl group, dodecyl group and the like, among which preferable alkyl groups are straight-chain or branched alkyl groups having about 1 to 8 carbon atoms.

Examples of the cycloalkyl group include cyclopropyl group, cyclopentyl group, cyclohexyl group, cycloheptyl group, cyclooctyl group and the like.

Examples of the aralkyl group include benzyl group, phenethyl group, benzhydryl group and the like.

Examples of the aryl group include phenyl group, naphthyl group, anthryl group and the like, among which a preferable aryl group is phenyl group.

The halogen atom includes fluorine atom, chlorine atom, bromine atom and iodine atom. The alkoxy group includes methoxy group, ethoxy group, n-propoxy group, isopropoxy group, n-butoxy group, isobutoxy group, pentyloxy group, hexyloxy group and the like.

The alkyl group, the cycloalkyl group, the aryl group and the aralkyl group may have one or more substituents inert under the conditions of the transesterification reaction. Examples of such substituent include a halogen atom, an alkoxy group, an aryloxy group, an aralkyloxy group, an alkylthio group, a cyano group, a nitro group and the like.

The dihydric phenols which are the compounds represented by the above general formula (I) include, for example, 2,2-bis(4-hydroxyphenyl)propane, 2,2-bis(4-hydroxyphenyl)butane, 2,2-bis(4-hydroxyphenyl)-4methylpentane, 2,2-bis(4-hydroxyphenyl)octane, 4,4'-dihydroxy-2,2,2-triphenylethane and 2,2-bis(3,5-dibromo-4-hydroxyphenyl)propane.

The dihydric phenols which are the compounds represented by the above general formula (II) include, for example, 2,2-bis(4-hydroxy-3-methylphenyl)propane, 2,2-bis(4-hydroxy-3-isopropylphenyl)propane, 2,2bis(4-hydroxy-3-sec-butylphenyl)propane, 2,2-bis(3,5- dimethyl-4-hydroxyphenyl) propane, and 2,2-bis(4-hydroxy-3-tert-butylphenyl) propane.

The dihydric phenols which are the compounds represented by the above general formula (III) include, for example, 1,1'-bis(4-hydroxyphenyl)-m-diisopropylbenzene and 1,1'-bis(4-hydroxyphenyl)-m-diisopropylbenzene.

The dihydric phenols which are the compounds represented by the above general formula (IV) include, for example, 1,1'-bis(4-hydroxyphenyl)cyclohexane.

It is also possible to produce a copolycarbonate or a copolyestercarbonate by the use of a mixture comprising two or more dihydric phenols.

The process according to the first embodiment of the present invention is conducted by reacting a dihydroxyl compound with a diester of carbonic acid and/or a diester of dicarbonic acid in the presence of a transesterification catalyst, and in the presence of an organic phosphorus compound selected from the group consisting of compounds represented by the aforementioned general formulas (1) to (6) or in the presence of an organic phosphorus compound selected from the group consisting of compounds represented by the afore-mentioned general formulas (1) to (6) and a hindered phenol compound for at least part of the reaction process.

That is, the process includes those which are conducted by melt-polycondensing a dihydric phenol such as bisphenol A with a carbonic diester such as diphenyl carbonate by using a catalyst selected from among basic nitrogen compounds and/or a catalyst selected from the group consisting of alkali metal compounds and alkaline earth metal compounds in the presence of an organophosphorus compound as a heat-stabilizer.

The reaction proceeds at a temperature in the range of 100° to ca.300° C., preferably 130° to 280° C. When the reaction temperature is below 100° C., the reaction velocity is insufficient and when it exceeds 300° C., side reactions are apt to occur.

Thus, it is necessary to use an organic phosphorus compound contributive to the heat stabilization in an amount of 10 ppm or more based on the dihydroxy compound. When this amount is less than 10 ppm, no heat stabilizing effect can be obtained. In general, an organic phosphorus compound is added in an amount of 10 to 1000 ppm based on the dihydroxy compound. When it exceeds 1000 ppm, adverse effects are exerted on the properties unfavorably as the case may be.

The amount of the hindered phenol compound to be added is preferably 10 to 2,000 ppm based on the dihydroxy compound. When it is less than 10 ppm, no heat stabilizing effect can be obtained and, on the contrary, when it exceeds 2,000 ppm, adverse effects are exerted on the properties unfavorably as the case may be.

In the case that the organic phosphorus compound represented by the general formula (7) is employed, the amount thereof is preferably in an amount of 0.1 to 0.5% by weight based on the whole polycondensate. In the case that the organic phosphorus compound represented by the general formula (7) and a hindered phenol compound are used, the total amount of the phosphorus compound and the hindered phenol compound must be 0.54% or below based on the whole polycondensate. The addition thereof in an amount exceeding 0.5% by weight will exert an adverse effect on the mechanical properties of the polycarbonate unfavorably as the case may be.

When a basic compound containing a nitrogen atom is employed as the transesterification catalyst, the amount thereof is preferably $10^{-6}$ to $10^{-1}$ mol, still preferably $10^{-4}$ to $10^{-2}$, based on the dihydroxy compound contained in the reaction system. When it is less than $10^{-6}$ mol, the catalytic effect is insufficient and the polymerization velocity of the (co)polycarbonate or the (co)polyestercarbonate is reduced and, on the contrary, when it exceeds $10^{-1}$ mol, the relative amount thereof remaining as the catalyst in the resulting (co)polycarbonate or the (co)polyestercarbonate is increased to impair the properties of the (co)polycarbonate or the (co)polyestercarbonate.

When an alkali metal compound and/or an alkaline earth metal compound is(are) employed as the transesterification catalyst, the amount thereof is preferably $10^{-7}$ to $10^{-2}$ mol, still preferably $10^{-6}$ to $10^{-3}$ mol, based on the dihydroxy compound contained in the reaction system. When it is less than $10^{-7}$ mol, the catalytic effect is insufficient and the degree of polymerization of the (co)polycarbonate or the (co)polyestercarbonate is reduced and, on the contrary, when it exceeds $10^{-2}$ mol, the relative amount thereof remaining as the catalyst in the resulting (co)polycarbonate or (co)polyestercarbonate is increased to impair the properties of them.

The terminal hydroxyl content of the (co)polycarbonate or the (co)polyestercarbonate obtained in the present invention is preferably in the range of 3 to 80 molar %. That is, it is preferable that the dihydroxyl compound and, the diester of carbonic acid and/or the diester of dicarbonic acid are used to produce a (co)polycarbonate or (co)polyestercarbonate having its terminal hydroxyl content of 3 to 80 molar %. It is practically difficult to realize a terminal hydroxyl content of less than 3 molar % and, on the contrary, when it exceeds 80 molar %, the heat stability thereof is impaired. A (co)polycarbonate or (co)polyester-carbonate having a terminal hydroxyl content in the range of 3 to 50 molar % can be used singly. A (co)polycarbonate or (co)polyestercarbonate having a terminal hydroxyl content of 50 to 80 molar % can be used in the form of a blend with another polymer.

The diester of carbonic acid or the diester of dicarbonic acid must be used in an amount equimolar to the dihydroxy compound contained in the reaction system. To form a high-molecular-weight (co)polycarbonate, usually 1 mol of the diester of carbonic acid must be reacted with 1 mol of the dihydroxy compound. When diphenyl carbonate is used as the diester of carbonic acid, 2 mol of phenol is formed by the reaction and distilled off from the reaction system. However, in order to prevent an adverse effect on the properties, particularly hue, of the (co)polycarbonate, it is preferred to use 1.01 to 1.5 mol, particularly 1.015 to 1.20 mol, of the diester of carbonic acid per mole of the dihydroxy compound to protect the terminal hydroxyl group of the resulting (co)polycarbonate with a carbonic ester group.

The (co)polycarbonate obtained by the process according to the first embodiment of the present invention preferably has a sodium content of 1 ppm or less, an iron content of 1 ppm or less and a chlorine content of 3 ppm or less. When the sodium, iron and chlorine contents exceed 1 ppm, 1 ppm and 3 ppm, respectively, an adverse effect is exerted on the properties, particularly hue, of the polycarbonate unfavorably.

In the above-described process, the addition of the organic phosphorus compound and the hindered phenol compound is conducted, for example, as follows:

(1) the organic phosphorus compound and the hindered phenol compound are added in any one step before the relative viscosity of the reaction mixture reaches in the range of from 1.01 to 1.15 (polymer content: 0.5 g/dl in methylene chloride, at 20° C.).

(2) the organic phosphorus compound and the hindered phenol compound are added in any one step before the relative viscosity of the reaction mixture reaches in the range of from 1.01 to 1.15 (polymer content: 0.5 g/dl in methylene chloride, at 20° C.).

(3) the organic phosphorus compound is added in any one step before the relative viscosity of the reaction mixture reaches in the range of from 1.01 to 1.15 (polymer content: 0.5 g/dl in methylene chloride, at 20° C.), and the hindered phenol compound are added in any one step after the relative viscosity of the reaction mixture reaches in the range of from 1.01 to 1.15 (polymer content: 0.5 g/dl in methylene chloride, at 20° C.).

(4) the hindered phenol compound is added in any one step before the relative viscosity of the reaction mixture reaches in the range of from 1.01 to 1.15 (polymer content: 0.5 g/dl in methylene chloride, at 20° C.), and the organic phosphorus compound is added in any one step after the relative viscosity of the reaction mixture reaches 1.01 (polymer content: 0.5 g/dl in methylene chloride, at 20° C.).

Any one step before the relative viscosity of the reaction mixture reaches in the range of from 1.01 to 1.15 (polymer content: 0.5 g/dl in methylene chloride, at 20° C.) includes, for example, the step before the reaction, and the step of pre-polycondensation. That is, the addition of the organic phosphorus compound and/or the hindered phenol compound is conducted together with the addition of starting monomers, i.e. dihydric phenol and carbonic diester, and the transesterification catalyst; or before the relative melt viscosity of the reaction mixture reaches 1.01 to 1.15, preferably about 1.1 (determined in terms of methylene chloride concentration at a polymer concentration of 0.5 g/dl at 20° C.) after the initiation of the reaction.

Any one step after the relative viscosity of the reaction mixture reaches in the range of from 1.01 to 1.15 (polymer content: 0.5 g/dl in methylene chloride, at 20° C.) includes, for example, the step of post-polycondensation. The step of post-polycondensation begins when the relative viscosity of the reaction mixture reaches 1.01 to 1.15, generally about 1.1 (determined in terms of methylene chloride concentration at a polymer concentration of 0.5 g/dl at 20 C.). In the step of post-polycondensation, the molecular weight of the polymer increases and then the reaction completes.

The hindered phenol compound may be added together with the organic phosphorus compound or at any other time.

The process according to the second embodiment of the present invention is conducted by adding a specified organic phosphorus compound described above, or, a specified organic phosphorus compound and a hindered phenol compound is(are) to a (co)polycarbonate or a (co)polyestercarbonate to prepare a (co)polycarbonate composition or a (co)polyestercarbonate composition. That is, compounding of the specified organic phosphorus compound (and a hindered phenol compound) may be conducted during kneading, extruding or pelleting of the polymer after the completion of the reaction.

The (co)polycarbonate or the (co)polyestercarbonate is preferably those which are produced by the process according to the first embodiment of the present invention. However, a polycarbonate which is prepared by the phosgen method may be employed.

The amount of the organic phosphorus compound to be added is preferably 1,000 to 10,000 ppm based on the dihydroxy compound. When it is less than 1,000 ppm, no heat stabilizing effect can be obtained and, on the contrary, when it exceeds 10,000 ppm, adverse effects are exerted on the properties unfavorably as the case may be.

The amount of the hindered phenol compound to be added is preferably 1,000 to 50,000 ppm based on the dihydroxy compound. When it is less than 1,000 ppm, no heat stabilizing effect can be obtained and, on the contrary, when it exceeds 50,000 ppm, adverse effects are exerted on the properties unfavorably as the case may be.

The third embodiment of the present invention is a (co)polycarbonate or (co)polyestercarbonate composition comprising a (co)polycarbonate and/or a (co)polyestercarbonate and, an organic phosphorus compound selected from the group consisting of compounds represented by the above general formulas (1) to (6), or, an organic phosphorus compound selected from the group consisting of compounds represented by the above general formulas (1) to (6) and a hindered phenol compound.

That is, the composition includes, for example, the composition obtained by the process according to the second embodiment of the present invention, and the (co)polycarbonate or (co)polyestercarbonate obtained by the process according to the first embodiment of the present invention if the specified organic phosphorus compound or the specified organic phosphorus compound and a hindered phenol compound is(are) present as it is in the obtained polymer.

When the (co)polycarbonate used has terminal hydroxyl group content of 3 to less than 50 molar %, the composition may not contain another polymer. However, when the (co)polycarbonate has terminal hydroxyl group content of 50 to 80 molar %, the composition may contain a polymer other than (co)polycarbonates and (co)polyestercarbonates, too.

According to the first embodiment of the present invention wherein a transesterification catalyst, preferably a catalyst selected from among basic nitrogen compounds and/or a catalyst selected from the group consisting of alkali metal compounds and alkaline earth metal compounds are(is) used in the presence of an organic phosphorus compound as a heat-stabilizer, a colorless, transparent (co)polycarbonate or (co)polyestercarbonate having a high molecular weight and being resistant to deterioration caused by heat can be obtained without using poisonous phosgene.

According to the second and third embodiment of the present invention, a mold comprising (co)polycarbonate or (co)polyestercarbonate and being resistant to deterioration caused by heat during processing can be obtained.

The (co)polycarbonate, (co)polyester-carbonate, (co)polycarbonate composition and (co)polyester-carbonate composition according to the present invention are generally used as an engineering plastic and are particularly useful as the material of articles for outdoor use, such as outdoor lighting fixtures, window panes and fences; and articles to be exposed to high temperature and high humidity, e.g., microwave ovens, tableware, tanks and pipe.

Further, they can be also applied to a heat-sensitive element of an electric blanket or carpet, various hoses and tubes, hot-melt adhesive, and so on.

EXAMPLE

Example A-1

22.8 g (0.1 mol) of 2,2-bis(4-hydroxyphenyl)propane, 0.164 g ($2\times 10^{-2}$ mol) of 2-methylimidazole and 21.4 g (0.1 mol) of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. At this point of time, 0.05 g (0.2% by weight based on the whole polycondensate) of tetrakis(2,4-di-t-butylphenyl)-4,4'-biphenylenephosphonite (a product of Sand, Sandstab P-EPQ) and 0.025 g (0.1% by weight based on the whole polycondensate) of pentaerythritol tetrakis[3-(3,5-di-t-butyl-4-hydroxyphenyl) propionate](a product of Ciba-Geigy, Irganox 1010) were added to the reactor. At the point of time of this addition, the relative solution viscosity (polymer concentration: 0.5 g/100 ml, 20° C., solvent: methylene chloride) presumed from the stirring torque was 1.17, while the one actually determined by the use of a sample of the polycondensate was 1.18. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [$\eta$] of 0.519 as determined in methylene chloride at 20° C. The average molecular weight $\overline{Mv}$ of the polycarbonate was 29,900 as calculated according to the formula: [$\eta$]=$1.11\times 10^{-4}$ ($\overline{Mv}$)$^{0.82}$ (see Encyclopedia of Polymer Science and Technology, vol.10, p.732, John Wiley Sons, Inc. (1969)).

The polycarbonate prepared above was evaluated for the heat resistance by determining the thermal decomposition behavior thereof in a nitrogen stream at a temperature rise rate of 10° C./min by the use of a differential thermogravimetric analyzer (mfd. by Rigaku Denki K.K.). The decomposition-initiating temperature, $T_d$ was 432° C.; the temperature, $T_5$ at which temperature, $T_{10}$ at which the weight loss reached 10% was 486° C.

Further, the polycarbonate was also evaluated for the resistance to hydrolysis by hot-pressing the polycarbonate into a sheet (50 mm×50 mm×0.6 mm), hanging down the sheet in a thermohygrostat at 90° C. and 100% RH and determining a lowering in the molecular weight due to hydrolysis. After the lapse of 30 days under the conditions of 90° C. and 100% RH (relative humidity), the retention of the molecular weight was 88.74% based on the initial molecular weight and the resulting sheet was colorless and transparent and no abnormal phenomenon was observed in respect the external appearance. These results are given in Table 1.

Example A-2

Another polycarbonate was prepared in a similar manner to that of Example A-1 except that 0.0122 g ($1\times 10^{-4}$ mol) of 4-dimethylaminopyridine was added instead of 2-methylimidazole, that the contents were stirred in a nitrogen atmosphere for 2 hours prior to the polycondensation and that 0.025 g of Sandstab P-EPQ (a product of Sand) and 0.025 g of diethyl 3,5-di-t-butyl-4-hydroxybenzylphosphonate (a product Ciba-Geigy, Irganox 1222) were added when the relative solution viscosity of the polycondensate reached The hue, average molecular weight, thermal decomposition behavior and hydrolysis behavior of this polycarbonate are given in Table 1.

Example A-8

11.4 g (50 mole %, 0.05 mole) of 2,2-bis-(4-hydroxyphenyl)propane, 17.0 g (50 mole %, 0.05 mole) of 2,2-bis(4-hydroxy-3-t-butylphenyl)propane, 23.0 g (0.108 mole) of diphenyl carbonate and 0.068 g ($10^{-3}$ mol) of imidazole were stirred together in a nitrogen atmosphere for 2 hours and subjected to polycondensation in a similar manner to that of Example A-1. When the relative solution viscosity reached 1.21, 0.025 g of Sandstab P-EPQ (a product of Sand) and 0.025 g of diethyl 3,5-di-t-butyl-4-hydroxybenzylphosphonate (a product of Ciba-Geigy, Irganox 1222) were added to the reaction mixture like in Example A-2. The obtained mixture was further reacted. The hue, viscosity-average molecular weight, thermal decomposition behavior and hydrolysis behavior of the obtained copolymer are given in Table 1.

Example A-4

22.8 g (0.1 mol) of 2,2-bis(4-hydroxyphenyl)propane, 42.1 g (0.1 mol) of bis(2,4,6-trichlorophenyl)carbonate and 0.0122 g ($10^{-4}$ mol) of dimethylaminopyridine were stirred together at 180° C. in a nitrogen atmosphere for one hour. The temperature of the mixture was raised, while gradually lowering the pressure of the system. When the relative solution viscosity reached 1.19, 0.025 g of Sandstab P-EPQ (a product of Sand) and 0.025 g of diethyl 3,5-di-t-butyl-4-hydroxybenzylphosphonate (a product of Ciba Geigy, Irganox 1222) were added to the reaction mixture, and the obtained mixture was further reacted like in Example A-2 to give a polycarbonate.

The hue, viscosity-average molecular weight, thermal decomposition behavior and hydrolysis behavior thereof are given in Table 1.

Example A-5

22.8 g (0.1 mol) of 2,2-bis(4-hydroxyphenyl)propane, 23.0 g (0.108 mol) of diphenyl carbonate and 0.0352 g ($2 \times 10^{-4}$ mol ) of 4-(4-methylpyrrolidinyl)pyridine were stirred together at 180° C. in a nitrogen atmosphere for one hour. The temperature of the mixture was raised, while gradually lowering the pressure of the system. When the relative solution viscosity reached 1.02, 0.025 g of Sandstab P-EPQ (a product of Sand) and 0.025 g of diethyl 3,5-di-t-butyl-4-hydroxybenzylphosphonate (a product of Ciba-Geigy, Irganox 1222) were added to the reaction mixture, and the obtained mixture was further reacted like in Example A-2 to give a polycarbonate.

The hue, viscosity-average molecular weight, thermal decomposition behavior and hydrolysis behavior thereof are given in Table 1.

Comparative Example A-1

Another polycarbonate was prepared in the same manner as that of Example A-1 except that a known catalyst, i.e., lithium hydroxide as an alkali metal hydroxide was used instead of 2-methylimidazole in an amount of $10^{-3}$ mole % based on the bisphenol A and that neither Sandstab P-EPQ (a product of Sand) nor other stabilizer was added.

Although the obtained polymer had an average molecular weight as high as 28,500, the polymer was pale yellow; the thermal decomposition thereof began at 375° C. and the weight loss to reach 430° C. was 10%. Further, in the hydrolysis test at 90° C. and 100% RH, the retention of the average molecular weight after 30 days was as low as 65.3% and the resulting test sheet was translucent, had many small white spots (partially including voids) all over and was brittle remarkably. These results are given in Table 1.

Comparative Example A-2

Another polycarbonate was prepared in the same manner as that of Comparative Example A-1 except that lithium carbonate as an alkali metal carbonate was used instead of lithium hydroxide in an amount of $10^{-3}$ mole % based on the bisphenol A and that 0.05 of Sandstab P-EPQ (a product of Sand) and 0.025 g of Irganox 1010 (a product of Ciba-Geigy) were added when the relative solution viscosity of the polycondensate reached 0.8.

The obtained polymer was pale-yellow, and the thermal decomposition behavior thereof was somewhat improved but was inferior to those of the polymers prepared in Examples as shown in Table 1. Further, the resistance of the polymer to hydrolysis was not improved at all in respect of the retention of molecular weight or appearance as compared with that of Comparative Example A-1. The hue, viscosity-average molecular weight, thermal decomposition behavior and hydrolysis behavior thereof are given in Table 1.

Comparative Example A-3

Another polycarbonate was prepared in the same manner as that of Comparative Example A-1 except that tetrabutylammonium bromide was used as the catalyst and that only 0.05 g of Irganox 1010 (a product of Ciba-Geigy) was added as a stabilizer when the relative solution viscosity of the polycondensate reached 0.9.

The hue, viscosity-average molecular weight, thermal decomposition behavior and hydrolysis behavior thereof are given in Table 1.

As shown in Table 1, the polycarbonate was not improved in the retention of molecular weight and thermal decomposition behavior, though it was improved in the appearance after the hydrolysis test.

TABLE 1

|  | Ex. A-1 | Ex. A-2 | Ex. A-3 | Ex. A-4 |
|---|---|---|---|---|
| Dihydroxy compound | bisphenol A 22.8 g (0.1 mol %) | bisphenol A 22.8 g (0.1 mol %) | bisphenol A 11.4 g (0.05 mol)/2,2-bis-(4-hydroxy-3-t-butyl)-propane 17.0 g (0.05 mol) | bisphenol A 22.8 g (0.1 mol %) |
| Bisaryl carbonate | diphenyl carbonate 23.0 g (0.108 mol %) | diphenyl carbonate 23.0 g (0.108 mol %) | diphenyl carbonate 23.0 g (0.108 mol %) | bis(2,4,6-trichlorophenyl)carbonate 45.5 g (0.108 mol) |
| Catalyst | 2-methylimidazole $2 \times 10^{-2}$ | 4-dimethylaminopyridine $1 \times 10^{-4}$ | imidazole $1 \times 10^{-3}$ | dimethylaminopyridine $1 \times 10^{-4}$ |
| Tetrakis (2,4-di-t-butylphenyl)-4,4'-biphenylenephosphonite) | 0.05 g | 0.025 g | 0.025 g | 0.025 g |
| Other stabilizer | Irganox 1010 (a product of Ciba-Geigy): 0.025 g | diethyl 3,5-di-t-butyl-4-hydroxybenzylphosphonate (a product of Ciba-Geigy, Irganox 1222): 0.025 g | Irganox 1222 (a product of Ciba-Geigy): 0.025 g | Irganox 1222 (a product of Ciba-Geigy): 0.025 g |
| Rel. soln. viscosity of polycondensate at addition | 1.18 | 1.20 | — | — |
| Hue of polycondensate | nearly colorless | nearly colorless | nearly colorless | nearly colorless |
| Av. mol. wt. of polycondensate Thermogravimetric analysis | 29,900 | 27,500 | 28,600 | 28,600 |

TABLE 1-continued

|  |  |  |  |  |
|---|---|---|---|---|
| $T_d$ | 432° C. | 400° C. | 429° C. | 429° C. |
| $T_5$ | 470° C. | 458° C. | 458° C. | 458° C. |
| $T_{10}$ | 486° C. | 472° C. | 474° C. | 474° C. |
| After hydrolysis for 30 days at 90° C. and 100% RH |  |  |  |  |
| appearance | colorless and transparent | colorless and transparent | colorless and transparent | colorless and transparent |
| retention of mol. wt. | 88.7% | 89.9% | 90.5% | 90.5% |

|  | Ex. A-5 | Comp. Ex. A-1 | Comp. Ex. A-2 | Comp. Ex. A-3 |
|---|---|---|---|---|
| Dihydroxy compound | bisphenol A 22.8 g (0.1 mol %) | bisphenol A 22.8 g (0.1 mol %) | bisphenol A 22.8 g (0.1 mol %) | bisphenol A 22.8 g (0.1 mol %) |
| Bisaryl carbonate | diphenyl carbonate 23.0 g (0.108 mol %) | bisphenyl carbonate 23.0 g (0.108 mol %) | bisphenyl carbonate 23.0 g (0.108 mol %) | bisphenyl carbonate 23.0 g (0.108 mol %) |
| Catalyst | 4-(4-methylpyrrolidinyl)-pyridine $2 \times 10^{-4}$ mol % (based on bisphenol A) | lithium hydroxide $10^{-3}$ mol % (based on bisphenol A) | lithium carbonate $10^{-3}$ mol % (based on bisphenol A) | tetrabutylammonium bromide $10^{-3}$ mol % (based on bisphenol A) |
| Tetrakis (2,4-di-t-butylphenyl)-4,4'-biphenylenephosphonite) | 0.025 g | — | 0.05 g | — |
| Other stabilizer | octadecyl 3-(3',5'-d-t-butyl-4'-hydroxyphenyl)-propionate: 0.025 g | — | Irganox 1010 (a product of Ciba-Geigy): 0.025 g | Irganox 1010 (a product of Ciba-Geigy): 0.025 g |
| Rel. soln. viscosity of polycondensate at addition | 1.02 | — | 0.8 | 0.9 |
| Hue of polycondensate | colorless and transparent | pale-yellow | pale-yellow | pale-yellow |
| Av. mol. wt. of polycondensate | 23,900 | 26,500 | 8,300 | 9,500 |
| Thermogravimetric analysis |  |  |  |  |
| $T_d$ | 420° C. | 375° C. | 306° C. | 310° C. |
| $T_5$ | 460° C. | 414° C. | 360° C. | 383° C. |
| $T_{10}$ | 468° C. | 430° C. | 395° C. | 400° C. |
| After hydrolysis for 30 days at 90° C. and 100% RH |  |  |  |  |
| appearance | colorless and transparent | translucent and many white spots | failure in molding | failure in molding |
| retention of mol. wt. | 89.3% | 65.3% | 70.0% | 68.3% |

Example B-1

228 parts by weight of 2,2-bis(4-hydroxyphenyl)propane, potassium borohydride (in an amount of $10^{-3}$ mole % based on the dihydroxy compound fed) and 214 parts by weight of diphenyl carbonate were fed into a reactor and the contents were stirred at 180° C. in a nitrogen atmosphere for one hour. The temperature of the contents was gradually raised to 250° C., while the pressure of the system was lowered to 2 mmHg. The temperature of the contents was further raised and the resulting mixture was reacted at 280° C. in a vacuum of 0.5 mmHg for 2 hours to give a polycarbonate. This polycarbonate was nearly colorless and transparent and had an intrinsic viscosity [$\eta$] of 0.438 as determined in methylene chloride at 20° C. The average molecular weight $\overline{Mv}$ of the polycarbonate was 24,300 as calculated according to the formula described in

Example A-1.

254 g of the polycarbonate thus obtained was mixed with 0.254 g (0.1% by weight based on the polymer) of bis(2,6-di-t-butyl-4-methylphenyl)pentaerythritol diphosphite on a tumbling blender (mfd. by Matsui Seisakusho, SKB-50) and the obtained mixture was extruded and pelletized by the use of a twin-screw extruder (HAAKE Buchler Product HBI System 90).

The pelletized composition was evaluated for the heat resistance as described in Example A-1. The decomposition-initiating temperature, $T_d$ was 480° C.; the temperature, $T_5$ was 468° C. and the temperature, $T_{10}$ was 481° C.

Further, the composition was also evaluated for the resistance to hydrolysis as described in Example A-1. After the lapse of 30 days under the conditions of 90° C. and 100% RH (relative humidity), the retention of the molecular weight was 88.1% based on the initial molecular weight and the resulting sheet was colorless and transparent and no abnormal phenomenon was observed in respect of the external appearance. These results are given in Table 2.

Example B-2

22.8 g (0.1 mol) of 2,2-bis(4-hydroxyphenyl)propane, 0.164 g ($2 \times 10^{-2}$ mol ) of 2-methylimidazole and 21.4 g (0.1 mol) of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. At this point of time, 0.025 g (0.1% by weight based on the whole polycondensate) of bis(2,6-di-t-butyl-4-methylphenyl)pentaerythritol diphosphite was added into the reactor. At the point of time of this addition, the relative solution viscosity (polymer concentration: 0.5 g/100 ml, 20° C., solvent: methylene chloride) presumed from the stirring torque was 1.17, while the one actually determined by the use of a sample of the polycondensate was 1.18. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [η] of 0.519 as determined in methylene chloride at 20° C. The average molecular weight Mv of the polycarbonate was 29,900 as calculated according to the formula described in

Example A-1.

The hue, viscosity-average molecular weight, thermal decomposition behavior and hydrolysis behavior thereof are given in Table 2.

Example B-3

Another polycarbonate composition was prepared in the same manner as that of Example B-1 except that potassium borohydride was replaced by dimethylamineborane complex (in an amount of $10^{-2}$ mole % based on the dihydroxyl compound fed). The obtained polycarbonate composition was pelletized and evaluated for the resistances to heat and hydrolysis in a similar manner to that of Example B-1. The results are given in Table 2.

Example B-4

114 parts by weight (50 mole %) of 2,2-bis(4-hydroxyphenyl)propane, 170 parts by weight (50 mole %) of 2,2-bis(4-hydroxy-3-t-butylphenyl)propane, 214 parts by weight of diphenyl carbonate and 4-dimethylaminopyridine (in an amount of $10^{-2}$ mole % based on the dihydroxy compound fed) were fed into a reactor. The contents were reacted under the same conditions as those of Example B-1 to give a copolycarbonate. Bis(2,6-di-t-butyl-4-methylphenyl) pentaerythritol diphosphite was added to the copolycarbonate, the copolycarbonate composition thus obtained was pelletized and evaluated for the resistances to heat and hydrolysis in a similar manner to that of Example B-1. The results are given in Table 2.

Example B-5

22.8 g (0.1 mol) of 2,2-bis(4-hydroxyphenyl)propane, 42.1 g (0.1 mol) of bis(2,4,6-trichlorophenyl) carbonate and 0.0122 g ($10^{-4}$ mol) of dimethylaminopyridine were stirred together at 180° C. in a nitrogen atmosphere for one hour. The temperature of the mixture was raised, while gradually lowering the pressure of the system. When the relative solution viscosity reached 1.19, 0.025 g of bis(2,6-di-t-butyl-4-methylphenyl)pentaerythritol diphosphite was added to the mixture, and the obtained mixture was further reacted like in Example B-2.

The hue, viscosity-average molecular weight, thermal decomposition behavior and hydrolysis behavior of the obtained polymer are given in Table 2.

Comparative Example B-1

The polycarbonate prepared in Example B-1 was pelletized without being blended with bis(2,6-di-t-butyl-4-methylphenyl) pentaerythritol diphosphite, and evaluated for the resistances to heat and hydrolysis. The results are given in Table 2.

Comparative Example B-2

Another polycarbonate was prepared in the same manner as that of Example B-2 except that a known catalyst, i.e., lithium hydroxide as an alkali metal hydroxide was used instead of 2-methylimidazole in an amount of $10^{-3}$ mole % based on the 2,2-bis(4-hydroxyphenyl)propane fed and that no bis(2,6-di-t-butyl-4methylphenyl)pentaerythritol diphosphite was added.

Although the obtained polymer had an average molecular weight as high as 26,500, the polymer was pale-yellow; the thermal decomposition thereof began at 375° C. and the weight loss to reach 430° C. was 10% Further, in the hydrolysis test at 90° C. and 100% RH, the retention of the average molecular weight after 30 days was as low as 65.3% and the resulting test sheet was translucent, had many small white spots (partially including voids) all over and was brittle remarkably. These results are given in Table 2.

TABLE 2

|  | Ex. B-1 | Ex. B-2 | Ex. B-3 | Ex. B-4 |
| --- | --- | --- | --- | --- |
| Dihydroxy compound | 2,2-bis(4-hydroxyphenyl)-propane | 2,2-bis(4-hydroxyphenyl)-propane | 2,2-bis(4-hydroxyphenyl)-propane | 2,2-bis(4-hydroxyphenyl)-propane (50 mole %)/2,2-bis(4-hydroxy-3-t-butylphenyl)propane (50 mole %) |
| Bisaryl carbonate | diphenyl carbonate | diphenyl carbonate | diphenyl carbonate | diphenyl carbonate |
| Catalyst | potassium borohydride | 2-methylimidazole | dimethylamine-borane complex | diphenyl carbonate |
| Phosphite compound | bis(2,6-di-t-butyl-4-methylphenyl) pentaerythritol diphosphite | bis(2,6-di-t-butyl-4-methylphenyl)l pentaerythritol diphosphite (rel. soln. visocisty at addn.: 1.18) | bis(2,6-di-t-butyl-4-methylphenyl) pentaerythritol diphosphite | 4-dimethylaminopyridine bis(2,6-di-t-butyl-4-methylphenyl) pentaerythritol diphosphite |
| Hue of polycondensate | nearly colorless | nearly colorless | nearly colorless | nearly colorless |
| Av. mol. wt. of polycondensate | 24,300 | 29,900 | 23,300 | 25,000 |
| Thermogravimetric analysis |  |  |  |  |
| $T_d$ | 430° C. | 432° C. | 430° C. | 430° C. |
| $T_5$ | 468° C. | 470° C. | 467° C. | 469° C. |
| $T_{10}$ | 481° C. | 486° C. | 481° C. | 482° C. |
| After hydrolysis for 30 days at 90° C. and 100% RH |  |  |  |  |
| appearance | colorless and transparent | colorless and transparent | colorless and transparent | colorless and transparent |
| retention of mol. wt. | 88.1% | 88.7% | 88.0% | 91.3% |
|  | Ex. B-5 | Comp. Ex. B-1 | Comp. Ex. B-2 |  |
| Dihydroxy compound | 2,2-bis(4-hydroxyphenyl)- | 2,2-bis(4-hydroxyphenyl)- | 2,2-bis(4-hydroxyphenyl)- |  |

TABLE 2-continued

|  | | | |
|---|---|---|---|
|  | propane | propane | propane |
| Bisaryl carbonate | bis(2,4,6-trichlorophenyl) carbonate | diphenyl carbonate | diphenyl carbonate |
| Catalyst | dimethylaminopyridine | potassium borohydride | lithium hydroxide |
| Phosphite compound | bis(2,6-di-t-butyl-4-methylphenyl)pentaerythritol diphosphite (rel. soln. visocisty at addn.: 1.19) | — | — |
| Hue of polycondensate | nearly colorless | nearly colorless | nearly colorless |
| Av. mol. wt. of polycondensate | 28,000 | 24,300 | 26,500 |
| Thermogravimetric analysis | | | |
| $T_d$ | 432° C. | 380° C. | 375° C. |
| $T_5$ | 470° C. | 415° C. | 414° C. |
| $T_{10}$ | 486° C. | 435° C. | 430° C. |
| After hydrolysis for 30 days at 90° C. and 100% RH | | | |
| appearance | colorless and transparent | translucent | translucent |
| retention of mol. wt. | 88.9% | 68.0% | 65.3% |

Example C-1

228 parts by weight of 2,2-bis(4-hydroxyphenyl)propane, potassium borohydride (in an amount of $10^{-3}$ mole % based on the dihydroxy compound fed) and 214 parts by weight of diphenyl carbonate were fed into a reactor and the contents were stirred at 180° C. in a nitrogen atmosphere for one hour. The temperature of the contents was gradually raised to 250° C., while the pressure of the system was lowered to 2 mmHg. The temperature of the contents was further raised and the resulting mixture was reacted at 280° C. in a vacuum of 0.5 mmHg for 2 hours to give a polycarbonate. This polycarbonate was nearly colorless and transparent and had an intrinsic viscosity [η] of 0.519 as determined in methylene chloride at 20° C. The average molecular weight $\overline{Mv}$ of the polycarbonate was 29,900 as calculated according to the formula described in

Example A-1.

254 g of the polycarbonate thus obtained was mixed with 0.254 g (0.1% by weight based on the polymer) of bis(2,6-di-t-butyl-4-methylphenyl)pentaerythritol diphosphite and 0.254 g (0.1% by weight based on the polymer) of octadecyl 3-(3',5'-di-t-butyl-4'-hydroxyphenyl) propionate on a tumbling blender (mfd. by Matsui Seisakusho, SKB-50) and the obtained mixture was extruded and pelletized by the use of a twin-screw extruder (HAAKE Buchler Product HBI System 90).

The pelletized composition was evaluated for the heat resistance as described in Example A-1. The decomposition-initiating temperature, $T_d$ was 488° C.; the temperature, $T_5$ was 472° C.; and the temperature, $T_{10}$ was 490° C.

Further, the composition was also evaluated for the resistance to hydrolysis as described in Example A-1. After the lapse of 30 days under the conditions of 90° C. and 100% RH (relative humidity), the retention of the molecular weight was 89.8% based on the initial molecular weight and the resulting sheet was colorless and transparent and no abnormal phenomenon was observed in respect of the external appearance.

These results are given in Table 8.

Example C-2

228 parts by weight of 2,2-bis(4-hydroxyphenyl)propane was dissolved in a 0.1N aqueous solution of sodium hydroxide, followed by the addition of 214 parts by weight of diphenyl carbonate and dichloromethane. Phosgene was introduced into the obtained mixture while stirring the mixture vigorously. The obtained viscous solution was separated to recover a dichloromethane solution. This solution was distilled to remove the dichloromethane to obtain a nearly colorless polycarbonate. This polycarbonate was washed with methanol several times, dried and examined for the molecular weight in a similar manner to that of Example C-1. The viscosity-average molecular weight ($\overline{Mv}$) thereof was 28,000. In a similar manner to that of Example C-1, a mixture of the polycarbonate thus obtained with bis(2,6-di-t-butyl-4-methylphenyl)pentaerythritol diphosphite and octadecyl 3-(3', 5'-di-t-butyl-4'-hydroxyphenyl)propionate was pelletized and evaluated for the resistances to heat and hydrolysis. The results are given in Table 3.

Example C-3

Another polycarbonate was prepared in the same manner as that of Example C-1 except that potassium borohydride was replaced by 4-dimethylaminopyridine (in an amount of $10^{-2}$ mole % based on the dihydroxy compound fed). In a similar manner to that of Example C-1, a mixture of the polycarbonate thus obtained with bis(2,6-di-t-butyl-4-methylphenyl)pentaerythritol diphosphite and octadecyl 3-(3', 5'-di-t-butyl-4'-hydroxyphenyl)propionate was pelletized and evaluated for the resistances to heat and hydrolysis. The results are given in Table 3.

Example C-4

A copolycarbonate was prepared in the same manner as that of Example C-1 except that 114 parts by weight (50 mole %) of 2,2-bis(4-hydroxyphenyl)propane and 170 parts by weight (50 mole %) of 2,2-bis(4-hydroxy-3-t-butylphenyl)propane were used instead of 2,2-bis(4-hydroxyphenyl)propane, and that imidazole (in an amount of $10^{-2}$ mole % based on the dihydroxy compound fed) was used instead of potassium borohydride. A mixture of the copolycarbonate thus obtained with bis(2,6-di-t-butyl-4-methylphenyl)pentaerythritol diphosphite and octadecyl 3-(3', 5'-di-t-butyl-4'-hydroxyphenyl)propionate was pelletized and evaluated for the resistances to heat and hydrolysis in a similar manner to that of Example C-1. The results are given in Table 3.

Comparative Example C-1

The polycarbonate prepared in Example C-1 was pelletized without being blended with bis(2,6-di-t-butyl-4-methylphenyl)pentaerythritol diphosphite or octadecyl 3-(3', 5'-di-t-butyl-4'-hydroxyphenyl)propionate, and evaluated for the resistances to heat and hydrolysis. The results are given in Table 3.

The pelletized composition was evaluated for the heat resistance as described in Example A-1. The decomposition-initiating temperature, $T_d$ was 429° C.; the temperature, $T_5$ was 466° C.; and the temperature, $T_{10}$ was 480° C.

Further, the composition was also evaluated for the resistance to hydrolysis as described in Example A-1. After the lapse of 30 days under the conditions of 90° C. and 100% RH (relative humidity), the retention of the molecular weight was 87.8% based on the initial molecular weight and the resulting sheet was colorless and transparent and no abnormal phenomenon was observed with respect to the external appearance.

TABLE 3

| | Ex. C-1 | Ex. C-2 | Ex. C-3 | Ex. C-4 | Comp. Ex. C-1 |
|---|---|---|---|---|---|
| Dihyrdroxy compound | 2,2-bis(4-hydroxyphenyl)propane 254 g | 2,2-bis(4-hydroxyphenyl)propane 254 g | 2,2-bis(4-hydroxyphenyl)propane 254 g | 2,2-bis(4-hydroxyphenyl)propane (50 mole %)/2,2-bis(4-hydroxy-3-t-butylphenyl)propane (50 mole %) 282 g | 2,2-bis(4-hydroxyphenyl)propane 254 g |
| Bis(2,6-di-t-butyl-4-methylphenyl)pentaerythritol diphosphite | 0.254 g (0.1% by wt.) | 0.254 g (0.1% by wt.) | 0.254 g (0.1% by wt.) | 0.282 g (0.1% by wt.) | — |
| Octadecyl 3-(3',5'-di-t-butyl-4'-hydroxyphenyl)propionate | 0.254 g (0.1% by wt.) | 0.254 g (0.1% by wt.) | 0.254 g (0.1% by wt.) | 0.282 g (0.1% by wt.) | — |
| Hue of polycondensate | nearly colorless | nearly colorless | nearly colorless | colorless | nearly colorless |
| Av. mol. wt. of polycondensate | 29,300 | 28,000 | 28,200 | 25,200 | 29,900 |
| Thermogravimetric analysis | | | | | |
| $T_d$ | 433° C. | 432° C. | 433° C. | 420° C. | 375° C. |
| $T_5$ | 472° C. | 472° C. | 472° C. | 464° C. | 414° C. |
| $T_{10}$ | 490° C. | 490° C. | 491° C. | 480° C. | 430° C. |
| After hydrolysis for 30 days at 90° C. and 100% RH | | | | | |
| appearance | colorless and transparent | colorless and transparent | colorless and transparent | colorless and transparent | translucent |
| retention of mol. wt. (%) | 89.8% | 89.5% | 89.6% | 90.2% | 67.3% |

Example D-1

228 parts by weight of 2,2-bis(4-hydroxyphenyl)propane, potassium borohydride (in an amount of $10^{-3}$ mole % based on the dihydroxy compound fed) and 214 parts by weight of diphenyl carbonate were fed into a reactor and the contents were stirred at 180° C. in a nitrogen atmosphere for one hour. The temperature of the contents was gradually raised to 250° C., while the pressure of the system was lowered to 2 mmHg. The temperature of the contents was further raised and the resulting mixture was reacted at 280° C. in a vacuum of 0.5 mmHg for 2 hours to give a polycarbonate. This carbonate was nearly colorless and transparent and had an intrinsic viscosity [η] of 0.438 as determined in methylene chloride at 20° C. The average molecular weight Mv of the polycarbonate was 24,300 as calculated according to the formula described in Example A-1.

254 g of the polycarbonate thus obtained was mixed with 0.254 g (0.14% by weight based on the polymer) of tris(2,4-di-t-butylphenyl)phosphite and 0.254 g (0.1% by weight based on the polymer) of octadecyl 3-(3', 5'-di-t-butyl-4'-hydroxyphenyl)-propionate on a tumbling blender (mfd. by Matusi Seisakusho, SKB-50) and the obtained mixture was extruded and pelletized by the use of a twin-screw extruder (HAAKE Buchler Product HBI System 90).

These results are given in Table 4.

Example D-2

22.8 g (0.1 mol) of 2,2-bis(4-hydroxyphenyl)propane, 0.164 g ($2 \times 10^{-2}$ mol) of 2-methylimidazole and 21.4 g (0.1 mol) of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. At this point of time, tris(2,4-di-t-butylphenyl)-phosphite and octadecyl 3-(3',5'-di-t-butyl-4'-hydroxyphenyl)propionate were added to the reactor each in an amount of 0.025 g (0.1% by weight based on the whole polycondensate). At the point of this addition, the relative solution viscosity (polymer concentration: 0.5 g/100 ml, 20° C., solvent: methylene chloride) presumed from the stirring torque was 1.17, while the one actually determined by the use of a sample of the polycondensate was 1.18. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [η] of 0.492 as determined in methylene chloride at 20° C. The average molecular weight Mv of the polycarbonate was 28,000 as calculated according to the formula described in

Example A-1.

The hue, viscosity-average molecular weight, thermal decomposition behavior and hydrolysis behavior of the obtained polycarbonate are given in Table 4.

Example D-3

Another polycarbonate was prepared in the same manner as that of Example D-1 except that potassium borohydride was replaced by dimethylamine-borane complex (in an amount of $10^{-2}$ mole % based on the dihydroxy compound fed). A mixture of the obtained polycarbonate with tris(2,4-di-t-butylphenyl)phosphite and octadecyl 3-(3′, 5′-di-t-butyl-4′-hydroxyphenyl)propionate was pelletized and evaluated for the resistances to heat and hydrolysis in a similar manner to that of Example D-1. The results are given in Table 4.

Example D-4

114 parts by weight (50 mole %) of 2,2-bis(4-hydroxyphenyl)propane, 170 parts by weight (50 mole %) of 2,2-bis(4-hydroxy-3-t-butylphenyl)propane, 214 parts by weight of diphenyl carbonate and 4-dimethylaminopyridine (in an amount of $10^{-2}$ mole % based on the dihydroxy compound fed) were fed into a reactor. The contents were reacted under the same conditions as those of Example D-1 to give a copolycarbonate. A mixture of the obtained copolycarbonate with tris(2,4-di-t-butylphenyl)-phosphite and octadecyl 3-(3′,5′-di-t-butyl-4′-hydroxyphenyl)propionate was pelletized and evaluated for the resistances to heat and hydrolysis in a similar manner to that of Example D-1. The results are given in Table 4.

Example D-5

22.8 g (0.1 mol) of 2,2-bis(4-hydroxyphenyl)-propane, 42.1 g (0.1 mol) of bis(2,4,6-trichlorophenyl)carbonate and 0.0122 g ($10^{-4}$ mol) of dimethylaminopyridine were stirred together at 180° C. in a nitrogen atmosphere for one hour. The temperature of the mixture was raised, while gradually lowering the pressure of the system. When the relative solution viscosity reached 1.19, tris(2,4-di-t-butylphenyl)phosphite and octadecyl 3-(3′, 5′-di-t-butyl-4′-hydroxyphenyl)propionate were added to the mixture each in an amount of 0.025 g, and the obtained mixture was further reacted like in Example D-2.

The hue, viscosity-average molecular weight, thermal decomposition behavior and hydrolysis behavior of the obtained polymer are given in Table 4.

Comparative Example D-1

The polycarbonate prepared in Example D-1 was pelletized without being blended with tris(2,4-di-t-butylphenyl)phosphite or octadecyl 3-(3′, 5′-di-t- butyl-4′-hydroxyphenyl)propionate, and evaluated for the resistances to heat and hydrolysis. The results are given in Table 4.

Comparative Example D-2

Another polycarbonate was prepared in the same manner as that of Example D-2 except that a known catalyst for comparison, i.e., lithium hydroxide as an alkali metal hydroxide was used in an amount of $10^{-3}$ mole 4 based on the 2,2-bis(4-hydroxyphenyl)propane fed and that neither tris(2,4-di-t-butylphenyl) phosphite nor octadecyl 3-(3′, 5′-di-t-butyl-4′-hydroxyphenyl)propionate was added.

Although the obtained polymer had an average molecular weight as high as 26,500, the polymer was paleyellow; the thermal decomposition thereof began at 375° C. and the weight loss to reach 430° C. was 10%. Further, in the hydrolysis test at 90° C. and 100% RH, the retention of the average molecular weight after 30 days was as low as 65.34 and the resulting test sheet was translucent, had many small white spots (partially including voids) all over and was brittle remarkably. These results are given in Table 4.

TABLE 4

| | Ex. D-1 | Ex. D-2 | Ex. D-3 | Ex. D-4 |
|---|---|---|---|---|
| Dihydroxy compound | 2,2-bis(4-hydroxyphenyl) propane | 2,2-bis(4-hydroxyphenyl) propane | 2,2-bis(4-hydroxyphenyl) propane | 2,2-bis(4-hydroxyphenyl) propane (50 mole %)/2,2-bis(4-hydroxy-3-t-butyl-phenyl)propane (50 mole %) |
| Bisaryl carbonate | diphenyl carbonate | diphenyl carbonate | diphenyl carbonate | diphenyl carbonate |
| Catalyst | potassium borohydride | 2-methylimidazole | dimethylamine-borane complex | 4-dimethylaminopyridine |
| Phosphite compound | tris(2,4-di-t-butylphenyl) phosphite | tris(2,4-di-t-butylphenyl) phosphite | tris(2,4-di-t-butylphenyl) phosphite | tris(2,4-di-t-butylphenyl) phosphite |
| Hindered phenol compound | octadecyl 3-(3′,5′-di-t-butyl-4′-hydroxyphenyl)-propionate | octadecyl 3-(3′,5′-di-t-butyl-4′-hydroxyphenyl)-propionate (rel. soln. viscosity at addn.: 1.18) | octadecyl 3-(3′,5′-di-t-butyl-4′-hydroxyphenyl)-propionate | octadecyl 3-(3′,5′-di-t-butyl-4′-hydroxyphenyl)-propionate |
| Hue of polycondensate | nearly colorless | nearly colorless | nearly colorless | nearly colorless |
| Av. mol. wt. of polycondensate | 24,300 | 28,000 | 24,500 | 25,000 |
| Thermogravimetric analysis | | | | |
| $T_d$ | 429° C. | 430° C. | 430° C. | 430° C. |
| $T_5$ | 466° C. | 468° C. | 467° C. | 469° C. |
| $T_{10}$ | 480° C. | 486° C. | 481° C. | 482° C. |
| After hydrolysis for 30 days at 90° C. and 100% RH | | | | |
| appearance | colorless and transparent | colorless and transparent | colorless and transparent | colorless and transparent |
| retention of mol. wt. | 87.7% | 88.2% | 88.0% | 90.5% |

| | | Ex. D-5 | Comp. Ex. D-1 | Comp. Ex. D-2 |
|---|---|---|---|---|
| | Dihydroxy compound | 2,2-bis(4-hydroxyphenyl) propane | 2,2-bis(4-hydroxyphenyl) propane | 2,2-bis(4-hydroxyphenyl) propane |
| | Bisaryl carbonate | bis(2,4,6-trichlorophenyl) | diphenyl carbonate | diphenyl carbonate |

TABLE 4-continued

| Catalyst | carbonate dimethylaminopyridine | potassium borohydride | lithium hydroxide |
|---|---|---|---|
| Phosphite compound | tris(2,4-di-t-butylphenyl phosphite) | — | — |
| Hindered phenol compound | octadecyl 3-(3',5'-di-t-butyl-4'-hydroxyphenyl)-propionate (rel. soln. viscosity at addn: 1.19) | — | — |
| Hue of polycondensate | nearly colorless | nearly colorless | pale-yellow |
| Av. mol. wt. of polycondensate | 28,000 | 24,300 | 26,500 |
| Thermogravimetric analysis | | | |
| $T_d$ | 432° C. | 380° C. | 375° C. |
| $T_5$ | 470° C. | 415° C. | 414° C. |
| $T_{10}$ | 486° C. | 435° C. | 430° C. |
| After hydrolysis for 30 days at 90° C. and 100% RH | | | |
| appearance | colorless and transparent | translucent | translucent |
| retention of mol. wt. | 88.9% | 68.0% | 65.3% |

Example E-1

228 parts by weight of 2,2-bis(4-hydroxyphenyl)-propane, potassium borohydride (in an amount of $10^{-3}$ mole % based on the dihydroxy compound fed) and 214 parts by weight of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [η] of 0.434 as determined in methylene chloride at 20° C. The average molecular weight $\overline{Mv}$ of the polycarbonate was 24,000 as calculated according to the formula described in

Example A-1.

254 g of the polycarbonate thus prepared was mixed with 0.254 g (0.1% by weight based on the polymer) of tris(2,4-di-t-butylphenyl)phosphite on a tumbling blender (mfd. by Matsui Seisakusho, SKB-50) and the obtained mixture was extruded and pelletized by the use of a twin-screw extruder (HAAKE Buchler Product HBI System 90). The pelletized composition was evaluated for the heat resistance as described in Example A-1. The decomposition-initiating temperature, $T_d$ was 426° C.; the temperature, $T_5$ was 465° C. and the temperature, $T_{10}$ was 478° C.

Further, the above composition was also evaluated for the resistance to hydrolysis as described in Example A-1. After the lapse of 30 days under the conditions of 90° C. and 100% RH (relative humidity), the retention of the molecular weight was 86.83% based on the initial molecular weight and the resulting sheet was colorless and transparent and no abnormal phenomenon was observed with respect to the external appearance.

These results are given in Table 5.

Example E-2

22.8 g (0.1 mol) of 2,2-bis(4-hydroxyphenyl)propane, 0.164 g ($2 \times 10^{-2}$ mol) of 2-methylimidazole and 21.4 g (0.1 mol) of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. At this point of time, 0.025 g (0.14% by weight based on the whole polycondensate) of tris(2,4-di-t-butylphenyl)phosphite was added to the reactor. At the point of time of this addition, the relative solution viscosity (polymer concentration: 0.5 g/100 ml, 20° C., solvent: methylene chloride) presumed from the stirring torque was 1.17, while the one actually determined by the use of a sample of the polycondensate was 1.18. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [η] of 0.489 as determined in methylene chloride at 20° C. The average molecular weight $\overline{Mv}$ of the polycarbonate was 27,800 as calculated according to the formula described in Example A-1.

The hue, viscosity-average molecular weight, thermal decomposition behavior and hydrolysis behavior of the polycarbonate are given in Table 5.

Example E-8

Another polycarbonate was prepared in the same manner as that of Example E-1 except that dimethylamine-borane complex (in an amount of $10^{-2}$ mole based on the dihydroxy compound fed) was used instead of potassium borohydride. In a similar manner to that of Example E-1, a mixture of the polycarbonate thus obtained with tris(2,4-di-t-butyl-phenyl)-phosphite was pelletized and evaluated for the resistances to heat and hydrolysis. The results are given in Table 5.

Example E-4

114 parts by weight (50 mole %) of 2,2-bis(4-hydroxyphenyl)propane, 170 parts by weight (50 mole %) of 2,2-bis(4-hydroxy-3-t-butylphenyl)propane, 214 parts by weight of diphenyl carbonate and 4-dimethylaminopyridine (in an amount of $10^{-2}$ mole % based on the dihydroxy compound fed) were fed into a reactor. The contents were reacted under the same conditions as those of Example E-1 to give a copolycarbonate. In similar manner to that of Example E-1, a mixture of the copolycarbonate thus obtained with tris(2,4-di-t-butylphenyl)phosphite was pelletized and evaluated for the resistances to heat and hydrolysis. The results are given in Table 5.

Example E-5

22.8 g (0.1 mol) of 2,2-bis(4-hydroxyphenyl)propane, 42.1 g (0.1 mol) of bis(2,4,6-trichlorophenyl)carbonate and 0.0122 g ($10^{-4}$ mol) of dimethylaminopyridine were stirred together at 180° C. in a nitrogen atmosphere for one hour. The temperature of the mixture was raised, while gradually lowering the pressure of the system. When the relative solution viscosity reached 1.19, 0.025 g of tris(2,4-di-t-butylphenyl)phosphite was added to the reaction mixture, and the obtained mixture was further reacted like in Example E-2 to give a polycarbonate.

The hue, viscosity-average molecular weight, thermal decomposition behavior and hydrolysis behavior thereof are given in Table 5.

Comparative Example E-2

Another polycarbonate was prepared in the same manner as that of Example E-2 except that a known catalyst for comparison, i.e., lithium hydroxide as an alkali metal hydroxide was used in an amount of $10^{-3}$ mole % based on the 2,2-bis(4-hydroxyphenyl)propane used and that no tris(2,4-di-t-butylphenyl)phosphite was added.

Although the obtained polymer had an average molecular weight as high as 26,500, the polymer was pale-yellow; the thermal decomposition thereof began at 375° C.; and the weight loss to reach 430° C. was 10%. Further, in the hydrolysis test at 90° C. and 100% RH, the retention of the average molecular weight after 30 days was as low as 65.3% and the resulting test sheer was translucent, had many white spots (partially including voids) all over and was brittle remarkably. These results are given in Table 5.

TABLE 5

|  | Ex. E-1 | Ex. E-2 | Ex. E-3 | Ex. E-4 |
|---|---|---|---|---|
| Dihydroxy compound | 2,2-bis(4-hydroxyphenyl)propane | 2,2-bis(4-hydroxyphenyl)propane | 2,2-bis(4-hydroxyphenyl)propane | 2,2-bis(4-hydroxyphenyl)propane (50 mole %)/2,2-bis(4-hydroxy-3-t-butylphenyl)propane (50 mole %) |
| Bisaryl carbonate | diphenyl carbonate | diphenyl carbonate | diphenyl carbonate | diphenyl carbonate |
| Catalyst | potassium borohydride | 2-methylimidazole | dimethylamine-borane complex | 4-dimethylaminopyridine |
| Phosphite compound | tris(2,4-di-t-butylphenyl)phosphite | tris(2,4-di-t-butylphenyl)phosphite (rel. soln. viscosity at addn.: 1.18) | tris(2,4-di-t-butylphenyl)phosphite | tris(2,4-di-t-butylphenyl)phosphite |
| Hue of polycondensate | nearly colorless | nearly colorless | nearly colorless | nearly colorless |
| Av. mol. wt. of polycondensate | 24,000 | 27,800 | 24,000 | 25,000 |
| Thermogravimetric analysis |  |  |  |  |
| $T_d$ | 426° C. | 429° C. | 430° C. | 430° C. |
| $T_5$ | 465° C. | 465° C. | 467° C. | 469° C. |
| $T_{10}$ | 478° C. | 484° C. | 481° C. | 482° C. |
| After hydrolysis for 30 days at 90° C. and 100% RH |  |  |  |  |
| appearance | colorless and transparent | colorless and transparent | colorless and transparent | colorless and transparent |
| retention of mol. wt. | 86.3% | 87.1% | 88.0% | 90.1% |

|  | Ex. E-5 | Comp. Ex. E-1 | Comp. Ex. E-2 |
|---|---|---|---|
| Dihydroxy compound | 2,2-bis(4-hydroxyphenyl)propane | 2,2-bis(4-hydroxyphenyl)propane | 2,2-bis(4-hydroxyphenyl)propane |
| Bisaryl carbonate | bis(2,4,6-trichlorophenyl)carbonate | diphenyl carbonate | diphenyl carbonate |
| Catalyst | dimethylaminopyridine | potassium borohydride | lithium hydroxide |
| Phosphite compound | tris(2,4-di-t-butylphenyl)phosphite (rel. soln. viscosity at addn: 1.19) | — | — |
| Hue of polycondensate | nearly colorless | nearly colorless | pale-yellow |
| Av. mol. wt. of polycondensate | 27,600 | 24,300 | 26,500 |
| Thermogravimetric analysis |  |  |  |
| $T_d$ | 430° C. | 380° C. | 375° C. |
| $T_5$ | 469° C. | 415° C. | 414° C. |
| $T_{10}$ | 484° C. | 435° C. | 430° C. |
| After hydrolysis for 30 days at 90° C. and 100% RH |  |  |  |
| appearance | colorless and transparent | translucent | translucent |
| retention of mol. wt. | 88.7% | 68.0% | 65.3% |

Comparative Example E-1

The polycarbonate prepared in Example E-1 was pelletized without being blended with tris(2,4-di-t-butylphenyl)phosphite and evaluated for the resistances to heat and hydrolysis. The results are given in Table 5.

Example F-1

228 parts by weight of 2,2-bis(4-hydroxyphenyl)-propane, potassium borohydride (in an amount of $10^{-3}$ mole % based on the dihydroxy compound fed) and 214 parts by weight of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [$\eta$] of 0.438 as determined in methylene chloride at 20° C. The average molecular weight $\overline{Mv}$ of the polycarbonate was 24,300 as calculated according to the formula described in

Example A-1.

254 g of the polycarbonate thus prepared was mixed with tris(4-nonylphenyl)phosphite and octadecyl 3-(3',5'-di-t-butyl-4'-hydroxyphenyl)propionate each in an amount of 0.254 g (0.1% by weight based on the polymer) on a tumbling blender (mfd. by Matsui Seisakusho, SKB-50) and the obtained mixture was extruded and pelletized by the use of a twin-screw extruder (HAAKE Buchler Product HBI System 90).

The pelletized composition was evaluated for the heat resistance as described in Example A-1. The decomposition-initiating temperature, $T_d$ was 430° C.; the temperature, $T_5$ was 467° C.; and the temperature, $T_{10}$ was 481° C.

Further, the above composition was also evaluated for the resistance to hydrolysis as described in Example A-1. After the lapse of 30 days under the conditions of 90° C. and 100% RH (relative humidity), the retention of the molecular weight was 88.0% based on the initial molecular weight and the resulting sheet was colorless and transparent and no abnormal phenomenon was observed in respect of the external appearance.

These results are given in Table 6.

Example F-2

22.8 g (0.1 mol) of 2,2-bis(4-hydroxyphenyl)propane, 0.164 g ($2 \times 10^{-2}$ mol) of 2-methylimidazole and 21.4 g (0.1 mol) of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. At this point of time, tris(4-nonylphenyl)phosphite and octadecyl 3-(3',5'-di-t-butyl-4'-hydroxyphenyl)-propionate were added into the reactor each in an amount of 0.025 g (0.1% by weight based on the whole polycondensate). At the point of time of this addition, the relative solution viscosity (polymer concentration: 0.5 g/100 ml, 20° C., solvent: methylene chloride) presumed from the stirring torque was 1.17, while the one actually determined by the use of a sample of the polycondensate was 1.18. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [$\eta$] of 0.519 as determined in methylene chloride at 20° C. The average molecular weight $\overline{Mv}$ of the polycarbonate was 29,900 as calculated according to the formula described in

Example A-1.

The hue, viscosity-average molecular weight, thermal decomposition behavior and hydrolysis behavior of the polycarbonate are given in Table 6.

Example F-3

Another polycarbonate was prepared in the same manner as that of Example F-1 except that dimethylamine-borane complex (in an amount of $10^{-2}$ mole % based on the dihydroxy compound fed) was used instead of potassium borohydride. In a similar manner to that of Example F-1, a mixture of the polycarbonate thus obtained with tris(4-nonylphenyl)phosphite and octadecyl 3-(3', 5'-di-t-butyl-4'-hydroxyphenyl)-propionate was pelletized and evaluated for the resistances to heat and hydrolysis. The results are given in Table 6.

Example F-4

114 parts by weight (50 mole %) of 2,2-bis(4-hydroxyphenyl)propane, 170 parts by weight (50 mole %) of 2,2-bis(4-hydroxy-3-t-butylphenyl)propane, 214 parts by weight of diphenyl carbonate and 4-dimethylaminopyridine (in an amount of $10^{-2}$ mole % based on the dihydroxy compound fed) were fed into a reactor. The contents were reacted under the same conditions as those of Example F-1 to give a copolycarbonate. In a similar manner to that of Example F-1, a mixture of the copolycarbonate thus obtained with tris(4-nonylphenyl)phosphite and octadecyl 3-(3',5'-di-t-butyl-4'-hydroxyphenyl)-propionate was pelletized and evaluated for the resistances to heat and hydrolysis. The results are given in Table 6.

Example F-5

22.8 g (0.1 mol) of 2,2-bis(4-hydroxyphenyl)propane, 42.1 g (0.1 mol) of bis(2,4,6-trichlorophenyl)carbonate and 0.0122 g ($10^{-4}$ mol) of dimethylaminopyridine were stirred together at 180° C. in a nitrogen atmosphere for one hour. The temperature of the mixture was raised, while gradually lowering the pressure of the system. When the relative solution viscosity reached 1.19, tris(4-nonylphenyl)phosphite and octadecyl 3-(3',5'-di-t-butyl-4'-hydroxyphenyl)propionate were added to the reaction mixture each in an amount of 0.025 g, and the obtained mixture was further reacted like in Example F-2 to give a polycarbonate.

The hue, viscosity-average molecular weight, thermal decomposition behavior and hydrolysis behavior thereof are given in Table 6.

Comparative Example F-1

The polycarbonate prepared in Example F-1 was pelletized without being blended with tris(4-nonylphenyl)phosphite or octadecyl 3-(3',5'-di-t-butyl-4'-hydroxyphenyl)propionate and evaluated for the resistances to heat and hydrolysis. The results are given in Table 6.

Comparative Example F-2

Another polycarbonate was prepared in the same manner as that of Example F-2 except that a known catalyst for comparison, i.e., lithium hydroxide as an alkali metal hydroxide was used in an amount of $10^{-3}$ mole % based on the 2,2-bis(4-hydroxyphenyl)propane used and that neither tris(4-nonylphenyl)phosphite nor octadecyl 3-(3', 5'-di-t-butyl-4'-hydroxyphenyl)-propionate was added.

Although the obtained polymer had an average molecular weight as high as 26,500, the polymer was pale-yellow; the thermal decomposition thereof began at 375° C. and the weight loss to reach 430° C. was 10%. Further, in the hydrolysis test at 90° C. and 100% RH, the retention of the average molecular weight after 30 days was as low as 65.3% and the resulting test sheet was translucent, had many white spots (partially including voids) all over and was brittle remarkably. These results are given in Table 6.

ylene chloride at 20° C. The average molecular weight $\overline{Mv}$ of the polycarbonate was 24,300 as calculated according to the formula described in Example A-1.

TABLE 6

|  | Ex. F-1 | Ex. F-2 | Ex. F-3 | Ex. F-4 |
|---|---|---|---|---|
| Dihydroxy compound | 2,2-bis(4-hydroxyphenyl)propane | 2,2-bis(4-hydroxyphenyl)propane | 2,2-bis(4-hydroxyphenyl)propane | 2,2-bis(4-hydroxyphenyl)propane (50 mole %)/2,2-bis(4-hydroxy-3-t-butylphenyl)propane (50 mole %) |
| Bisaryl carbonate | diphenyl carbonate | diphenyl carbonate | diphenyl carbonate | diphenyl carbonate |
| Catalyst | potassium borohydride | 2-methylimidazole | dimethylamine-borane complex | 4-dimethylaminopyridine |
| Phosphite compound | tris(2,4-di-t-butylphenyl) phosphite | tris(2,4-di-t-butylphenyl) phosphite | tris(2,4-di-t-butylphenyl) phosphite | tris(2,4-di-t-butylphenyl) phosphite |
| Hindered phenol compound | octadecyl 3-(3',5'-di-t-butyl-4'-hydroxyphenyl)-propionate | octadecyl 3-(3',5'-di-t-butyl-4'-hydroxyphenyl)-propionate (rel. soln. viscosity at addn.: 1.18) | octadecyl 3-(3',5'-di-t-butyl-4'-hydroxyphenyl)-propionate | octadecyl 3-(3',5'-di-t-butyl-4'-hydroxyphenyl)-propionate |
| Hue of polycondensate | nearly colorless | nearly colorless | nearly colorless | nearly colorless |
| Av. mol. wt. of polycondensate | 24,300 | 29,900 | 23,300 | 25,000 |
| Thermogravimetric analysis |  |  |  |  |
| $T_d$ | 430° C. | 432° C. | 430° C. | 430° C. |
| $T_5$ | 467° C. | 470° C. | 467° C. | 469° C. |
| $T_{10}$ | 480° C. | 486° C. | 481° C. | 482° C. |
| After hydrolysis for 30 days at 90° C. and 100% RH |  |  |  |  |
| appearance | colorless and transparent | colorless and transparent | colorless and transparent | colorless and transparent |
| retention of mol. wt. | 88.0% | 88.6% | 88.0% | 91.3% |

|  | Ex. F-5 | Comp. Ex. F-1 | Comp. Ex. F-2 |
|---|---|---|---|
| Dihydroxy compound | 2,2-bis(4-hydroxyphenyl)propane | 2,2-bis(4-hydroxyphenyl)propane | 2,2-bis(4-hydroxyphenyl)propane |
| Bisaryl carbonate | bis(2,4,6-trichlorophenyl) carbonate | diphenyl carbonate | diphenyl carbonate |
| Catalyst | dimethylaminopyridine | potassium borohydride | lithium hydroxide |
| Phosphite compound | tris(2,4-di-t-butylphenyl phosphite) | — | — |
| Hindered phenol compound | octadecyl 3-(3',5'-di-t-butyl-4'-hydroxyphenyl)-propionate (rel. soln. viscosity at addn: 1.19) | — | — |
| Hue of polycondensate | nearly colorless | nearly colorless | pale-yellow |
| Av. mol. wt. of polycondensate | 28,000 | 24,300 | 26,500 |
| Thermogravimetric analysis |  |  |  |
| $T_d$ | 432° C. | 380° C. | 375° C. |
| $T_5$ | 470° C. | 415° C. | 414° C. |
| $T_{10}$ | 486° C. | 435° C. | 430° C. |
| After hydrolysis for 30 days at 90° C. and 100% RH |  |  |  |
| appearance | colorless and transparent | translucent | translucent |
| retention of mol. wt. | 88.3% | 68.0% | 65.3% |

Example G-1

228 parts by weight of 2,2-bis(4-hydroxyphenyl)propane, potassium borohydride (in an amount of $10^{-3}$ mole % based on the dihydroxy compound fed) and 214 parts by weight of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [η] of 0.438 as determined in methylene chloride at 20° C. The average molecular weight $\overline{Mv}$ of the polycarbonate was 24,300 as calculated according to the formula described in Example A-1.

254 g of the polycarbonate thus prepared was mixed with 0.254 g (0.1% by weight based on the polymer) of tridecyl phosphite on a tumbling blender (mfd. by Matsui Seisakusho, SKB-50) and the obtained mixture was extruded and pelletized by the use of a twin-screw extruder (HAAKE Buchler Product HBI System 90). The pelletized composition was evaluated for the heat resistance as described in Example A-1. The decomposition-initiating temperature, $T_d$ was 425° C.; the temperature, $T_5$ was 458° C.; and the temperature, $T_{10}$ was 471° C.

Further, the above composition was also evaluated for the resistance to hydrolysis as described in Example A-1. After the lapse of 30 days under the conditions of 90° C. and 100% RH (relative humidity), the retention of the molecular weight was 87.9% based on the initial molecular weight and the resulting sheet was colorless and transparent and no abnormal phenomenon was observed in respect of the external appearance.

These results are given in Table 7.

Example G-2

22.8 g (0.1 mol) of 2,2-bis(4-hydroxyphenyl)-propane, 0.164 g ($2 \times 10^{-2}$ mol) of 2-methylimidazole and 21.4 g (0.1 mol) of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. At this point of time, 0.025 g (0.1% by weight based on the whole polycondensate) of tridecyl phosphite was added into the reactor. At the point of time of this addition, the relative solution viscosity (polymer concentration: 0.5 g/100 ml, 20° C., solvent: methylene chloride) presumed from the stirring torque was 1.17, while the one actually determined by the use of a sample of the polycondensate was 1.18. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [$\eta$] of 0.475 as determined in methylene chloride at 20° C. The average molecular weight $\overline{Mv}$ of the polycondensate was 28,800 as calculated according to the formula described in

Example A-1.

The hue, viscosity-average molecular weight, thermal decomposition behavior and hydrolysis behavior of the polycarbonate are given in Table 7.

Example G-3

Another polycarbonate was prepared in the same manner as that of Example G-1 except that dimethylamine-borane complex (in an amount of $10^{-2}$ mole % based on the dihydroxy compound fed) was used instead of potassium borohydride. In a similar manner to that of Example G-1, a mixture of the polycarbonate thus obtained with tridecyl phosphite was pelletized and evaluated for the resistances to heat and hydrolysis. The results are given in Table 7.

Example G-4

114 parts by weight (50 mole %) of 2,2-bis(4hydroxyphenyl)propane, 170 parts by weight (50 mole %) of 2,2-bis(4-hydroxy-3-t-butylphenyl)propane, 214 parts by weight of diphenyl carbonate and 4-dimethylaminopyridine (in an amount of $10^{-2}$ mole % based on the dihydroxy compound fed) were fed into a reactor. The contents were reacted under the same conditions as those of Example G-1 to give a copolycarbonate. In a similar manner to that of Example G-1, a mixture of the copolycarbonate thus obtained with tridecyl phosphite was pelletized and evaluated for the resistances to heat and hydrolysis. The results are given in Table 7.

Example G-5

22.8 g (0.1 mol) of 2,2-bis(4-hydroxyphenyl)-propane, 42.1 g (0.1 mol) of bis(2,4,6-trichlorophenyl)carbonate and 0.0122 g ($10^{-4}$ mol) of dimethylaminopyridine were stirred together at 180° C. in a nitrogen atmosphere for one hour. The temperature of the mixture was raised, while gradually lowering the pressure of the system. When the relative solution viscosity reached 1.19, 0.025 g of tridecyl phosphite was added to the reaction mixture, and the obtained mixture was further reacted like in Example G-2 to give a polycarbonate.

The hue, viscosity-average molecular weight, thermal decomposition behavior and hydrolysis behavior thereof are given in Table 7.

Comparative Example G-1

The polycarbonate prepared in Example G-1 was pelletized without being blended with tridecyl phosphite and evaluated for the resistances to heat and hydrolysis. The results are given in Table 7.

Comparative Example G-2

Another polycarbonate was prepared in the same manner as that of Example G-2 except that a known catalyst for comparison, i.e., lithium hydroxide as an alkali metal hydroxide was used in an amount of $10^{-3}$ mole % based on the 2,2-bis(4-hydroxyphenyl)propane used and that no tridecyl phosphite was added.

Although the obtained polymer had an average molecular weight as high as 26,500, the polymer was pale-yellow; the thermal decomposition thereof began at 375° C.; and the weight loss to reach 430° C. was Further, in the hydrolysis test at 90° C. and 100% RH, the retention of the average molecular weight after 30 days was as low as 65.3% and the resulting test sheet was translucent, had many white spots (partially including voids) all over and was brittle remarkably. These results are given in Table 7.

TABLE 7

| | Ex. G-1 | Ex. G-2 | Ex. G-3 | Ex. G-4 |
|---|---|---|---|---|
| Dihydroxy compound | 2,2-bis(4-hydroxyphenyl)-propane | 2,2-bis(4-hydroxyphenyl)-propane | 2,2-bis(4-hydroxyphenyl)-propane | 2,2-bis(4-hydroxyphenyl)-propane (50 mole %)/2,2-bis(4-hydroxy-3-t-butyl-phenyl)propane (50 mole %). |
| Bisaryl carbonate | diphenyl carbonate | diphenyl carbonate | diphenyl carbonate | diphenyl carbonate |
| Catalyst | potassium borohydride | 2-methylimidazole | dimethylamine-borane complex | 4-dimethylaminopyridine |
| Phosphite compound | tridecyl phosphite | " (rel. soln. viscosity at addn.: 1.18) | " | " |
| Hue of polycondensate | nearly colorless | nearly colorless | nearly colorless | nearly colorless |
| Av. mol. wt. of polycondensate | 24,300 | 26,800 | 23,300 | 25,000 |
| Thermogravimetric analysis | | | | |
| $T_d$ | 425° C. | 428° C. | 425° C. | 428° C. |
| $T_5$ | 458° C. | 460° C. | 458° C. | 460° C. |
| $T_{10}$ | 471° C. | 475° C. | 470° C. | 473° C. |

TABLE 7-continued

| | | | | |
|---|---|---|---|---|
| After hydrolysis for 30 days at 90° C. and 100% RH | | | | |
| appearance | colorless and transparent | colorless and transparent | colorless and transparent | colorless and transparent |
| retention of mol. wt. | 87.9% | 88.0% | 87.6% | 90.2% |

| | | Ex. G-5 | Comp. Ex. G-1 | Comp. Ex. G-2 |
|---|---|---|---|---|
| | Dihydroxy compound | 2,2-bis(4-hydroxyphenyl)-propane | 2,2-bis(4-hydroxyphenyl)-propane | 2,2-bis(4-hydroxyphenyl)-propane |
| | Bisaryl carbonate | bis(2,4,6-trichlorophenyl) carbonate | diphenyl carbonate | diphenyl carbonate |
| | Catalyst | dimethylaminopyridine | potassium borohydride | lithium hydroxide |
| | Phosphite compound | tridecyl phosphite (rel. soln. viscosity at addn: 1.19) | — | — |
| | Hue of polycondensate | nearly colorless | nearly colorless | pale-yellow |
| | Av. mol. wt. of polycondensate | 28,000 | 24,300 | 26,500 |
| Thermogravimetric analysis | | | | |
| | $T_d$ | 429° C. | 380° C. | 375° C. |
| | $T_5$ | 462° C. | 415° C. | 414° C. |
| | $T_{10}$ | 476° C. | 435° C. | 430° C. |
| After hydrolysis for 30 days at 90° C. and 100% RH | | | | |
| | appearance | colorless and transparent | translucent | translucent |
| | retention of mol. wt. | 88.9% | 68.0% | 65.3% |

Example H-1

228 parts by weight of 2,2-bis(4-hydroxyphenyl)-propane, potassium borohydride (in an amount of $10^{-3}$ mole % based on the dihydroxy compound fed) and 214 parts by weight of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [η] of 0.438 as determined in methylene chloride at 20° C. The average molecular weight $\overline{Mv}$ of the polycarbonate was 24,300 as calculated according to the formula described in

Example A-1.

254 g of the polycarbonate thus prepared was mixed with 0.254 g (0.1% by weight based on the polymer) of tris(4-nonylphenyl)phosphite on a tumbling blender (mfd. by Matsui Seisakusho, SKB-50) and the obtained mixture was extruded and pelletized by the use of a twin-screw extruder (HAAKE Buchler Product HBI System 90).

The pelletized composition was evaluated for the heat resistance as described in Example A-1. The decomposition-initiating temperature, $T_d$ was 480° C.; the temperature, $T_5$ was 466° C.; and the temperature, $T_{10}$ was 478° C.

Further, the above composition was also evaluated for the resistance to hydrolysis as described in Example A-1. After the lapse of 30 days under the conditions of 90° C. and 100% RH (relative humidity), the retention of the molecular weight was 86.2% based on the initial molecular weight and the resulting sheet was colorless and transparent and no abnormal phenomenon was observed in respect of the external appearance.

These results are given in Table 8.

Example H-2

22.8 g (0.1 mol) of 2,2-bis(4-hydroxyphenyl)-propane, 0.164 g ($2 \times 10^{-2}$ mol) of 2-methylimidazole and 21.4 g (0.1 mol) of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. At this point of time, 0.025 g (0.1% by weight based on the whole polycondensate) of tris(4-nonylphenyl)-phosphite phosphite was added to the reactor. At the point of time of this addition, the relative solution viscosity (polymer concentration: 0.5 g/100 ml, 20° C., solvent: methylene chloride) presumed from the stirring torque was 1.17, while the one actually determined by the use of a sample of the polycondensate was 1.18. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [η] of 0.519 as determined in methylene chloride at 20° C. The average molecular weight $\overline{Mv}$ of the polycarbonate was 27,000 as calculated according to the formula described in

Example A-1.

The hue, viscosity-average molecular weight, thermal decomposition behavior and hydrolysis behavior of the polycarbonate are given in Table 8.

Example H-3

Another polycarbonate was prepared in the same manner as that of Example H-1 except that dimethylamine-borane complex (in an amount of $10^{-2}$ mole % based on the dihydroxy compound fed) was used instead of potassium borohydride. In a similar manner to that of Example H-1, a mixture of the polycarbonate thus obtained with tris(4-nonylphenyl)phosphite was pelletized and evaluated for the resistances to heat and hydrolysis. The results are given in Table 8.

Example H-4

114 parts by weight (50 mole %) of 2,2-bis(4hydroxyphenyl)propane, 170 parts by weight (50 mole %) of 2,2-bis(4-hydroxy-3-t-butylphenyl)propane, 214 parts by weight of diphenyl carbonate and 4-dimethylaminopyridine (in an amount of $10^{-2}$ mole % based on the dihydroxy compound fed) were fed into a reactor. The contents were reacted under the same conditions as those of Example H-1 to give a copolycarbonate. In a similar manner to that of Example H-1, a mixture of the copolycarbonate thus obtained with tris(4-nonylphenyl)phosphite was pelletized and evaluated for the resistances to heat and hydrolysis. The results are given in Table 8.

Example H-5

22.8 g (0.1 mol) of 2,2-bis(4-hydroxyphenyl)-propane, 42.1 g (0.1 mol) of bis(2,4,6-trichlorophenyl)carbonate and 0.0122 g ($10^{-4}$ mol) of dimethylaminopyridine were stirred together at 180° C. in a nitrogen atmosphere for one hour. The temperature of the mixture was raised, while gradually lowering the pressure of the system. When the relative solution viscosity reached 1.19, 0.025 g of tris(4-nonylphenyl)phosphite was added to the reaction mixture, and the obtained mixture was further reacted like in Example H-2 to give a polycarbonate.

The hue, viscosity-average molecular weight, thermal decomposition behavior and hydrolysis behavior thereof are given in Table 8.

Comparative Example H-1

The polycarbonate prepared in Example H-1 was pelletized without being blended with tris-(4-nonylphenyl)phosphite and evaluated for the resistances to heat and hydrolysis. The results are given in Table 8.

Comparative Example H-2

Another polycarbonate was prepared in the same manner as that of Example H-2 except that a known catalyst for comparison, i.e., lithium hydroxide as an alkali metal hydroxide was used instead of 2-methylimidazole in an amount of $10^{-3}$ mole % based on 2,2-bis(4-hydroxyphenyl)propane used and that no tris(4-nonylphenyl)phosphite was added.

Although the obtained polymer had an average molecular weight as high as 28,500, the polymer was pale-yellow; the thermal decomposition thereof began at 375° C.; and the weight loss to reach 430° C. was 10%. Further, in the hydrolysis test at 90° C. and 100% RH, the retention of the average molecular weight after 30 days was as low as 65.3% and the resulting test sheet was translucent, had many white spots (partially including voids) all over and was brittle remarkably. These results are given in Table 8.

TABLE 8

| | Ex. H-1 | Ex. H-2 | Ex. H-3 | Ex. H-4 |
|---|---|---|---|---|
| Dihydroxy compound | 2,2-bis(4-hydroxyphenyl)-propane | 2,2-bis(4-hydroxyphenyl)-propane | 2,2-bis(4-hydroxyphenyl)-propane | 2,2-bis(4-hydroxyphenyl)-propane (50 mole %)/2,2-bis(4-hydroxy-3-t-butylphenyl)propane (50 mole %) |
| Bisaryl carbonate | diphenyl carbonate | diphenyl carbonate | diphenyl carbonate | diphenyl carbonate |
| Catalyst | potassium borohydride | 2-methylimidazole | dimethylamine-borane complex | 4-dimethylaminopyridine |
| Phosphite compound | tris(4-nonylphenyl) phosphite | " (rel. soln. viscosity at addn.: 1.18) | " | " |
| Hue of polycondensate | nearly colorless | nearly colorless | nearly colorless | nearly colorless |
| Av. mol. wt. of polycondensate | 24,300 | 27,000 | 23,300 | 25,000 |
| Thermogravimetric analysis | | | | |
| $T_d$ | 430° C. | 432° C. | 430° C. | 430° C. |
| $T_5$ | 466° C. | 470° C. | 465° C. | 469° C. |
| $T_{10}$ | 478° C. | 486° C. | 477° C. | 482° C. |
| After hydrolysis for 30 days at 90° C. and 100% RH | | | | |
| appearance | colorless and transparent | colorless and transparent | colorless and transparent | colorless and transparent |
| retention of mol. wt. | 86.2% | 87.8% | 87.0% | 88.0% |

| | | Ex. H-5 | Comp. Ex. H-1 | Comp. Ex. H-2 |
|---|---|---|---|---|
| | Dihydroxy compound | 2,2-bis(4-hydroxyphenyl)-propane | 2,2-bis(4-hydroxyphenyl)-propane | 2,2-bis(4-hydroxyphenyl)-propane |
| | Bisaryl carbonate | bis(2,4,6-trichlorophenyl)carbonate | diphenyl carbonate | diphenyl carbonate |
| | Catalyst | dimethylaminopyridine | potassium borohydride | lithium hydroxide |
| | Phosphite compound | tris(4-nonylphenyl) phosphite (rel. soln. viscosity at addn: 1.19) | — | — |
| | Hue of polycondensate | nearly colorless | nearly colorless | pale-yellow |
| | Av. mol. wt. of polycondensate | 26,800 | 24,300 | 26,500 |
| | Thermogravimetric analysis | | | |
| | $T_d$ | 432° C. | 380° C. | 375° C. |
| | $T_5$ | 470° C. | 415° C. | 414° C. |
| | $T_{10}$ | 486° C. | 435° C. | 430° C. |
| | After hydrolysis for | | | |

TABLE 8-continued

| 30 days at 90° C. and 100% RH | | | |
|---|---|---|---|
| appearance | colorless and transparent | translucent | translucent |
| retention of mol. wt. | 88.0% | 68.0% | 65.3% |

Example I-1

228 parts by weight of 2,2-bis(4-hydroxyphenyl)-propane, potassium borohydride (in an amount of $10^{-3}$ mole % based on the dihydroxy compound fed) and 214 parts by weight of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [$\eta$] of 0.438 as determined in methylene chloride at 20° C. The average molecular weight $\overline{Mv}$ of the polycarbonate was 24,300 as calculated according to the formula described in

Example A-1.

254 g of the polycarbonate thus obtained was mixed with 0.254 g (0.1% by weight based on the polymer) of tridecyl phosphite and 0.254 g of octadecyl 3-(3′,5′-di-t-butyl-4′-hydroxyphenyl) propionate on a tumbling blender (mfd. by Matsui Seisakusho, SKB-50) and the obtained mixture was extruded and pelletized by the use of a twin-screw extruder (HAAKE Buchler Product HBI System 90).

The pelletized composition was evaluated for the heat resistance as described in Example A-1. The decomposition-initiating temperature, $T_d$ was 429° C.; the temperature, $T_5$ was 463° C.; and the temperature, $T_{10}$ was 470° C.

Further, the polycarbonate composition was also evaluated for the resistance to hydrolysis as described in Example A-1. After the lapse of 30 days under the conditions of 90° C. and 100% RH (relative humidity), the retention of the molecular weight was 86.7% based on the initial molecular weight and the resulting sheet was colorless and transparent and no abnormal phenomenon was observed in respect of the external appearance.

These results are given in Table 9.

Example I-2

22.8 g (0.1 mol) of 2,2-bis(4-hydroxyphenyl)-propane, 0.164 g ($2 \times 10^{-2}$ mol) of 2-methylimidazole and 21.4 g (0.1 mol) of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. At this point of time, tridecyl phosphite and octadecyl 3-(3′,5′-di-t-butyl-4′-hydroxyphenyl)propionate were added into the reactor each in an amount of 0.025 g (0.1% by weight based on the whole polycondensate). At the point of time of this addition, the relative solution viscosity (polymer concentration: 0.5 g/100 ml, 20° C., solvent: methylene chloride) presumed from the stirring torque was 1.17, while the one actually determined by the use of a sample of the polycondensate was 1.18. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [$\eta$] of 0.478 as determined in methylene chloride at 20° C. The average molecular weight $\overline{Mv}$ of the polycarbonate was 27,000 as calculated according to the formula described in

Example A-1.

The hue, viscosity-average molecular weight, thermal decomposition behavior and hydrolysis behavior of the obtained polymer are given in the Table 9.

Example I-8

Another polycarbonate was prepared in a similar manner to that of Example I-1 except that dimethylamine-borane complex (in an amount of $10^{-2}$ mole % based on the dihydroxy compound fed) was added instead of potassium borohydride. In a similar manner to that of Example I-1, a mixture of the obtained polycarbonate with tridecyl phosphite and octadecyl 3-(3′,5′-di-t-butyl-4′-hydroxyphenyl) propionate was pelletized and evaluated for the resistances to heat and hydrolysis. The results are given in Table 9.

Example I-4

114 parts by weight (50 mole %) of 2,2-bis(4-hydroxyphenyl)propane, 170 parts by weight (50 mole %) of 2,2-bis(4-hydroxy-3-t-butylphenyl)propane, 214 parts by weight of diphenyl carbonate and 4-dimethylaminopyridine (in an amount of $10^{-2}$ mole % based on the dihydroxy compound fed) were reacted under the same conditions as those of Example I-1 to give a copolycarbonate. In a similar manner to that of Example I-1, a mixture of the obtained copolycarbonate with tridecyl phosphite and octadecyl 3-(3′,5′-di-t-butyl-4′-hydroxyphenyl)propionate was pelletized and evaluated for the resistances to heat and hydrolysis. The results are given in the Table 9.

Example I-5

22.8 g (0.1 mol) of 2,2-bis(4-hydroxyphenyl)-propane, 42.1 g (0.1 mol) of bis(2,4,6-trichlorophenyl)carbonate and 0.0122 g ($10^{-4}$ mol) of dimethylaminopyridine were stirred together in a nitrogen atmosphere at 180° C. for one hour. Thereafter the temperature of the mixture was gradually raised while lowering the pressure of the system. When the relative solution viscosity reached 1.19, tridecyl phosphite and octadecyl 3-(3′,5′-di-t-butyl-4′-hydroxyphenyl)propionate were added to the reaction mixture each in an amount of 0.025 g, and the obtained mixture was further reacted like in Example I-2.

The hue, viscosity-average molecular weight, thermal decomposition behavior and hydrolysis behavior of the obtained polymer are given in the Table 9.

Comparative Example I-1

The polycarbonate prepared in Example I-1 was pelletized without being blended with tridecyl phosphite or octadecyl 3-(3′,5′-di-t-butyl-4′-hydroxyphenyl)- propionate and evaluated for the resistances to heat and hydrolysis. The results are given in Table 9.

including voids) all over and was brittle remarkably. These results are given in Table 9.

TABLE 9

|  | Ex. I-1 | Ex. I-2 | Ex. I-3 | Ex. I-4 |
|---|---|---|---|---|
| Dihydroxy compound | 2,2-bis(4-hydroxyphenyl)-propane | 2,2-bis(4-hydroxyphenyl)-propane | 2,2-bis(4-hydroxyphenyl)-propane | 2,2-bis(4-hydroxyphenyl)-propane (50 mole %) 2,2-bis(4-hydroxy-3-t-butyl-phenyl)propane (50 mole %) |
| Bisaryl carbonate | diphenyl carbonate | diphenyl carbonate | diphenyl carbonate | diphenyl carbonate |
| Catalyst | potassium borohydride | 2-methylimidazole | dimethylamineborane complex | 4-dimethylaminopyridine |
| Phosphite compound | tridecyl phosphite | " | " | " |
| Hindered phenol compound | octadecyl 3-(3',5'-di-t-butyl-4'-hydroxyphenyl)-propionate | " (rel. soln. viscosity at addn.: 1.18) | " | " |
| Hue of polycondensate | nearly colorless | nearly colorless | nearly colorless | nearly colorless |
| Av. mol. wt. of polycondensate | 24,300 | 27,000 | 23,300 | 25,000 |
| Thermogravimetric analysis |  |  |  |  |
| $T_d$ | 429° C. | 430° C. | 429° C. | 430° C. |
| $T_5$ | 463° C. | 468° C. | 463° C. | 468° C. |
| $T_{10}$ | 470° C. | 482° C. | 470° C. | 482° C. |
| After hydrolysis for 30 days at 90° C. and 100% RH |  |  |  |  |
| appearance | colorless and transparent | colorless and transparent | colorless and transparent | colorless and transparent |
| retention of mol. wt. | 86.7% | 87.6% | 87.0% | 90.2% |

|  | Ex. I-5 | Comp. Ex. I-1 | Comp. Ex. I-2 |
|---|---|---|---|
| Dihydroxy compound | 2,2-bis(4-hydroxyphenyl)-propane | 2,2-bis(4-hydroxyphenyl)-propane | 2,2-bis(4-hydroxyphenyl)-propane |
| Bisaryl carbonate | bis(2,4,6-trichlorophenyl) carbonate | diphenyl carbonate | diphenyl carbonate |
| Catalyst | dimethylaminopyridine | potassium borohydride | lithium hydroxide |
| Phosphite compound | tridecyl phosphite | — | — |
| Hindered phenol compound | octadecyl 3-(3',5'-di-t-butyl-4'-hydroxyphenyl)-propionate (rel. soln. viscosity at addn.: 1.19) | — | — |
| Hue of polycondensate | nearly colorless | nearly colorless | pale-yellow |
| Av. mol. wt. of polycondensate | 28,000 | 24,300 | 26,500 |
| Thermogravimetric analysis |  |  |  |
| $T_d$ | 432° C. | 380° C. | 375° C. |
| $T_5$ | 468° C. | 415° C. | 414° C. |
| $T_{10}$ | 482° C. | 435° C. | 430° C. |
| After hydrolysis for 30 days at 90° C. and 100% RH |  |  |  |
| appearance | colorless and transparent | translucent | translucent |
| retention of mol. wt. | 87.8% | 68.0% | 65.3% |

Comparative Example I-2

Another polycarbonate was prepared in the same manner as that of Example I-2 except that a known catalyst for comparison, i.e., lithium hydroxide as an alkali metal hydroxide was used instead of 2-methylimidazole in an amount of $10^{-3}$ mole % based on the 2,2-bis(4-hydroxyphenyl)propane and that neither tridecyl phosphite nor octadecyl 3-(3',5'-di-t-butyl-4'-hydroxyphenyl)propionate was added.

Although the obtained polymer had an average molecular weight as high as 28,500, the polymer was pale-yellow; the thermal decomposition thereof began at 375° C. and the weight loss to reach 430° C. was 10%. Further, in the hydrolysis test at 90° C. and 100% RH, the retention of the average molecular weight after 30 days was as low as 65.3% and the resulting test sheet was translucent, had many small white spots (partially Example J-1

228 parts by weight of 2,2-bis(4-hydroxyphenyl)-propane, potassium borohydride (in an amount of $10^{-3}$ mole % based on the dihydroxy compound fed) and 214 parts by weight of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [$\eta$] of 0.438 as determined in methylene chloride at 20° C. The average molecular weight $\overline{Mv}$ of the polycarbonate was 24,300 as calculated according to the formula described in

Example A-1.

254 g of the polycarbonate thus obtained was mixed with 0.254 g (0.1% by weight based on the polymer) of tetrakis(2,4-di-t-butylphenyl)-4,4'-biphenylenediphosphonite on a tumbling blender (mfd. by Matsui Seisakusho, SKB-50) and the obtained mixture was extruded and pelletized by the use of a twin-screw extruder (HAAKE Buchler Product HBI System 90). The pelletized composition was evaluated for the heat resistance as described in Example A-1. The decomposition-initiating temperature, $T_d$ was 430° C.; the temperature, $T_5$ was 465° C.; and the temperature, $T_{10}$ was 478° C.

Further, the polycarbonate composition was also evaluated for the resistance to hydrolysis as described in Example A-1. After the lapse of 30 days under the conditions of 90° C. and 100% RH (relative humidity), the retention of the molecular weight was 87.1% based on the initial molecular weight and the resulting sheet was colorless and transparent and no abnormal phenomenon was observed in respect of the external appearance.

These results are given in Table 10.

Example J-2

22.8 g (0.1 mol) of 2,2-bis(4-hydroxyphenyl)-propane, 0.164 g ($2 \times 10^{-2}$ mol) of 2-methylimidazole and 21.4 g (0.1 mol) of diphenyl carbonate were fed into a reactor. The contents were stirred at 180° C. in a nitrogen atmosphere for one hour. The temperature of the contents was gradually raised to 280° C., while the pressure of the system was lowered to 2 mmHg. At this point of time, 0.025 g (0.1% by weight of the whole polycondensate) of tetrakis(2,4-di-t-butyl)-4,4'-biphenylenephosphonite added to the reactor. At the point of time of this addition, the relative solution viscosity (polymer concentration: 0.5 g/100 ml, 20° C., solvent: methylene chloride) presumed from the stirring torque was 1.17, while the one actually determined by the use of a sample of the polycondensate was 1.18. The temperature of the contents was further raised and the contents were reacted at 280° C. in a vacuum of 0.5 mmHg for 2 hours to give a polycarbonate. This polycarbonate was nearly colorless and transparent and had an intrinsic viscosity $[\eta]$ of 0.492 as determined in methylene chloride at 20° C. The average molecular weight $\overline{Mv}$ of the polycarbonate was 28,000 as calculated according to the formula described in Example A-1.

The hue, viscosity-average molecular weight, thermal decomposition behavior and hydrolysis behavior of the obtained polymer are given in the Table 10.

Example J-3

Another polycarbonate was prepared in a similar manner to that of the Example J-1 except that dimethylamine-borane complex (in an amount of $10^{-2}$ mole % based on the dihydroxy compound fed) was added instead of potassium borohydride. In a similar manner to that of the Example J-1, a mixture of the obtained polycarbonate with tetrakis(2,4-di-t-butyl)-4,4'-biphenylenediphosphonite was pelletized and evaluated for the resistances to heat and hydrolysis. The results are given in Table 10.

Example J-4

114 parts by weight (50 mole %) of 2,2-bis(4-hydroxyphenyl)-propane, 170 parts by weight (50 mole %) of 2,2-bis(4-hydroxy-3-t-butylphenyl)propane, 214 parts by weight of diphenyl carbonate and 4-dimethylaminopyridine (in an amount of $10^{-2}$ mole % based on the dihydroxy compound fed) were fed into a reactor. The contents were reacted under the same conditions as those of Example J-1 to give a copolycarbonate. In a similar manner to that of Example J-1, a mixture of the obtained copolycarbonate with tetrakis(2,4-di-t-butyl)-4,4'-biphenylenediphosphonite was pelletized and evaluated for the resistances to heat and hydrolysis. The results are given in Table 10.

Example J-5

22.8 g (0.1 mol) of 2,2-bis(4-hydroxyphenyl)-propane, 42.1 g (0.1 mol) of bis(2,4,6-trichlorophenyl)carbonate and 0.0122 g ($10^{-4}$ mol) of dimethylaminopyridine were stirred together in a nitrogen atmosphere at 180° C. for one hour. Thereafter, the temperature of the mixture was gradually raised while lowering the pressure of the system. When the relative solution viscosity reached 1.19, 0.025 g of tetrakis(2,4-di-t-butylphenyl)-4,4'-biphenylenediphosphonite was added to the reaction mixture, and the obtained mixture was further reacted like in Example J-2.

The hue, viscosity-average molecular weight, thermal decomposition behavior and hydrolysis behavior of the obtained polymer are given in the Table 10.

Comparative Example J-1

The polycarbonate prepared in Example J-1 was pelletized without being blended with tetrakis(2,4-di-t-butylphenyl)-4,4'-biphenylenediphosphonite, and evaluated for the resistances to heat and hydrolysis. The results are given in Table 10.

Comparative Example J-2

Another polycarbonate was prepared in the same manner as that of Example J-2 except that a known catalyst for comparison i.e., lithium hydroxide as an alkali metal hydroxide was used instead of 2-methylimidazole in an amount of $10^{-3}$ mole % based on the 2,2-bis(4-hydroxyphenyl)propane and that no tetrakis(2,4-di-t-butylphenyl)-4,4'-biphenylenediphosphonite was added.

Although the obtained polymer had an average molecular weight as high as 26,500, the polymer was pale-yellow; the thermal decomposition thereof began at 375° C. and the weight loss to reach 430° C. was 10%. Further, in the hydrolysis test at 90° C. and 100% RH, the retention of the average molecular weight after 30 days was as low as 65.3% and the resulting test sheet was translucent, had many small white spots (partially including voids) all over and was brittle remarkably. These results are given in the Table 10.

TABLE 10

|  | Ex. J-1 | Ex. J-2 | Ex. J-3 | Ex. J-4 |
|---|---|---|---|---|
| Dihydroxy compound | 2,2-bis(4-hydroxyphenyl)-propane | 2,2-bis(4-hydroxyphenyl)-propane | 2,2-bis(4-hydroxyphenyl)-propane | 2,2-bis(4-hydroxyphenyl)-propane (50 mole %)/2,2-bis(4-hydroxy-3-t-butylphenyl)propane (50 mole %) |
| Bisaryl carbonate | diphenyl carbonate | diphenyl carbonate | diphenyl carbonate | diphenyl carbonate |
| Catalyst | potassium borohydride | 2-methylimidazole | dimethylamine-borane | 4-dimethylaminopyridine |

TABLE 10-continued

| | | complex | | |
|---|---|---|---|---|
| Phosphonite compound | tetrakis(2,4-di-t-butylphenyl)-4,4'-biphenylenediphosphonite | " (rel. soln. viscosity at addn.: 1.18) | " | " |
| Hue of polycondensate | nearly colorless | nearly colorless | nearly colorless | nearly colorless |
| Av. mol. wt. of polycondensate | 24,300 | 28,000 | 23,300 | 25,000 |
| Thermogravimetric analysis | | | | |
| $T_d$ | 430° C. | 432° C. | 430° C. | 430° C. |
| $T_5$ | 465° C. | 470° C. | 467° C. | 469° C. |
| $T_{10}$ | 478° C. | 486° C. | 481° C. | 482° C. |
| After hydrolysis for 30 days at 90° C. and 100% RH | | | | |
| appearance | colorless and transparent | colorless and transparent | colorless and transparent | colorless and transparent |
| retention of mol. wt. | 87.1% | 88.7% | 88.0% | 91.3% |

| | | Ex. J-5 | Comp. Ex. J-1 | Comp. Ex. J-2 |
|---|---|---|---|---|
| | Dihydroxy compound | 2,2-bis(4-hydroxyphenyl)-propane | 2,2-bis(4-hydroxyphenyl)-propane | 2,2-bis(4-hydroxyphenyl)-propane |
| | Bisaryl carbonate | bis(2,4,6-trichlorophenyl) carbonate | diphenyl carbonate | diphenyl carbonate |
| | Catalyst | dimethylaminopyridine | potassium borohydride | lithium hydroxide |
| | Phosphonite compound | tetrakis(2,4-di-t-butyl-phenyl)-4,4'-biphenylene-diphosphonite (rel. soln. viscosity at addn: 1.19) | — | — |
| | Hue of polycondensate | nearly colorless | nearly colorless | pale-yellow |
| | Av. mol. wt. of polycondensate | 28,000 | 24,300 | 26,500 |
| | Thermogravimetric analysis | | | |
| | $T_d$ | 432° C. | 380° C. | 375° C. |
| | $T_5$ | 470° C. | 415° C. | 414° C. |
| | $T_{10}$ | 486° C. | 435° C. | 430° C. |
| | After hydrolysis for 30 days at 90° C. and 100% RH | | | |
| | appearance | colorless and transparent | translucent | translucent |
| | retention of mol. wt. | 88.9% | 68.0% | 65.3% |

Example K-1

4,560 g (20 mol) of 2,2-bis(4-hydroxyphenyl)-propane, 489 mg ($4 \times 10^{-3}$ mol) of 4-dimethylaminopyridine, 0.49 mg ($5 \times 10^{-6}$ mol) of potassium acetate, 4391.5 g (20.5 mol) of diphenyl carbonate and 1824 g (400 ppm based on 2,2-bis(4-hydroxyphenyl)-propane) of tetrakis(2,4-di-tert-butylphenyl)- 4,4'-biphenylene diphosphite were fed in a tank reactor made of Hastelloy C-276 and stirred at 160° C. for one hour in nitrogen. Then the temperature was gradually elevated to 260° C. while the pressure was gradually reduced to 0.1 Torr and polycondensation was conducted under these conditions for 4 hours while distilling off phenol formed. Then, the reaction was conducted in a tank-type twin-screw self-cleaning reactor for 50 min. Thus, a colorless, transparent polycarbonate was obtained.

The average molecular weight $\overline{Mv}$ of the polycarbonate was 28,600 as calculated according to the formula described in Example A-1 (determination of the intrinsic viscosity [η] was conducted with Ubbelohde's viscometer).

The terminal hydroxyl content determined by $^{14}$C-NMR was 30 molar %.

Example K-2

Stirring was conducted in nitrogen for one hour under the same conditions as those of Example K-1 except that 4-dimethylaminopyridine was replaced with 7.6 mg ($1 \times 10^{-4}$ mol) of tetramethylammonium hydroxide, and that potassium acetate was replaced with 0.33 mg ($5 \times 10^{-6}$ mol) of lithium acetate, and then polycondensation was conducted in the same manner as that of Example K-1 to obtain a colorless, transparent polycarbonate. The viscosity-average molecular weight ($\overline{Mv}$) of the product was determined to be 27,800. The terminal hydroxyl content was 28 molar %.

Example K-3

2280 g (10 mol, 50 molar %) of 2,2-bis(4-hydroxyphenyl)-propane, 3400 g (10 mol, 50 molar %) of 2,2-bis(4-hydroxy-3-tert-butylphenyl)propane, 4434 g (20.7 mol) of diphenyl carbonate, 0.0122 g ($1 \times 10^{-4}$ mol) of 4-dimethylaminopyridine and 0.49 mg ($5 \times 10^{-6}$ mol) of potassium acetate were stirred together in nitrogen for one hour and then polycondensation was conducted in the same manner as that of Example K-1 to obtain a colorless, transparent polycarbonate. The viscosity-average molecular weight ($\overline{Mv}$) of the product was 24,500. The terminal hydroxyl content was 18 molar %.

Example K-4

The polycondensation reaction was conducted in the same manner as that of Example K-1 except that 4-dimethylaminopyridine and potassium acetate were replaced with 7.6 mg ($1 \times 10^{-4}$ mol) of tetramethylammonium hydroxide to obtain a colorless, transparent polycarbonate. The viscosity-average molecular weight ($\overline{Mv}$) of the product was determined to be 18,000. The terminal hydroxyl content was 50 molar %.

Example K-5

The polycondensation reaction was conducted in the same manner as that of Example K-1 except that 4-dimethylaminopyridine and potassium acetate were replaced with 245 mg ($2 \times 10^{-3}$ mol) of 4-dimethylaminopyridine alone to obtain a colorless, transparent polycarbonate. The viscosity-average molecular weight ($\overline{Mv}$) of the product was determined to be 23,000. The terminal hydroxyl content was 42 molar %.

Example K-6

30 mg of octadecyl 3-(3',5'-di-t-butyl-4'-hydroxyphenyl)propionate was added to 100 g of the polycarbonate obtained in Example K-1 and the mixture was kneaded and extruded on a twin-screw extruder to obtain a polycarbonate composition.

Comparative Example K-1

The reaction was conducted in the same manner as that of Example K-1 except that no tetrakis(2,4-di-tert-butylphenyl)-4,4'-biphenylene diphosphite was used to obtain a colorless, transparent polycarbonate having a viscosity-average molecular weight ($\overline{Mv}$) of 30,000 and a terminal hydroxyl content of 35 molar %.

Sheets having a thickness of 0.5 mm and a size of 50 mm × 50 mm were prepared from the polycarbonate or polycarbonate composition obtained in Examples K-1 to K-6 or Comparative Example K-1 by the hot press/quenching method. After leaving them to stand at 160 ° C. for 10 days, the viscosity-average molecular weight thereof was determined. Further the cleavage ratio was determined according to the formula given below:

$$\text{Cleavage ratio} = \frac{Mv_0}{Mv_{10}} - 1$$

wherein $Mv_0$ represents the viscosity-average molecular weight at the initiation of heating and $Mv_{10}$ represents the viscosity-average molecular weight after 10 days. The results are given in Table 11.

TABLE 11

| | Visc.-av. mol. wt. of pressed sheet | | |
|---|---|---|---|
| | before initiation | after 10 days | cleavage ratio |
| Ex. K-1 | 28,600 | 25,900 | 0.10 |
| Ex. K-2 | 27,800 | 25,600 | 0.09 |
| Ex. K-3 | 24,500 | 23,000 | 0.07 |
| Ex. K-4 | 18,000 | 16,800 | 0.07 |
| Ex. K-5 | 23,000 | 21,500 | 0.07 |
| Ex. K-6 | 28,300 | 26,000 | 0.09 |
| Comp. Ex. K-1 | 30,000 | 19,000 | 0.57 |

Example L-1

228 parts by weight of 2,2-bis(4-hydroxyphenyl)-propane, potassium borohydride (in an amount of $10^{-3}$ mole % based on the dihydroxy compound fed) and 214 parts by weight of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [$\eta$] of 0.519 as determined in methylene chloride at 20° C. The average molecular weight $\overline{Mv}$ of the polycarbonate was 29,900 as calculated according to the formula described in

Example A-1.

254 g of the polycarbonate thus obtained was mixed with 0.254 g (0.1% by weight based on the polymer) of tetrakis(2,4-dl-t-butylphenyl)-4,4'-biphenylenediphosphonite and 0.254 g (0.1% by weight based on the polymer) of octadecyl 3-(3',5'-di-t-butyl-4'-hydroxyphenyl)-propionate on a tumbling blender (mfd. by Matsui Seisakusho, SKB-50) and the obtained mixture was extruded and pelletized by the use of a twin-screw extruder (HAAKE Buchler Product HBI System 90).

The pelletized composition was evaluated for the heat resistance as described in Example A-1. The decomposition-initiating temperature, $T_d$ was 433° C.; the temperature, $T_5$ was 472° C.; and the temperature, $T_{10}$ was 488° C.

Further, the polycarbonate composition was also evaluated for the resistance to hydrolysis as described in Example A-1. After the lapse of 30 days under the conditions of 90° C. and 100% RH (relative humidity), the retention of the molecular weight was 89.8% based on the initial molecular weight and the resulting sheet was colorless and transparent and no abnormal phenomenon was observed in respect of the external appearance.

These results are given in Table 12.

Example L-2

228 parts by weight of 2,2-bis(4-hydroxyphenyl)-propane was dissolved in a 0.1N aqueous solution of sodium hydroxide, followed by the addition of 214 parts by weight of diphenyl carbonate and dichloromethane. Gaseous phosgene was blown into the obtained mixture, while vigorously stirring the mixture. The obtained viscous solution was separated and the dichloromethane solution was distilled to remove the dichloromethane, giving a nearly colorless polycarbonate. This polycarbonate was washed with methanol several times, dried and examined for the viscosity-average molecular weight ($\overline{Mv}$) in a similar manner to that of Example L-1. The average molecular weight ($\overline{Mv}$) thereof was 28,000.

The polycarbonate composition containing tetrakis-[methylene-(3,5-di-t-butyl-4-hydroxyhydrocinnamate)]-methane instead of octadecyl 3-(3',5'-t-butyl-4'-hydroxyphenyl)propionate was pelletized in a similar manner to that of Example L-1. The pelletized composition thus obtained was evaluated for the resistances to heat and hydrolysis in a similar manner to that of Example L-1. The results are given in the Table 12.

Example L-3

Another polycarbonate was prepared in a similar manner to that of Example L-1 except that 4-dimethylaminopyridine (in an amount of $10^{-2}$ mole % based on the dihydroxy compound fed) was added instead of potassium borohydride. In a similar manner to that of Example L-1, a mixture of the obtained polycarbonate with octadecyl 3-(3',5'-t-hydroxyphenyl)propionate was pelletized and evaluated for the resistances to heat and hydrolysis. The results are given in the Table 12.

Example L-4

114 parts by weight (50 mole %) of 2,2-bis(4-hydroxyphenyl)-propane, 170 parts by weight (50 mole %) of 2,2-bis(4-hydroxy-3-t-butylphenyl)propane and imidazole (in an amount of $10^{-2}$ mole % based on the dihydroxy compound) were fed into a reactor. The contents were reacted under the same conditions as those of Example L-1 to give a copolycarbonate. In a similar manner to that of Example L-1, a mixture of the obtained copolycarbonate with octadecyl 3-(3',5'-t-butyl-40-hydroxyphenyl)propionate was pelletized and evaluated for the resistances to heat and hydrolysis. The results are given in Table 12.

Comparative Example L-1

The polycarbonate prepared in Example L-1 was pelletized without being blended with tetrakis(2,4-di-t-butylphenyl)-4,4'-biphenylenediphosphonite or octadecyl 3-(3',5'-di-t-butyl-4'-hydroxyphenyl)propionate, and evaluated for the resistances to heat and hydrolysis. The results are given in Table 12.

Example A-1.

254 g of the polycarbonate thus obtained was mixed with 0.127 g of tris(4-nonylphenyl)phosphite, 0.127 g of tris(2,4-di-t-butylphenyl)phosphite and 0.254 g of octadecyl 3-(3',5'-di-t-butyl-4'-hydroxyphenyl)propionate on a tumbling blender (mfd. by Matsui Seisakusho, SKB-50) and the obtained mixture was extruded and pelletized by the use of a twin-screw extruder (HAAKE Buchler Product HBI System 90). The pelletized composition was evaluated for the heat resistance as described in Example A-1. The decomposition-initiating temperature, $T_d$ was 430° C.: the temperature, $T_5$ was 470° C.; and the temperature, $T_{10}$ was 485° C.

Further, the polycarbonate composition was also evaluated for the resistance to hydrolysis as described in Example A-1. After the lapse of 30 days under the conditions of 90° C. and 100% RH (relative humidity), the retention of the molecular weight was 89.0% based on the initial molecular weight and the resulting sheet was colorless and transparent and no abnormal phenomenon was observed in respect of the external appearance.

TABLE 12

|  | Ex. L-1 | Ex. L-2 | Ex. L-3 | Ex. L-4 | Comp. Ex. L-1 |
| --- | --- | --- | --- | --- | --- |
| Dihydroxy compound | 2,2-bis(4-hydroxyphenyl)propane: 254 g | 2,2-bis(4-hydroxyphenyl)propane: 254 g | 2,2-bis(4-hydroxyphenyl)propane: 254 g | 2,2-bis(4-hydroxyphenyl)propane (50 mole %)/2,2-bis(4-hydroxy-3-t-butylphenyl)propane (50 mole %): 282 g | 2,2-bis(4-hydroxyphenyl)propane: 254 g |
| Tetrakis(2,4-di-t-butylphenyl)-4,4'-biphenylenediphosphonite | 0.254 g (0.1 wt %) | 0.254 g (0.1 wt %) | 0.254 g (0.1 wt %) | 0.282 g (0.1 wt %) | — |
| Octadecyl 3-(3',5'-di-t-butyl-4'-hydroxyphenyl)propionate | 0.254 g (0.1 wt %) | — | 0.254 g (0.1 wt %) | 0.282 g (0.1 wt %0 | — |
| Tetrakis[methylene(3,5-di-t-butyl-4-hydroxyhydrocinnamate)]methane | — | 0.254 g (0.1 wt %) | — | — | — |
| Hue of polycondensate | nearly colorless | nearly colorless | nearly colorless | colorless | nearly colorless |
| Av. mol. wt. of polycondensate | 29,900 | 28,000 | 28,200 | 25,200 | 29,900 |
| Thermogravimetric analysis |  |  |  |  |  |
| $T_d$ | 433° C. | 432° C. | 433° C. | 420° C. | 375° C. |
| $T_5$ | 472° C. | 472° C. | 472° C. | 464° C. | 414° C. |
| $T_{10}$ | 488° C. | 490° C. | 491° C. | 480° C. | 430° C. |
| After hydrolysis for 30 days at 90° C. and 100% RH |  |  |  |  |  |
| appearance | colorless and transparent | colorless and transparent | colorless and transparent | colorless and transparent | transparent |
| retention of mol. wt. | 89.8% | 89.5% | 89.6% | 90.2% | 67.3% |

Example M-1

228 parts by weight of 2,2-bis(4-hydroxyphenyl)-propane, potassium borohydride (in an amount of $10^{-3}$ mole % based on the dihydroxy compound fed) and 214 parts by weight of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [η] of 0.438 as determined in methylene chloride at 20° C. The average molecular weight $\overline{M_v}$ of the polycarbonate was 24,300 as calculated according to the formula described in These results are given in Table 13.

Example M-2

22.8 g (0.1 mol) of 2,2-bis(4-hydroxyphenyl)-propane, 0.164 g ($2 \times 10^{-2}$ mol) of 2-methylimidazole and 21.4 g (0.1 mol) of diphenyl carbonate were fed into a reactor. The contents were stirred at 180° C. in a nitrogen atmosphere for one hour. The temperature of the contents was gradually raised to 250° C., while the pressure of the system was lowered to 2 mmHg. At this point of time, 0.0125 g of tris(4-nonylphenyl) phosphite, 0.0125 g of tetrakis(2,4-di-t-butylphenyl)4,4'-biphenylenediphosphonite and 0.025 g of octadecyl 3-(3',5'-di-t-butyl-4'-hydroxyphenyl)propionate were added to the reactor. At the point of time of this addition, the relative solution viscosity (polymer concentration: 0.5 g/100 ml, 20° C., solvent: methylene chloride) presumed from the stirring torque was 1.17, while the one actually determined by the use of a sample of the polycondensate was 1.18. The temperature of the contents was further raised and the contents were reacted at 280° C. in a vacuum of 0.5 mmHg for 2 hours to give a polycarbonate. This polycarbonate was nearly colorless and transparent and had an intrinsic viscosity [η] of 0.519 as determined in methylene chloride at 20° C. The average molecular weight $\overline{Mv}$ of the polycarbonate was 29,900 as calculated according to the formula described in Example A-1.

The hue, viscosity-average molecular weight, thermal decomposition behavior and hydrolysis behavior of the polymer are given in Table 18.

Example M-3

Another polycarbonate was prepared in a similar manner to that of Example M-1 except that dimethylamine-borane complex (in an amount of $10^{-2}$ mole % based on the dihydroxy compound fed) was added instead of potassium borohydride. The polycarbonate thus obtained was mixed with 0.084 g of tridecyl phosphite, 0.084 g of bis(2,6-dl-t-butyl-4-methylphenyl)pentaerythritol diphosphite, 0.084 g of tetrakis(2,4-di-t-butylphenyl)-4,4'-biphenylenediphosphonite and 0.254 g of octadecyl 3-(3',5'-di-t-butyl-4'-hydroxyphenyl)propionate. In a similar manner to that of Example M-1, the obtained mixture was pelletized and evaluated for the resistances to heat and hydrolysis. The results are given in Table 13.

Example M-4

114 parts by weight (50 mole %) of 2,2-bis(4-hydroxyphenyl)-propane, 170 parts by weight (50 mole %) of 2,2-bis(4-hydroxy-3-t-butylphenyl)propane, 214 parts by weight of diphenyl carbonate and 4-dimethylaminopyridine (in an amount of $10^{-2}$ mole % based on the dihydroxy compound) were fed into a reactor. The contents were reacted under the same conditions as those of Example M-1 to give a copolycarbonate. This copolycarbonate was mixed with 0.127 g of tris(4-nonylphenyl)phosphite, 0.127 g of tetrakis(2,4-di-t-butylphenyl)-4,4'-biphenylenediphosphonite and 0.254 g of octadecyl 3-(3',5'-di-t-butyl-4'-hydroxyphenyl)propionate. In a similar manner to that of Example M-1, the obtained composition was pelletized and evaluated for the resistances to heat and hydrolysis. The results are given in Table 13.

Example M-5

22.8 g (0.1 mol) of 2,2-bis(4-hydroxyphenyl)-propane, 42.1 g (0.1 mol) of bis(2,4,6-trichlorophenyl)carbonate and 0.0122 g ($10^{-4}$ mol) of dimethylaminopyridine were stirred together in a nitrogen atmosphere at 180° C. for one hour. The temperature of the resulting mixture was gradually raised while lowering the pressure of the system. When the relative solution viscosity reached 1.19, 0.0125 g of tris(4-nonylphenyl)phosphite, 0.0125 g of tris(2,4-di-t-butylphenyl)phosphite and 0.025 g of octadecyl 3-(3',5'-hydroxyphenyl)propionate were added to the reaction mixture and the obtained mixture was further reacted like in Example M-2 to give a polymer.

The hue, viscosity-average molecular weight, thermal decomposition behavior and hydrolysis behavior of the polymer are given in the Table 13.

Comparative Example M-1

The polycarbonate prepared in Example M-1 was pelletized without being blended with tris(4-nonylphenyl)phosphite, tris(2,4-di-t-butylphenyl)phosphite or octadecyl 3-(3',5'-di- t-hydroxyphenyl)-propionate and evaluated for resistances to heat and hydrolysis. The results are given in the Table 18.

Comparative Example M-2

Another polycarbonate was prepared in the same manner as that of Example M-2 except that a known catalyst for comparison, i.e., lithium hydroxide which is an alkali metal hydroxide was used instead of 2-methylimidazole in an amount of $10^{-3}$ mole 4 based on the 2,2-bis(4-hydroxyphenyl)propane used and that no tris(4-nonylphenyl)phosphite, no tetrakis(2,4-di-t-butylphenyl)phosphite, and no octadecyl 3-(3',5'-di-t-butyl-4'-hydroxyphenyl)propionate was added.

Although the obtained polymer had an average molecular weight as high as 26,500, the polymer was pale-yellow; the thermal decomposition thereof began at 875° C.; and the weight loss to reach 430° C. was 10%. Further, in the hydrolysis test at 90° C. and 100% RH, the retention of average molecular weight after 30 days was as low as 65.3% and the resulting test sheet was translucent, had many small white spots (partially including voids) all over and was brittle remarkably.

These results are given in Table 18.

TABLE 13

| | Ex. M-1 | Ex. M-2 | Ex. M-3 | Ex. M-4 |
|---|---|---|---|---|
| Dihydroxy compound | 2,2-bis(4-hydroxyphenyl)-propane | 2,2-bis(4-hydroxyphenyl)-propane | 2,2-bis(4-hydroxyphenyl)-propane | 2,2-bis(4-hydroxyphenyl)-propane (50 mole %)/2,2-bis(4-hydroxy-3-t-butylphenyl)propane (50 mole %) |
| Bisaryl carbonate | diphenyl carbonate | diphenyl carbonate | diphenyl carbonate | diphenyl carbonate |
| Catalyst | potassium borohydride | 2-methylimidazole | dimethylamine-borane complex | 4-dimethylaminopyridine |
| Phosphite or phosphonite compound | tris(4-nonylphenyl)phosphite (50 wt %)/tris(2,4-di-t-butylphenyl)phosphite (50 wt %) | tris(4-nonylphenyl) phosphite (50 wt %)/ tetrakis(2,4-di-t-butylphenyl)-4,4'-biphenylenediphosphonite (50 wt %) (rel. soln. viscosity at addn.: 1.18) | tridecyl phosphite (33.3 wt %)/bis(2,6-di-t-butyl-4-methylphenyl)pentaerthritol diphosphite (33.3 wt %)/tetrakis(2,4-di-t-butylphenyl)-4,4'-biphenylenediphosphonite (33.3 wt %) | tris(4-nonylphenyl) phosphite (50 wt %)/ tetrakis(2,4-di-t-butylphenyl)-4,4'-biphenylenediphosphonite (50 wt %) |
| Hindered phenol compound | octadecyl 3-(3',5'-di-t-butyl-4'-hydroxyphenyl)-propionate | octadecyl 3-(3',5'-di-t-butyl-4'-hydroxyphenyl)-propionate | octadecyl 3-(3',5'-di-t-butyl-4'-hydroxyphenyl)-propionate | octadecyl 3-(3',5'-di-t-butyl-4'-hydroxyphenyl)-propionate |
| Hue of polycondensate | nearly colorless | nearly colorless | nearly colorless | nearly colorless |
| Av. mol. wt. of | 24,300 | 27,000 | 23,300 | 25,000 |

TABLE 13-continued

| polycondensate Thermogravimetric analysis | | | | |
|---|---|---|---|---|
| $T_d$ | 430° C. | 432° C. | 430° C. | 430° C. |
| $T_5$ | 470° C. | 470° C. | 469° C. | 469° C. |
| $T_{10}$ | 485° C. | 486° C. | 483° C. | 488° C. |
| After hydrolysis for 30 days at 90° C. and 100% RH | | | | |
| appearance | colorless and transparent | colorless and transparent | colorless and transparent | colorless and transparent |
| retention of mol. wt. | 89.0% | 88.2% | 89.1% | 87.0% |

| | | Ex. M-5 | Comp. Ex. M-1 | Comp. Ex. M-2 |
|---|---|---|---|---|
| | Dihydroxy compound | 2,2-bis(4-hydroxyphenyl)-propane | 2,2-bis(4-hydroxyphenyl)-propane | 2,2-bis(4-hydroxyphenyl)-propane |
| | Bisaryl carbonate | bis(2,4,6-trichlorophenyl) carbonate | diphenyl carbonate | diphenyl carbonate |
| | Catalyst | dimethylaminopyridine | potassium borohydride | lithium hydroxide |
| | Phosphite or phosphonite compound | tris(4-nonylphenyl)phosphite (50 wt %)/tris(2,4-di-t-butylphenyl)phosphite (50 wt %) (rel. soln. viscosity at addn.: 1.18) | — | — |
| | Hindered phenol compound | octadecyl 3-(3',5'-di-t-butyl-4'-hydroxyphenyl)-propionate | — | — |
| | Hue of polycondensate | nearly colorless | nearly colorless | pale-yellow |
| | Av. mol. wt. of polycondensate Thermogravimetric analysis | 26,800 | 24,300 | 26,500 |
| | $T_d$ | 432° C. | 380° C. | 375° C. |
| | $T_5$ | 470° C. | 415° C. | 414° C. |
| | $T_{10}$ | 485° C. | 435° C. | 430° C. |
| | After hydrolysis for 30 days at 90° C. and 100% RH | | | |
| | appearance | colorless and transparent | translucent | translucent |
| | retention of mol. wt. | 86.9% | 68.0% | 65.3% |

What we claimed is:

1. A melt polycondensation process for producing a (co)polycarbonate composition or a (co)polyestercarbonate composition comprising adding an organic phosphorus compound selected from the group consisting of compounds represented by the following general formulas (1) to (6), or, an organic phosphorus compound selected from the group consisting of compounds represented by the following general formulas (1) to (6) and a hindered phenol compound to a (co)polycarbonate or a (co)polyestercarbonate, said (co)polycarbonate and said (co)polyestercarbonate being obtained by reacting an aromatic dihydroxy compound with one or more members selected from the group consisting of a diester of carbonic acid and a diester of dicarboxylic acid:

$$R^a\text{—O—}\underset{\underset{R^b}{\overset{\|}{O}}}{P}\text{—O—}R^c \quad (1)$$

wherein $R^a$, $R^b$ and $R^c$ each represents a straight-chain or branched alkyl group having 1 to 12 carbon atoms, or a phenyl group which is unsubstituted or substituted;

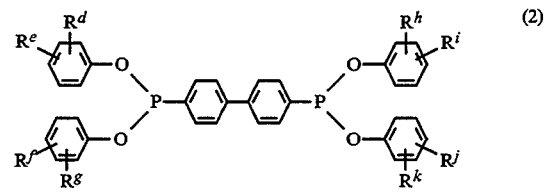
(2)

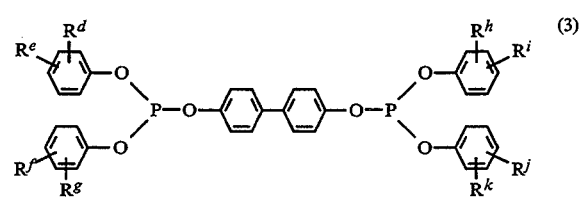
(3)

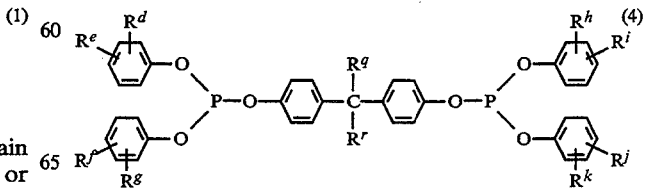
(4)

-continued (5)

tetrakis(2,4-di-tert-butylphenyl)-4,4'-biphenylene diphosphite of the following formula:

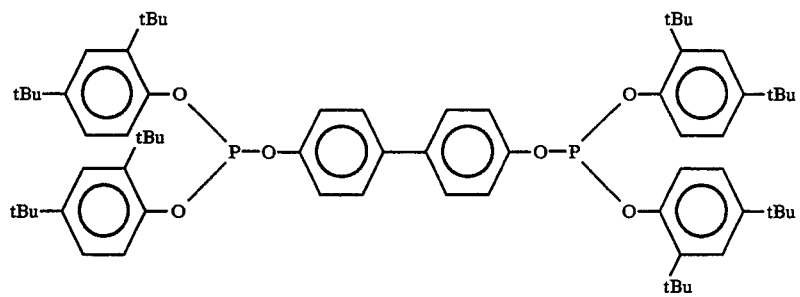

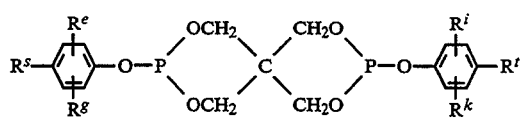

wherein $R^d$, $R^e$, $R^f$, $R^g$, $R^h$, $R^i$, $R^j$ and $R^k$ each represents a hydrogen atom or a straight-chain or branched alkyl group having 1 to 12 carbon atoms, $R^q$ and $R^r$ each represents a straight-chain or branched alkyl group having 1 to 12 carbon atoms and $R^s$ and $R^t$ each represents a straight-chain or branched alkyl group having 1 to 12 carbon atoms;

$$R^uO-\underset{\underset{O}{\|}}{\overset{R^w}{P}}-OR^v \quad (6)$$

wherein $R^u$ and $R^v$ each represents a straight-chain or branched alkyl group having 1 to 20 carbon atoms and pentaerythritol di[(2,6-di-tert-butyl-4-methylphenyl) phosphite] of the following formula:

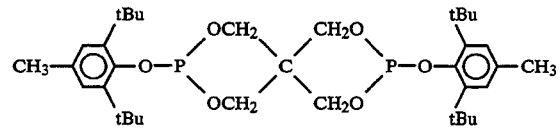

pentaerythritol di[(2,4-di-tert-butylphenyl) phosphite] of the following formula:

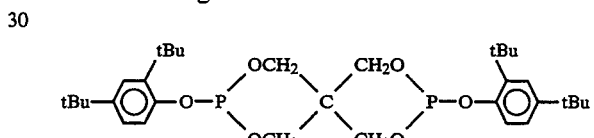

tetrakis(2,4-di-tert-butylphenyl)-4,4'-(2,2-diphenylpropane) phosphite of the following formula:

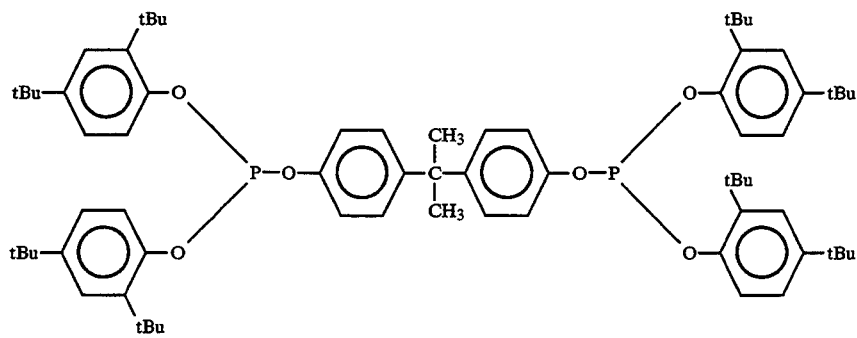

$R^w$ represents a phenyl or aralkyl group which is unsubstituted or substituted.

2. The process according to claim 1, wherein the organic phosphorus compound is one member selected from the group consisting of triethyl phosphite, triisopropyl phosphite, triisodecyl phosphite, tridodecyl phosphite, phenyl diisodecyl phosphite, diphenyl isodecyl phosphite, triphenyl phosphite, phenyl bis(4-nonylphenyl) phosphite, tris(4-octylphenyl) phosphite, tris(4-(1-phenylethyl)phenyl) phosphite, tris(2,4-di-tert-butylphenyl) phosphite, tris(4-nonylphenyl) phosphite, diethyl 3,5-di-tert-butyl-4-hydroxybenzyl phosphonate, dialkoxyphenylphosphoric acids of the following formula:

$$R^uO-\underset{\underset{O}{\|}}{\overset{Ph}{P}}-OR^v$$

wherein $R^u$ and $R^v$ each represent a straight-chain or branched alkyl group having 1 to 20 carbon atoms and Ph represents a phenyl group, and the phosphonite compound of the following formula:

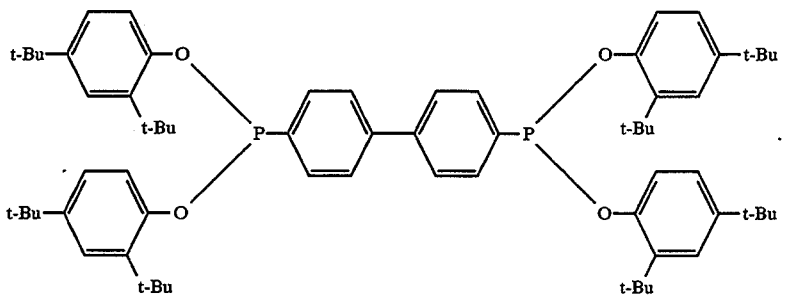

3. The process according to claim 1, wherein the organic phosphorus compound is one number selected from the group consisting of tetrakis(2,4-di-tert-butylphenyl)-4,4'-biphenylene diphosphite of the following formula:

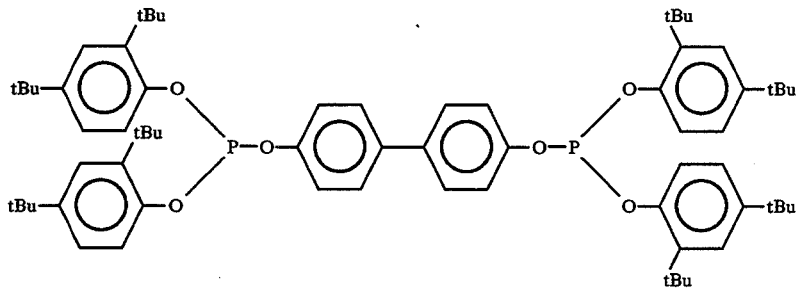

tetrakis(2,4-di-tert-butylphenyl)-4,4'-(2,2-diphenylpropane) phosphite of the following formula:

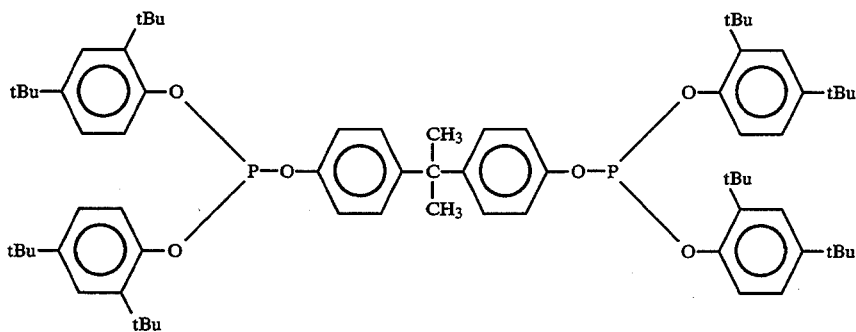

and dialkoxyphenylphosphoric acids of the following formula:

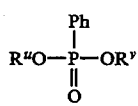

wherein $R^u$ and $R^v$ each represent a straight-chain or branched alkyl group having 1 to 20 carbon atoms and Ph represents a phenyl group.

4. The process according to claim 1, wherein the hindered phenol compound is one member selected from the group consisting of octadecyl propionate-3-(3,5-di-t-butyl-4-hydroxyphenyl), N,N'-hexamethylene-bis(3,5-di-t-butyl-4-hydroxyhydrocinnamamide), triethylene glycol bis[3-(3-t-butyl-5-methyl-4hydroxyphenyl)propionate], 1,6-hexanediol-bis-[3-(3,5-di-t-butyl-4-hydroxyphenyl)propionate], pentaerythrityl tetrakis[3-(3,5-di-t-butyl-4-hydroxyphenyl)propionate], 3,5-di-t-butyl-4-hydroxybenzyl phosphonate-diethyl ester, 1,3,5-trimethyl-2,4,6-tris(3,5-di-tert-butyl-4-hydroxybenzyl)benzene and compounds of the following formulas:

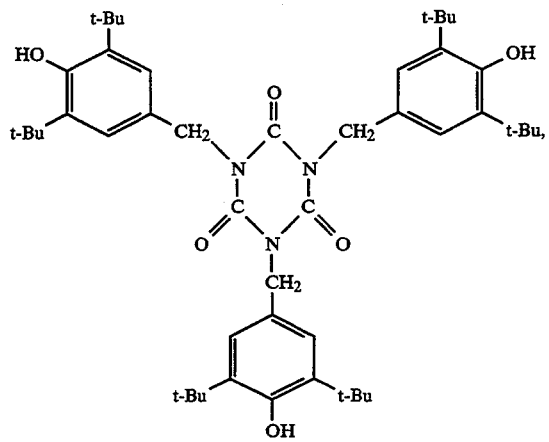

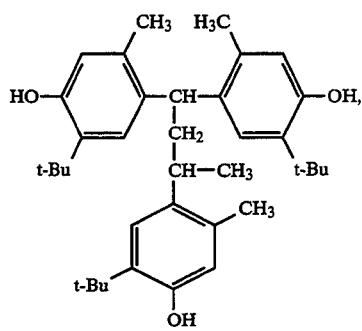

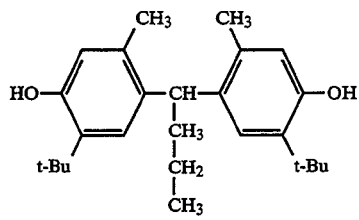

and

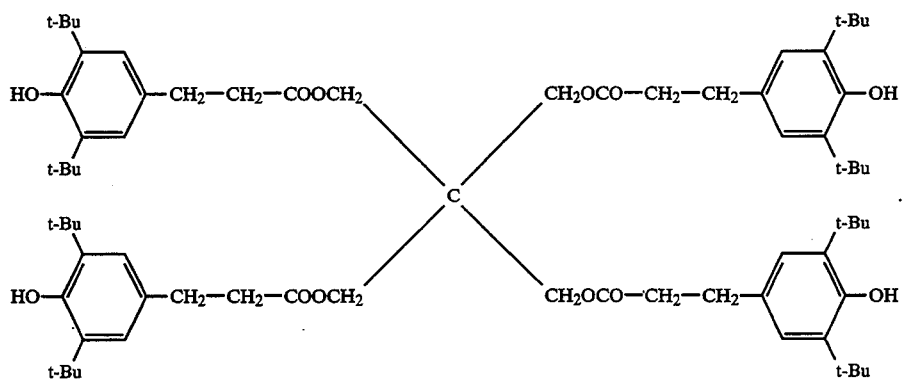

5. The process according to claim 1, wherein the hindered phenol compound is one member selected from the group consisting of N,N'-hexamethylene-bis(3,5-di-t-butyl-4-hydroxyhydrocinnamamide), triethylene glycol bis[3(3-t-butyl-5-methyl-4-hydroxyphenyl)propionate], 1,6-hexanediol-bis[3,5-di-t-butyl-4-hydroxyphenyl)propionate], 3,5-di-t-butyl-4-hydroxybenzyl phosphonate-diethyl ester and compounds of the following formulas:

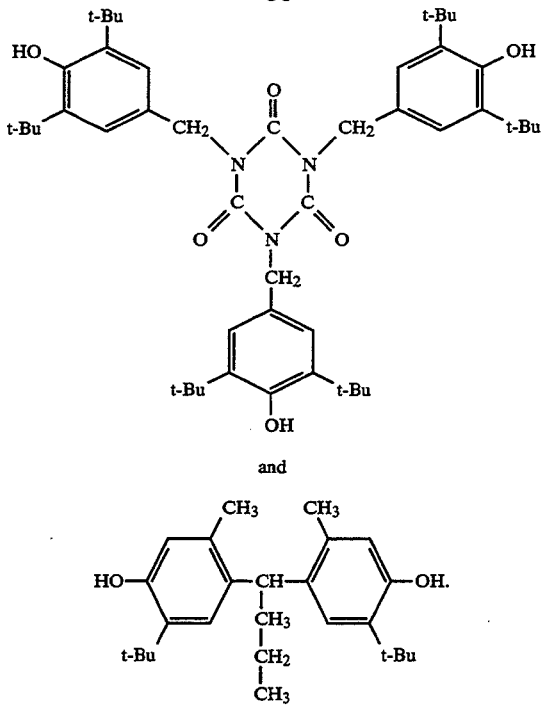

and

6. The process according to claim 1, wherein the reacting of said aromatic dihydroxy compound with one or more members selected from the group consisting of a diester of carbonic acid and a diester of dicarboxylic acid is conducted in the presence of a transesterification catalyst.

7. The process according to claim 6, wherein the transesterification catalyst is a basic compound containing a nitrogen atom in the molecule.

8. The process according to claim 7, wherein the basic compound is one member selected from the group consisting of aliphatic primary amines, aliphatic secondary amines, aliphatic tertiary amines, alicyclic primary amines, alicyclic secondary amines, alicyclic tertiary amines, aromatic primary amines, aromatic secondary amines, aromatic tertiary amines, quaternary ammonium salts and ammonia.

9. The process according to claim 7, wherein the basic compound is one member selected from the group consisting of ammonia, ammonium hydroxide compounds, ammonium borohydride compounds, ammonium tetraarylborates, pyridine compounds, imidazole compounds, diazo compounds, picoline compounds, pyrimidines, quinolines, pyrazoles, aniline, pyrrolidine compounds, morpholine compounds, piperidine compounds and piperadine compounds.

10. The process according to claim 7, wherein the basic compound is one member selected from the group consisting of pyridine compounds, imidazole compounds, diazo compounds, picoline compounds, pyrimidine compounds, quinoline compounds, pyrazole compounds, aniline, pyrrolidine compounds, morpholine compounds, piperidine compounds and piperadine compounds.

11. The process according to claim 7, wherein the basic compound is 4-dimethylaminopyridine or 4-pyrrolidinopyridine.

12. The process according to claim 6, wherein the transesterification catalyst is a basic compound containing a nitrogen atom in the molecule, and one or more members selected from the group consisting of an alkaline metal compound and an alkaline earth metal compound.

13. The process according to claim 12, wherein the basic compound is one member selected from the group consisting of aliphatic primary amines, aliphatic secondary amines, aliphatic tertiary amines, alicyclic primary amines, alicyclic secondary amines, alicyclic tertiary amines, aromatic primary amines, aromatic secondary amines, aromatic tertiary amines, quaternary ammonium salts and ammonia.

14. The process according to claim 12, wherein the basic compound is one member selected from the group consisting of ammonia, ammonium hydroxide compounds, ammonium borohydride compounds, ammonium tetraarylborates, pyridine compounds, imidazole compounds, diazo compounds, picoline compounds, pyrimidine compounds, quinoline compounds, pyrazole compounds, aniline, pyrrolidine compounds, morpholine compounds, piperidine compounds, and piperadine compounds.

15. The process according to claim 12, wherein the basic compound is one member selected from the group consisting of pyridine compounds, imidazole compounds, diazo compounds, picoline compounds, pyrimidine compounds, quinoline compounds, pyrazole compounds, aniline, pyrrolidine compounds, morpholine compounds, piperidine compounds and piperadine compounds.

16. The process according to claim 12, wherein the basic compound is 4-dimethylaminopyridine or 4-pyrrolidinopyridine.

17. The process according to claim 12, wherein the alkaline metal compound is one member selected from the group consisting of sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, potassium borohydride, sodium tetraphenylborate, sodium benzoate, potassium benzoate, lithium benzoate, disodium hydrogenphosphate, dipotassium hydrogenphosphate, dilithium hydrogenphosphate, disodium, dipotassium or dilithium salt of bisphenol A, and sodium, potassium or lithium salt of phenol.

18. The process according to claim 12, wherein the alkaline earth metal compound is one member selected from the group consisting of calcium hydroxide, barium hydroxide, magnesium hydroxide. strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium carbonate, barium acetate, magnesium acetate, strontium acetate, calcium stearate, barium stearate, magnesium stearate and strontium stearate.

19. A (co)polycarbonate or a (co)polyestercarbonate composition comprising one or more members selected from the group consisting of a (co)polycarbonate and a (co)polyestercarbonate, said (co)polycarbonate and said (co)polyestercarbonate being obtained by reacting an aromatic dihydroxy compound with one or more members selected from the group consisting of a diester of carbonic acid and a diester of dicarboxylic acid, and an organic phosphorus compound selected from the group consisting of compounds represented by the following general formulas (1) to (6), or, an organic phosphorus compound selected from the group consisting of compounds represented by the following general formulas (1) to (6) and hindered phenol compound:

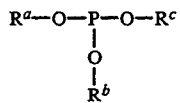  (1)

wherein $R^a$, $R^b$ and $R^c$ each represents a straight-chain or branched alkyl group having 1 to 12 carbon atoms, or a phenyl group which is unsubstituted or substituted;

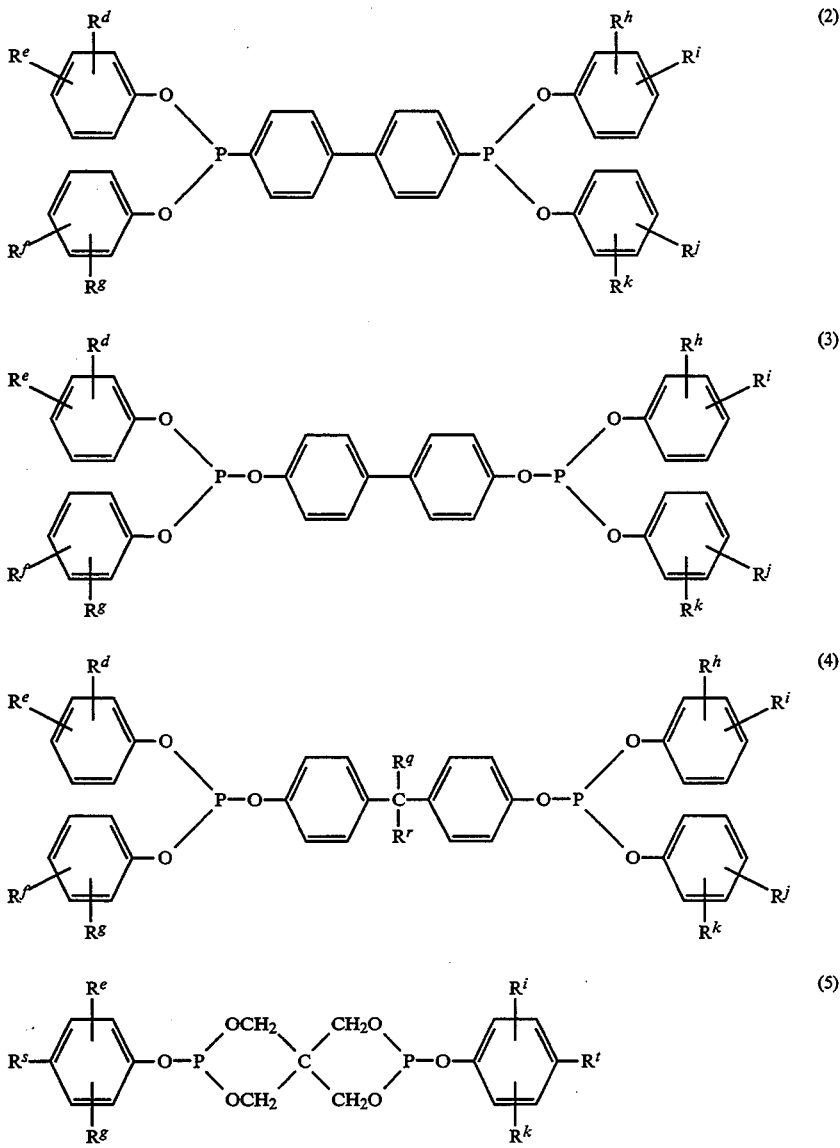

wherein $R^d$, $R^e$, $R^f$, $R^g$, $R^h$, $R^i$, $R^j$ and $R^k$ each represents a hydrogen atom or a straight-chain or branched alkyl group having 1 to 12 carbon atoms, $R^q$ and $R^r$ each represents a straight-chain or branched alkyl group having 1 to 12 carbon atoms and $R^s$ and $R^t$ each represents a straight-chain or branched alkyl group having 1 to 12 carbon atoms;

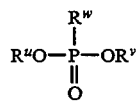  (6)

wherein $R^u$ and $R^v$ each represents a straight-chain or branched alkyl group having 1 to 20 carbon atoms and $R^w$ represents a phenyl or aralkyl group which is unsubstituted or substituted.

20. The composition according to claim 19, wherein the organic phosphorus compound is one member selected from the group consisting of triethyl phosphite, triisopropyl phosphite, triisodecyl phosphite, tridodecyl phosphite, phenyl diisodecyl phosphite, diphenyl isodecyl phosphite, triphenyl phosphite, phenyl bis(4-nonylphenyl) phosphite, tris(4-octylphenyl) phosphite, tris(4-(1-phenylethyl)phenyl) phosphite, tris(2,4-di-tert-butylphenyl) phosphite, tris (4-nonylphenyl) phosphite, diethyl 3,5-di-tert-4-hydroxybenzyl phosphonate, tetrakis-(2,4-di-tert-butylphenyl)-4,4'-biphenylene diphosphite of the following formula:

pentaerythritol di[(2,6-di-tert-butyl-4-methylphenyl) phosphite] of the following formula:

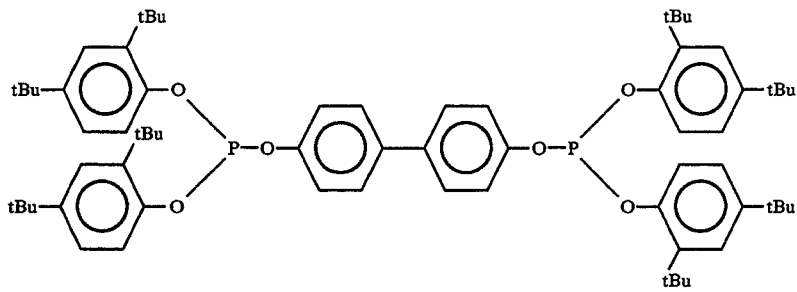

tetrakis(2,4-di-tert-butylphenyl)-4,4'-(2,2diphenylpropane) phosphite of the following formula:

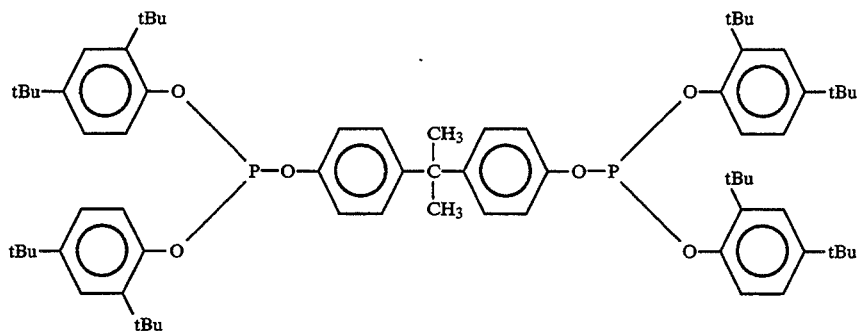

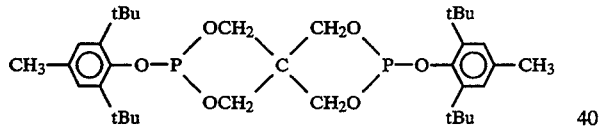

pentaerythritol di[(2,4-di-tert-butylphenyl) phosphite] of the following formula:

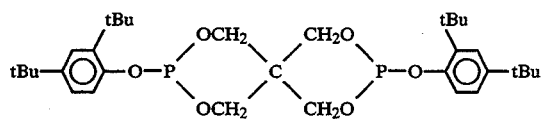

dialkoxyphenylphosphoric acids of the following formula:

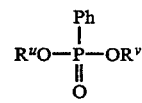

wherein $R^u$ and $R^v$ each represent a straight-chain or branched alkyl group having 1 to 20 carbon atoms and Ph represents a phenyl group, and the phosphonite compound of the following formula:

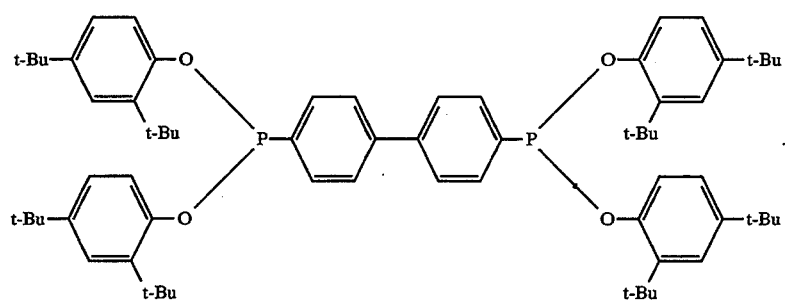

21. The composition according to claim 19, wherein the organic phosphorus compound is one member selected from the group consisting of tetrakis(2,4-di-tert-butylphenyl)-4,4'-biphenylene diphosphite of the following formula:

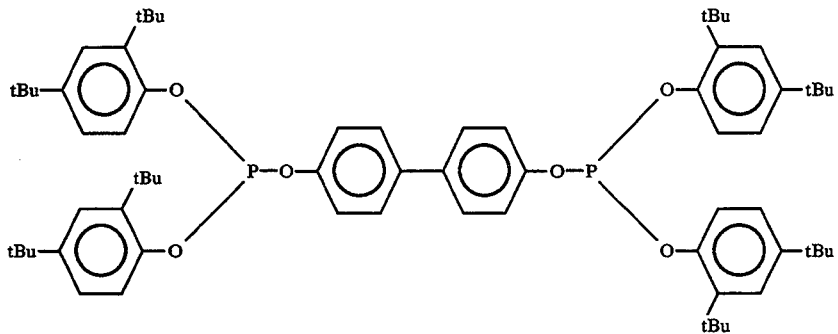

tetrakis(2,4-di-tert-butylphenyl)-4,4'-(2,2-diphenylpropane) phosphite of the following formula:

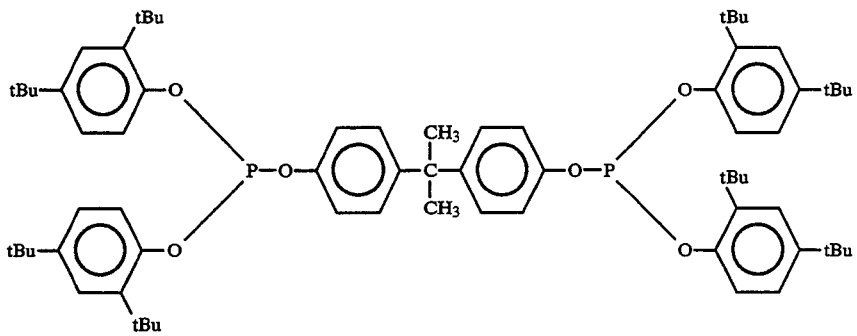

and dialkoxyphenylphosphoric acids of the following formula:

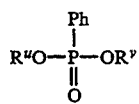

wherein $R^u$ and $R^v$ each represent a straight-chain or branched alkyl group having 1 to 20 carbon atoms and Ph represents a phenyl group.

22. The composition according to claim 19, wherein the hindered phenol compound is one member selected from the group consisting of octadecyl propionate-3-(3,5-di-t-butyl-4-hydroxyphenyl), N,N'-hexamethylene-bis(3,5-di-t-butyl-4-hydroxy-hydrocinnamamide), triethylene glycol bis[3-(3-t-butyl-5-methyl-4-hydroxyphenyl)propionate], 1,6-hexanediol-bis[3-(3,5-di-t-butyl-4-hydroxyphenyl)propionate], pentaerythrityl tetrakis[3(3,5-di-t-butyl-4-hydroxyphenyl)propionate], 3,5-di-t-butyl-4-hydroxybenzyl phosphonate-diethyl ester, 1,3,5-trimethyl-2,4,6-tris(3,5-di-tert-butyl-4-hydroxybenzyl)benzene and compounds of the following formulas:

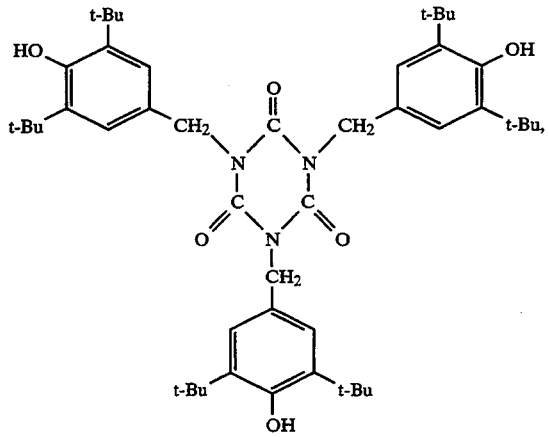

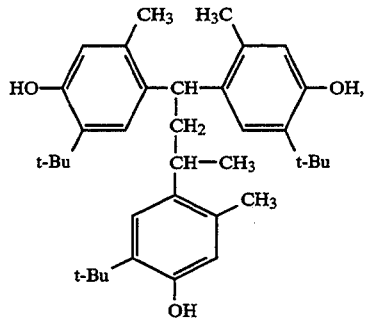

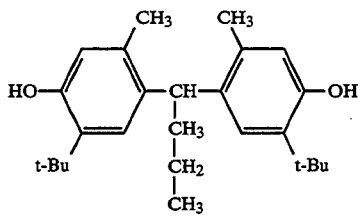

and

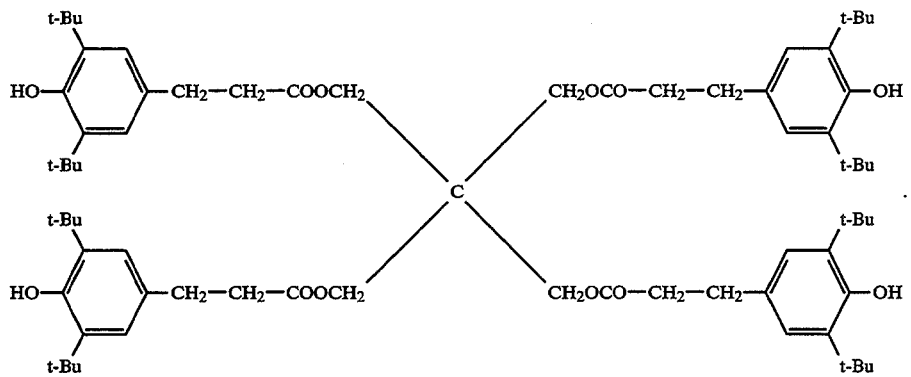

23. The composition according to claim 19, wherein the hindered phenol compound is one member selected from the group consisting of N,N'-hexamethylene-bis(3,5-di-t-butyl-4-hydroxyhydrocinnamamide), triethylene glycol bis[3-(3-t-butyl-5methyl-4-hydroxyphenyl)propionate], 1,6-hexanediol-bis [3-(3,5-di-t-butyl-4-hydroxyphenyl)propionate], 3,5-di-t-butyl-4-hydroxybenzyl phosphonate-diethyl ester and compounds of the following formulas:

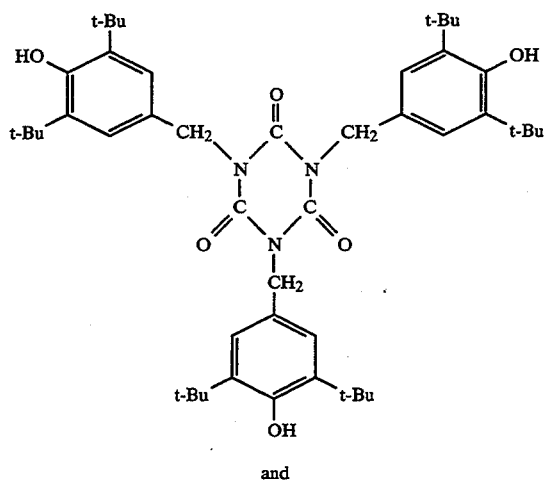

and

-continued

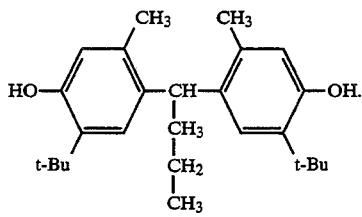

24. The composition according to claim 19, wherein the (co)polycarbonate or the (co)polyestercarbonate is obtained by reacting a dihydroxyl compound with one or more members selected from the group consisting of a diester of carbonic acid and a diester of dicarbonic acid in the presence of a transesterification catalyst.

25. The composition according to claim 24, wherein the transesterification catalyst is a basic compound containing a nitrogen atom in the molecule.

26. The composition according to claim 25, wherein the basic compound is one member selected from the group consisting of aliphatic primary amines, aliphatic secondary amines, aliphatic tertiary amines, alicyclic primary amines, alicyclic secondary amines, alicyclic tertiary amines, aromatic primary amines, aromatic secondary amines, aromatic tertiary amines, quaternary ammonium salts and ammonia.

27. The composition according to claim 25, wherein the basic compound is one member selected from the group consisting of ammonia, ammonium hydroxide compounds, ammonium borohydride compounds, ammonium tetraarylborates, pyridine compounds, imidazole compounds, diazo compounds, picoline compounds, pyrimidines, quinolines, pyrazoles, aniline, pyrrolidine compounds, morpholine compounds, piperidine compounds and piperadine compounds.

28. The composition to claim 25, wherein the basic compound is one member selected from the group consisting of pyridine compounds, imidazole compounds, diazo compounds, picoline compounds, pyrimidine compounds, quinoline compounds, pyrazole compounds, aniline, pyrrolidine compounds, morpholine compounds, piperidine compounds and piperadine compounds.

29. The composition according to claim 25, wherein the basic compound is 4-dimethylaminopyridine or 4-pyrrolidinopyridine.

30. The composition according to claim 24, wherein the transesterification catalyst is a basic compound containing a nitrogen atom in the molecule, and one or more members selected from the group consisting of an alkaline metal compound and an alkaline earth metal compound.

31. The composition according to claim 30, wherein the basic compound is one member selected from the group consisting of aliphatic primary amines, aliphatic secondary amines, aliphatic tertiary amines, alicyclic primary amines, alicyclic secondary amines, alicyclic tertiary amines, aromatic primary amines, aromatic secondary amines, aromatic tertiary amines, quaternary ammonium salts and ammonia.

32. The composition according to claim 30, wherein the basic compound is one member selected from the group consisting of ammonia, ammonium hydroxide compounds, ammonium borohydride compounds, ammonium tetraarylborates, pyridine compounds, imidazole compounds, diazo compounds, picoline compounds, pyrimidine compounds, quinoline compounds, pyrazole compounds, aniline, pyrrolidine compounds, morpholine compounds, piperidine compounds and piperadine compounds.

33. The composition according to claim 30, wherein the basic compound is one member selected from the group consisting of pyridine compounds, imidazole compounds, diazo compounds, picoline compounds, pyrimidine compounds, quinoline compounds, pyrazole compounds, aniline, pyrrolidine compounds, morpholine compounds, piperidine compounds and piperadine compounds.

34. The composition according to claim 30, wherein the basic compound is 4-dimethylaminopyridine or 4-pyrrolidinopyridine.

35. The composition according to claim 30, wherein the alkaline metal compound is one member selected from the group consisting of sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, potassium borohydride, sodium tetraphenylborate, sodium benzoate, potassium benzoate, lithium benzoate, disodium hydrogenphosphate, dipotassium hydrogenphosphate, dilithium hydrogenphosphate, disodium, dipotassium or dilithium salt of bisphenol A, and sodium, potassium or lithium salt of phenol.

36. The composition according to claim 30, wherein the alkaline earth metal compound is one member selected from the group consisting of calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium carbonate, barium acetate, magnesium acetate, strontium acetate, calcium stearate, barium stearate, magnesium stearate and strontium stearate, an organic phosphorus compound or an organic phosphorus compound and a hindered phenol compound.

37. The composition according to claim 19, wherein the (co)polycarbonate is obtained by the phosgene method.

38. The composition according to claim 19, wherein the (co)polycarbonate has terminal hydroxyl group content of 3 to less than 50 molar 39. The composition according to claim 19, wherein the (co)polycarbonate has terminal hydroxyl group content of 50 to 80 molar % and the composition further contains a polymer other than (co)polycarbonates and (co)polyestercarbonates.

* * * * *

UNITED STATES PATENT AND TRADEMARK OFFICE
CERTIFICATE OF CORRECTION

PATENT NO. : 5,387,628
DATED : February 7, 1995
INVENTOR(S) : Tatsuya KANNO et al It is certified that error appears in the above-indentified patent and that said Letters Patent is hereby corrected as shown below:

```
Column 79, line 18; change "one number" to
                    ---one member---.
Column 80, line 61; change "4hydroxy-" to
                    ---4-hydroxy- ---.
           line 62; change "bis-[3-(3,5-di-t-" to
                    ---bis[3-(3,5-di-t- ---.
Column 81, line 64; change "bis[3(3-t" to
                    ---bis[3-(3-t ---.
Column 84, line 19; change "compounds, and" to
                    ---compounds and---.
           line 51; change "magnesium hydroxide." to
                    ---magnesium hydroxide,---
Column 86, line 66; change "3,5-di-tert-4-" to
                    ---3,5-di-tert-butyl-4- ---.
Column 88, line 15; change (2,2diphenylpro-" to
                    ---(2,2-diphenylpro- ---.
Column 90, line 44; change "rakis[3(3,5" to
                    ---rakis[3-(3,5---.
Column 91, line 45; change "5methyl" to
                    ---5-methyl---.
```

UNITED STATES PATENT AND TRADEMARK OFFICE
CERTIFICATE OF CORRECTION

PATENT NO. : 5,387,628
DATED : February 7, 1995
INVENTOR(S) : Tatsuya Kanno, et. al.

It is certified that error appears in the above-indentified patent and that said Letters Patent is hereby corrected as shown below:

Column 94, line 42; change "50 molar" to --50 molar %.--.

Signed and Sealed this

Second Day of January, 1996

Attest:

BRUCE LEHMAN

Attesting Officer    Commissioner of Patents and Trademarks